United States Patent
Zuykov

(10) Patent No.: US 6,199,016 B1
(45) Date of Patent: Mar. 6, 2001

(54) RESONANCE ACOUSTICAL PROFILING SYSTEM AND METHODS OF USING SAME

(75) Inventor: Igor V. Zuykov, Brooklyn, NY (US)

(73) Assignee: Environmental Investigations Corporation, Linden, NJ (US)

( * ) Notice: Subject to any disclaimer, the term of this patent is extended or adjusted under 35 U.S.C. 154(b) by 0 days.

(21) Appl. No.: 09/318,210

(22) Filed: May 25, 1999

Related U.S. Application Data

(60) Provisional application No. 60/086,839, filed on May 26, 1998.

(51) Int. Cl.$^7$ ...................................................... G01V 1/28
(52) U.S. Cl. .................................. 702/16; 702/17; 367/70
(58) Field of Search .................................. 702/14, 15, 16, 702/17; 367/14, 37, 136; 324/348, 349, 350

(56) References Cited

U.S. PATENT DOCUMENTS

| | | | |
|---|---|---|---|
| H1561 | * 7/1996 | Thompson | 367/14 |
| 4,201,972 | 5/1980 | Edwards et al. | 367/40 |
| 4,554,648 | * 11/1985 | Greet et al. | 367/136 |
| 4,686,476 | * 8/1987 | Kober et al. | 324/349 |
| 4,768,174 | 8/1988 | Castle | 367/39 |
| 5,148,110 | 9/1992 | Helms | 324/323 |
| 5,414,674 | 5/1995 | Lichman | 367/49 |
| 5,621,699 | * 4/1997 | Rigsby et al. | 702/17 |

OTHER PUBLICATIONS

"Seismic Refraction and Reflection", GeoVision, Inc., May 16, 1999 Downloaded from Internet URL, www.geovision.com/seismic.htm.

"Passive Seismic Groundnoise: A Novel Approach to Exploration" (paper presented at 55th Annual SEG Meeting, October 6, 1985, by Lewis J. Katz, Utah Geophysical, Inc.).

Geometrics Seismographical Equipment Description, Downloaded from Internet URL http://www.geometrics.com (Nov. 4, 1997).

"Geophysics: More Than Numbers, Processing and Presentation of Geophysical Data" from http://www.geosoft.com (May 17, 1990).

"Look to GEOSPHERE for Innovative Geophysical Solutions to Near–Surface Geological Problems" from www.geosphere.com (Nov. 11, 1997).

* cited by examiner

*Primary Examiner*—Donald E. McElheny, Jr.
(74) *Attorney, Agent, or Firm*—Michael D. Fitzpatrick

(57) ABSTRACT

An apparatus and procedure for passively performing a geophysical survey. The RAP Equipment complex comprises an A/D Conversion Device, an external sensor, an external 12 volt battery, and a Notebook Computer in which resides a Fourier analysis program. The A/D Conversion Device is connected to the serial port of the Notebook Computer. The A/D Conversion Device comprises an Analog/Digital Converter modified to replace its quartz resonator with a Frequency Generator for providing a predetermined sampling rate, and a Signal Amplifier. An external sensor is attached by a cable to the input of the Signal Amplifier. A 12 volt power supply powers the Signal Amplifier, the modified A/D converter, and the Notebook Computer. In use, the external sensor is placed on the ground at the first spot it is desired to take a reading. The ground is then lightly tapped in the near vicinity of the sensor either with one's finger or a hammer. This tap causes the natural vibrations within the subsurface layers to be amplified. The sensor picks up these vibrations from the resonating layers, passes them on to the Signal Amplifier which in turn amplifies these signals and passes them on to the A/D Conversion Device. The A/D conversion Device converts these acoustical signals from analog form to digital form and passes them on to the serial port of the Notebook Computer which in turn creates a file of these digital signals.

13 Claims, 55 Drawing Sheets

(15 of 55 Drawing Sheet(s) Filed in Color)

The Application of the RAP Method for the Search of
Engineering Communications.

The application of the RAP method for building maps of stretches of washed away ground as
a result of emergency of pipeline.

The application of the RAP method while study of geological section for building of
engineering constructions.

The example of application of the RAP method to mapping of karst formation zones.

The application of the RAP method for mapping of water-saturated area

The example of detachment by the RAP method the tectonic disturbance zone (Crimes)

The results of work carried out by the RAP method on Kimberly pipe (Archangel province)

```
C:\PIEZO>ezld 1 to_115.exe g

DKE's EZLD v1.02 6/17/95 Forth-Inside
Loaded C:\PIEZO\TO_115.EXE
at address 0000

C:\PIEZO>pause
Press any key to continue . . .
_
```

2

```
C:\PIEZO>ezld 1 to_115.exe g

DKE's EZLD v1.02 6/17/95 Forth-Inside
Loaded C:\PIEZO\TO_115.EXE
at address 0000

C:\PIEZO>pause
Press any key to continue . . .

C:\PIEZO>ezld115 1 piezo.exe g

DKE's EZLD v1.02 6/17/95 Forth-Inside
Loaded C:\PIEZO\PIEZO.EXE
at address 0000

C:\PIEZO>pause
Press any key to continue . . .
_
```

```
        COM PORT# 1  CONNECTED AT  115 Kbaud!
 Sample frq: 3,90625 KHz.        Gate level: 0,3max.

'0'     terminal
         '1'     wating for capture
         '2'     get data
         '3'     set  sampling freq.
         '4'     set  gate level
         '5'     plot last captured data
         '6'     force writing data
         'ESC'    ** EXIT **
-1
```

4

```
        Select sampling freq...
            '1' -  0,976563 KHz.
            '2' -  3,90625 KHz.
            '3' -  8,0 KHz.
            '4' -  48,0 KHz.
```

```
        COM PORT= 1   CONNECTED AT   115 Kbaud!
  Sample frq: 8,0 KHz.            Gate level: 0,3max.

'0'     terminal
            '1'     waiting for capture
            '2'     get data
            '3'     set  sampling freq.
            '4'     set  gate level
            '5'     plot last captured data
            '6'     force writing data
            'ESC'    EXIT 
-1 _
```

6

```
       Select gate level...
            '1' - 0,3.
            '2' - 0,5.
            '3' - 0,7.
```

```
        COM PORT# 1  CONNECTED AT  115 Kbaud!
   Sample frq: 8,0 KHz.          Gate level: 0,5max.

'0'     terminal
           '1'     wating for capture
           '2'     get data
           '3'     set  sampling freq.
           '4'     set  gate level
           '5'     plot last captured data
           '6'     force writing data
           'ESC'    EXIT 
  -1

Data captured!_
```

8

```
5 CMD retry 1
n CMD retry 2
y
Wait. Downloading data ...
```

```
Enter NAME of file to save data -> 10_
```

12

```
Press ESC for skip writing data, any other - for data save!
```

FIG. 26
13
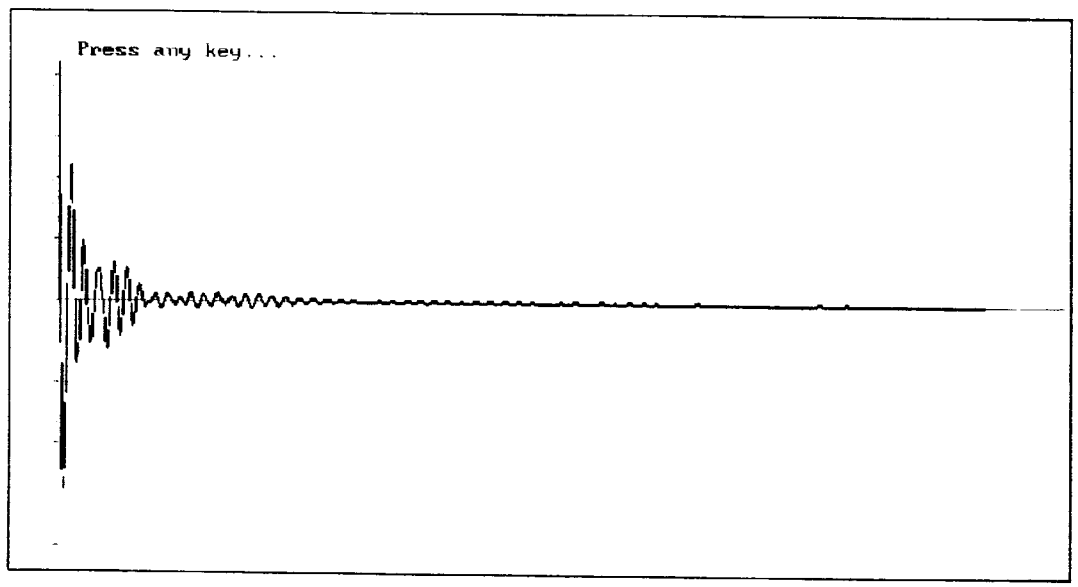
14
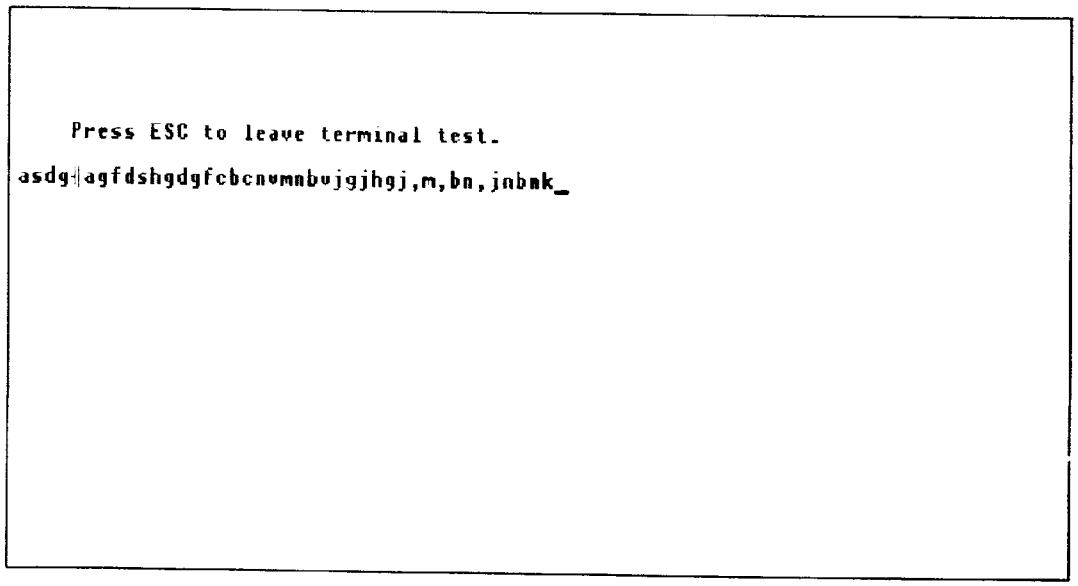

FIG. 27
15
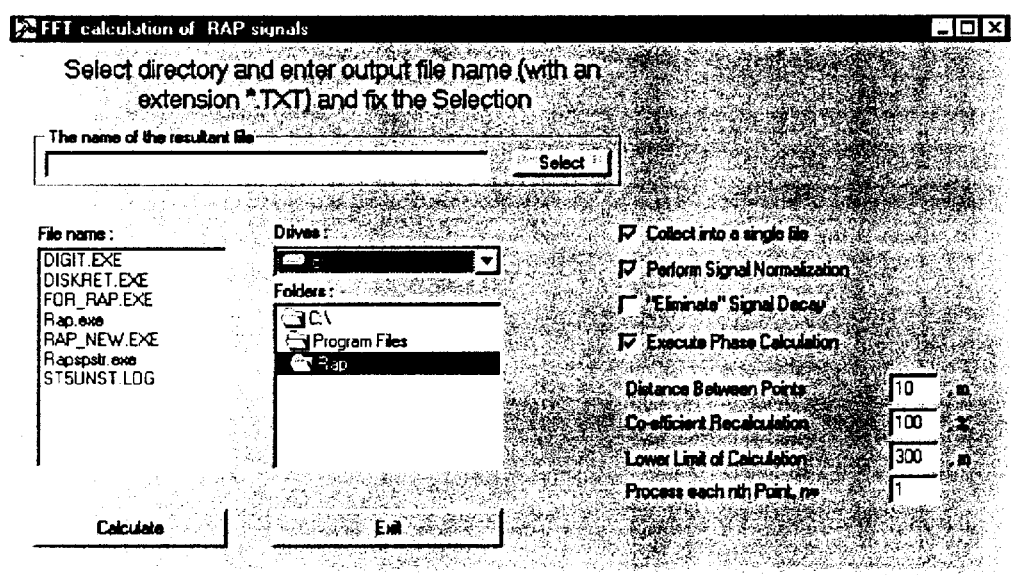
16
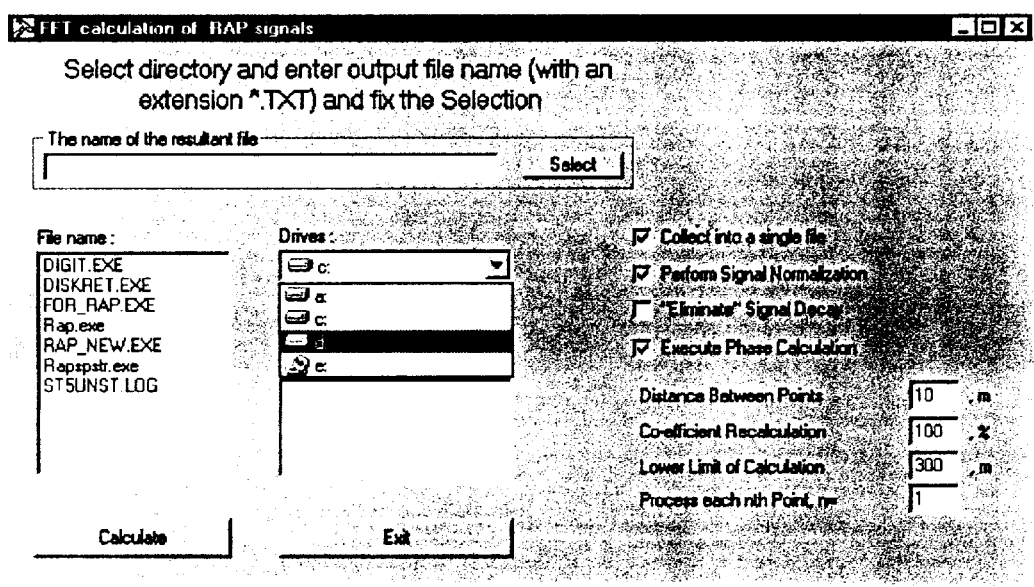

FIG. 28
17
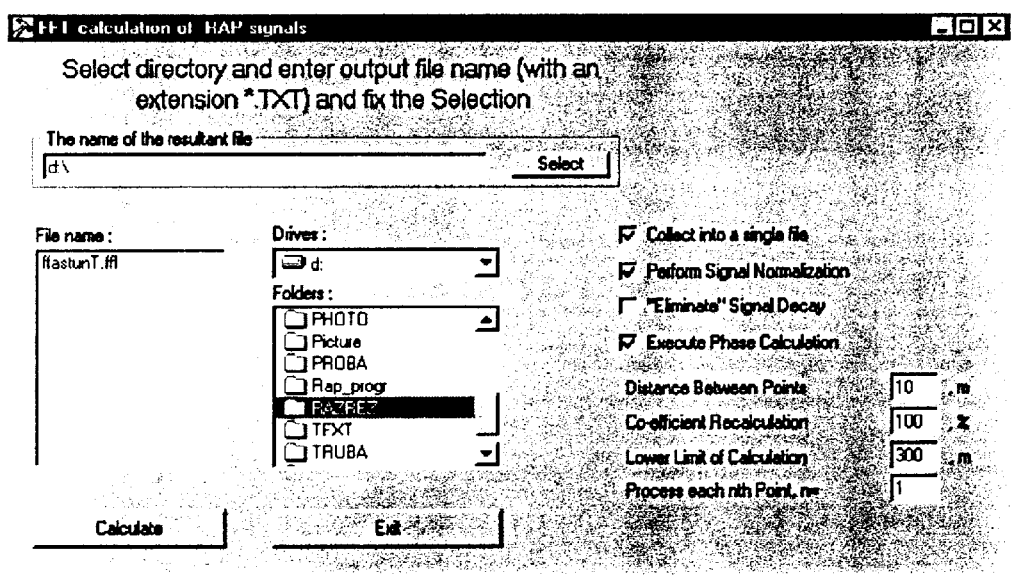
18
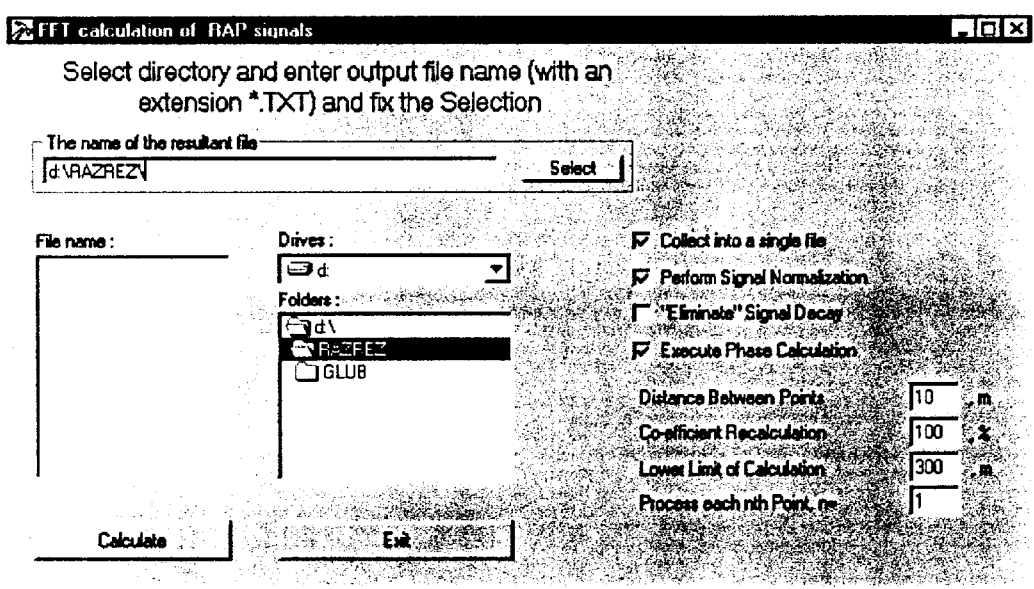

FIG. 29
19
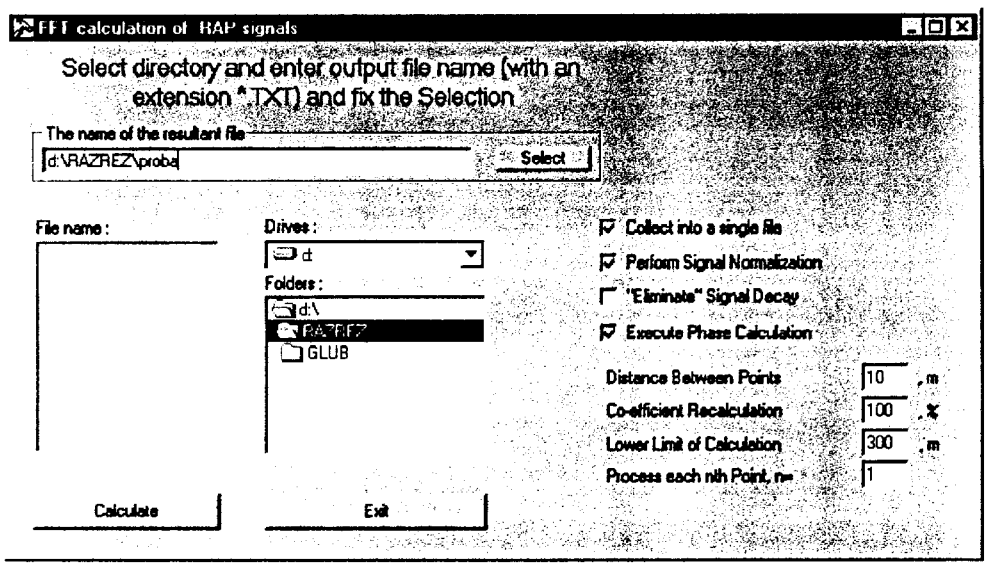
20
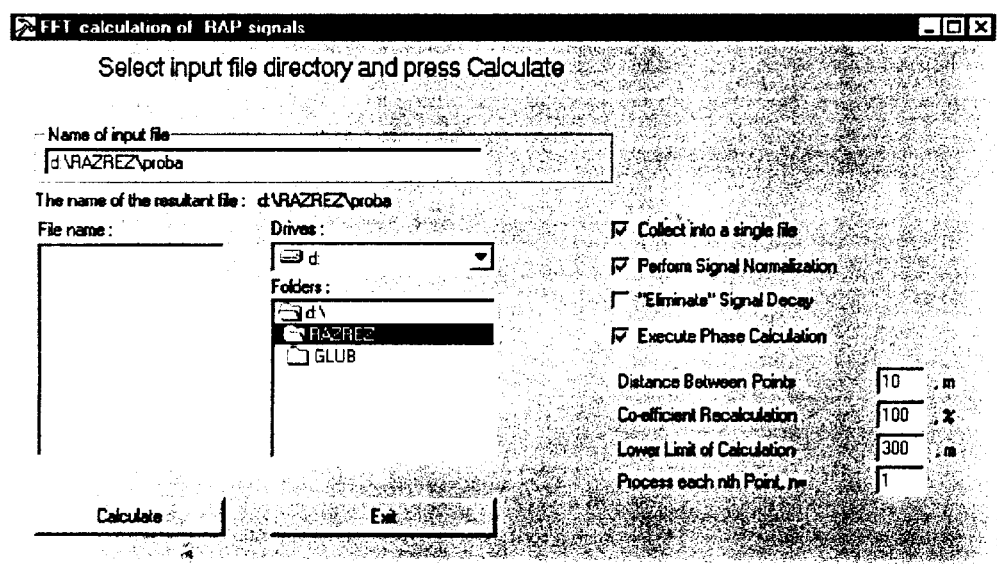

FIG. 30
21
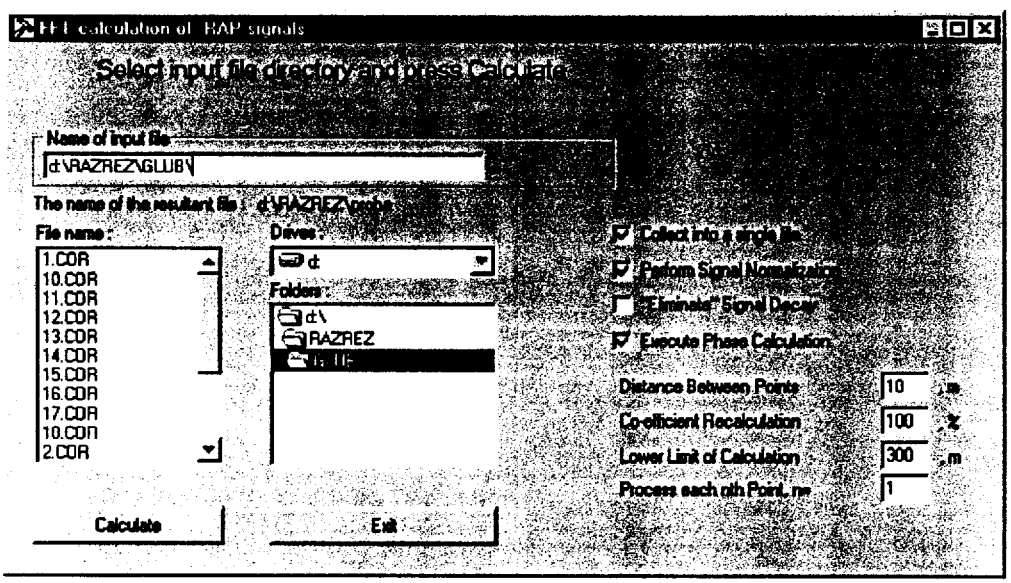
22
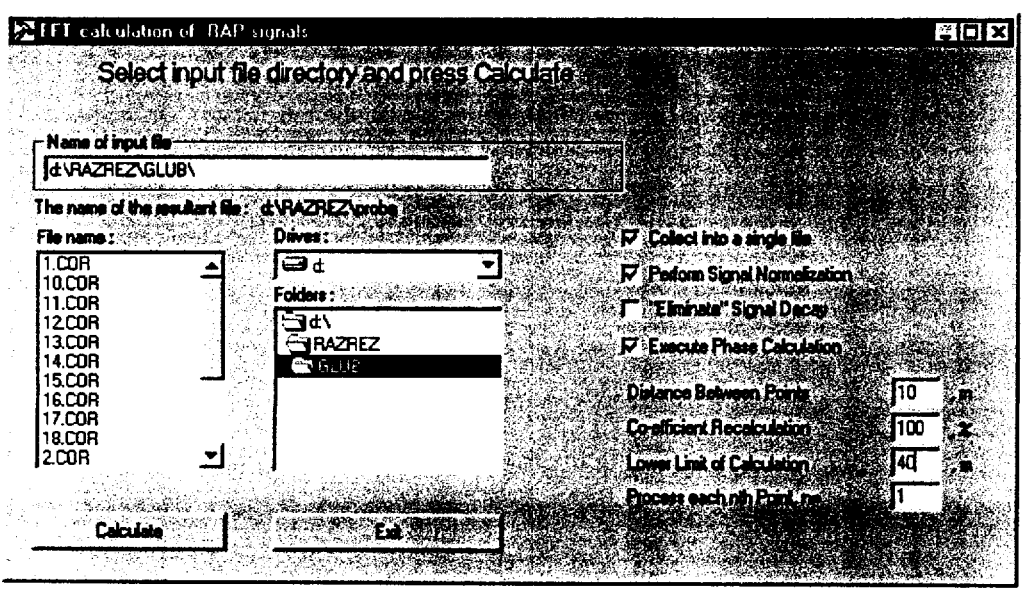

FIG. 31
23
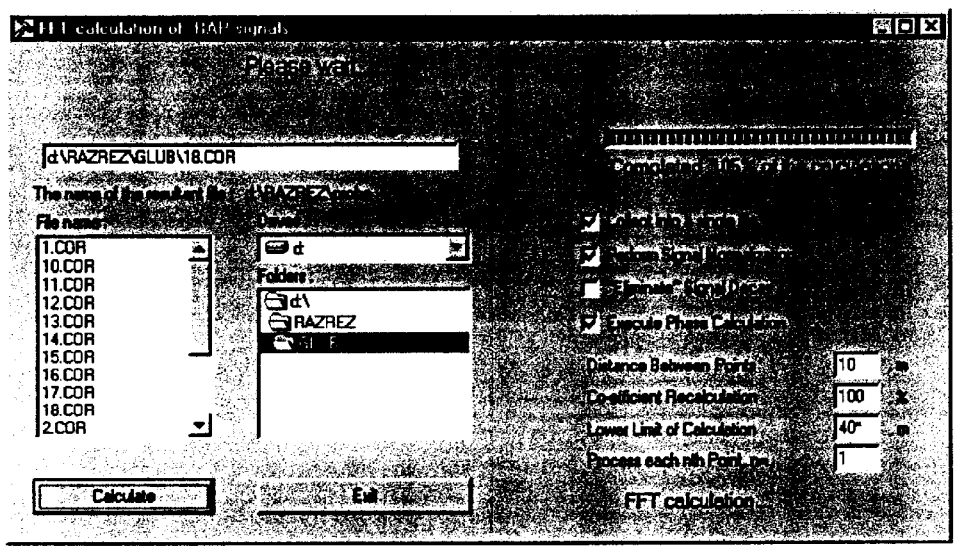
24
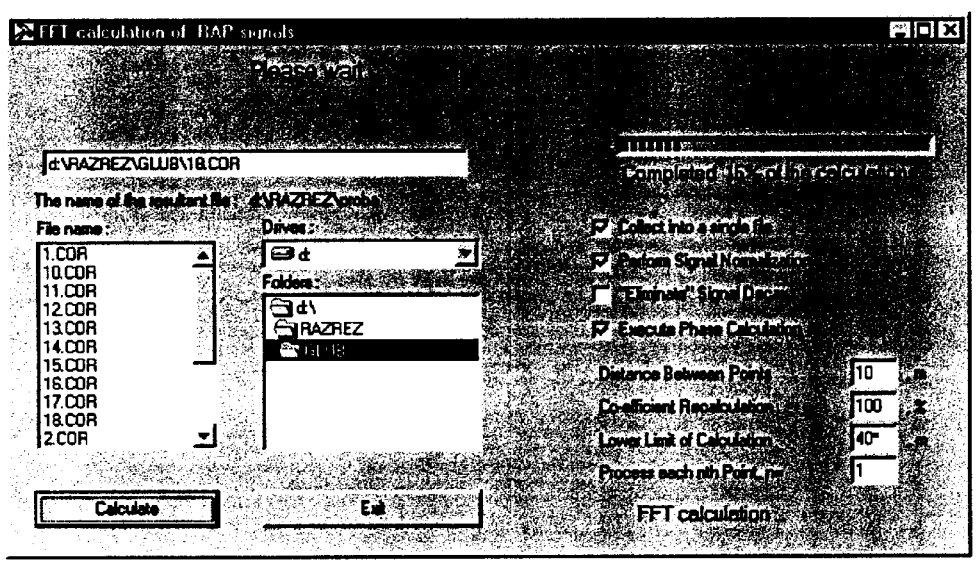

25

FIG. 33
26
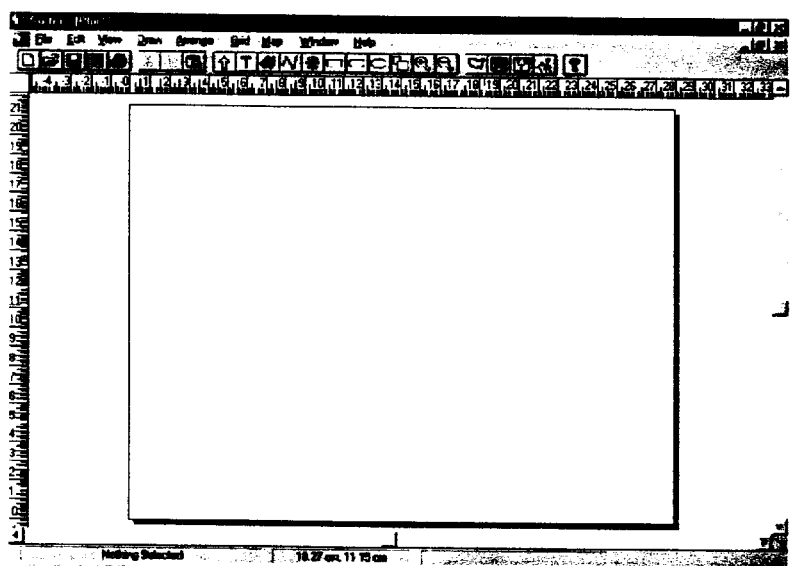
27
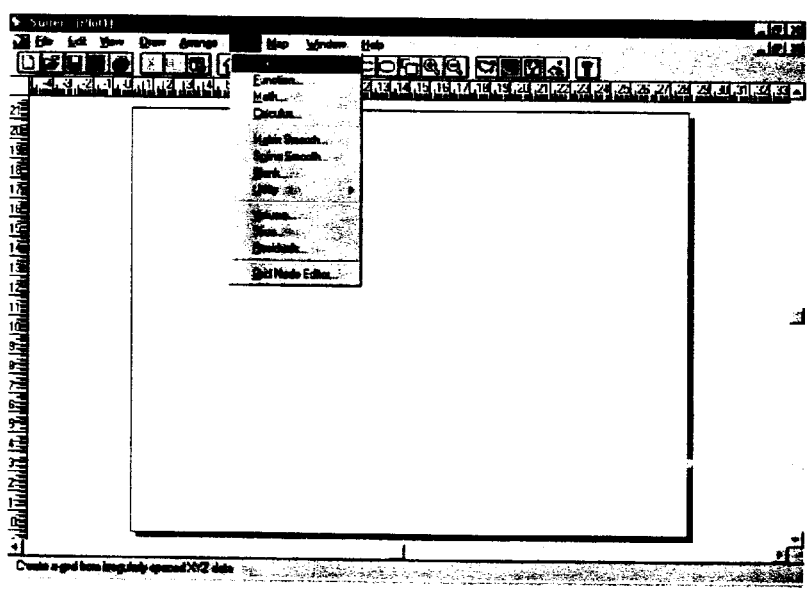

FIG. 34
28
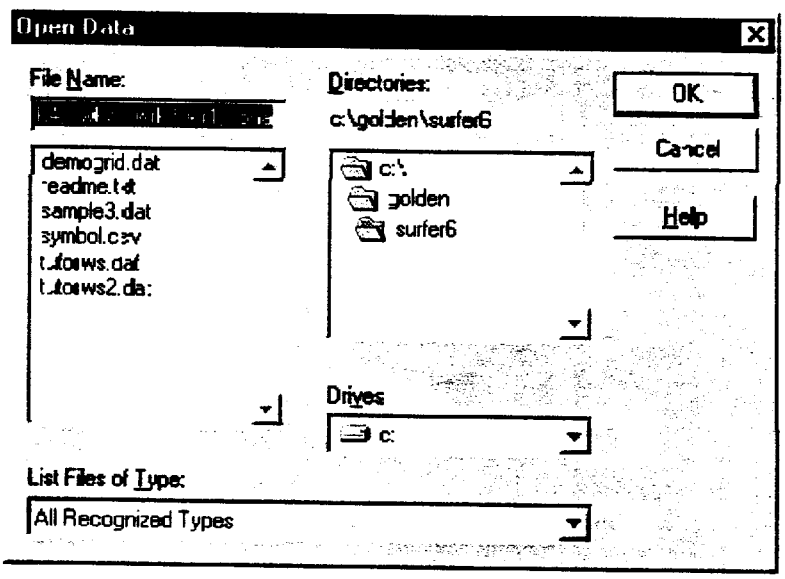
29
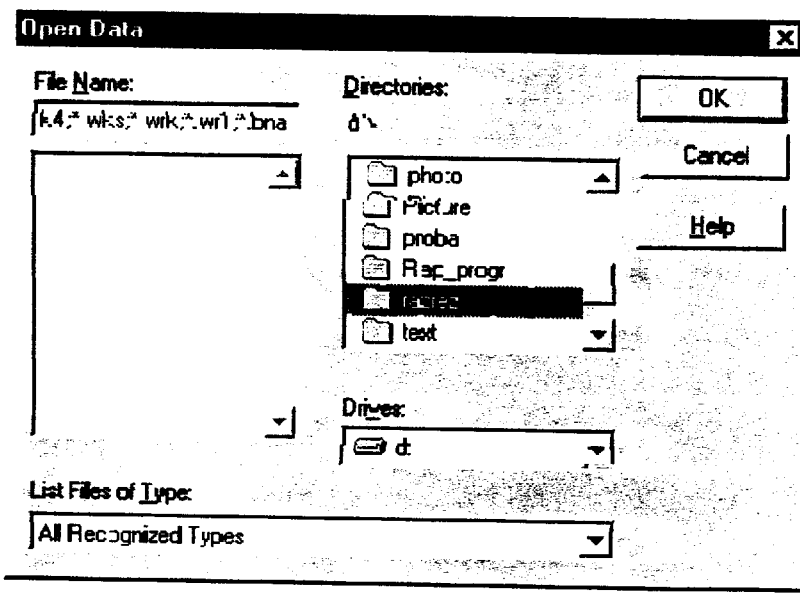

FIG. 35
30
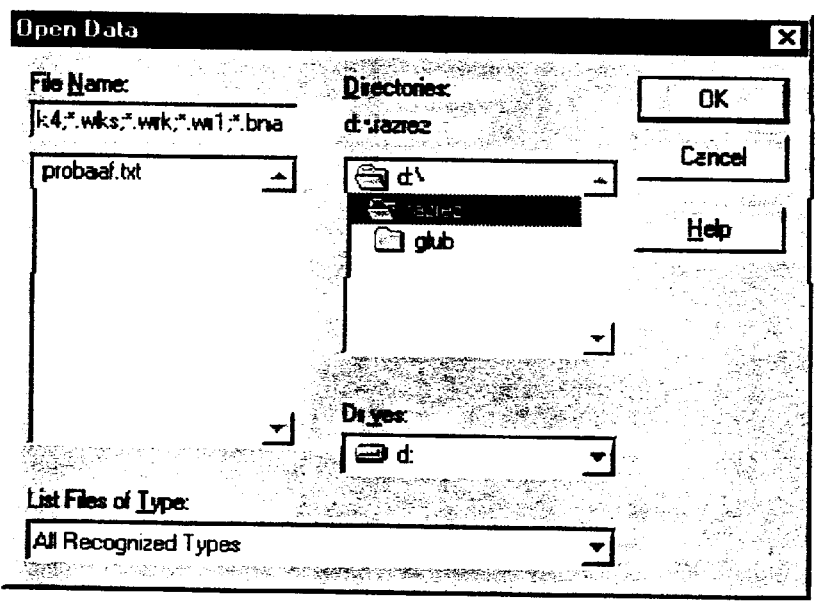
31
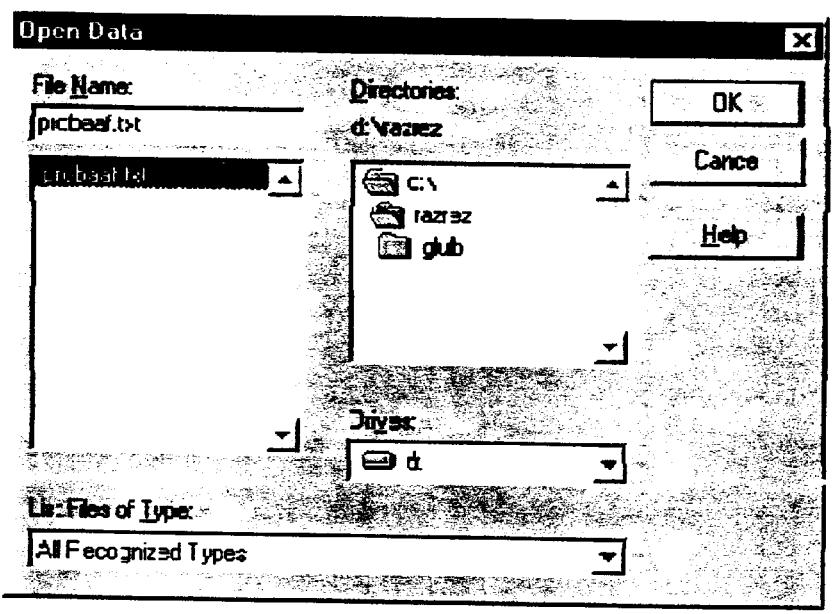

FIG. 36
32
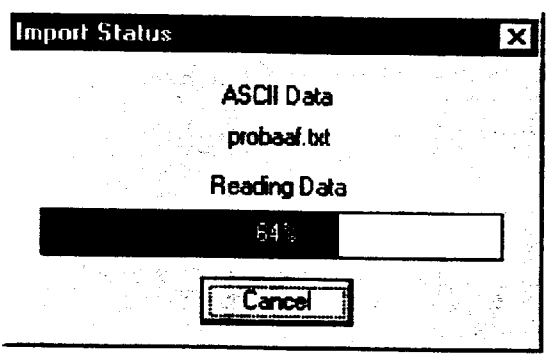
33
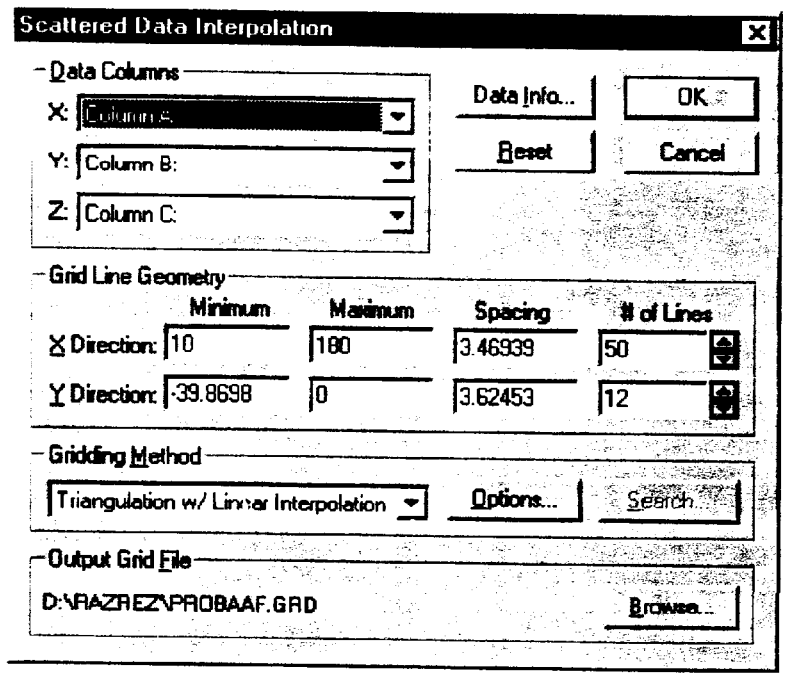

FIG. 37
34
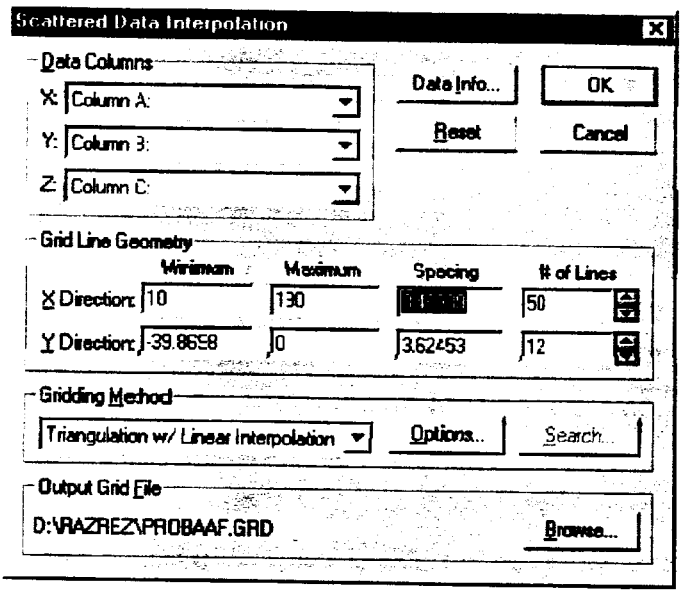
35
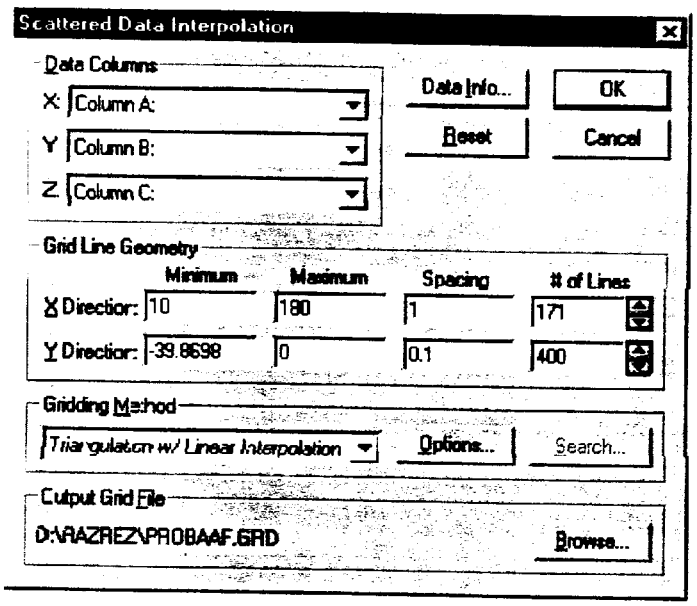

FIG. 38
36
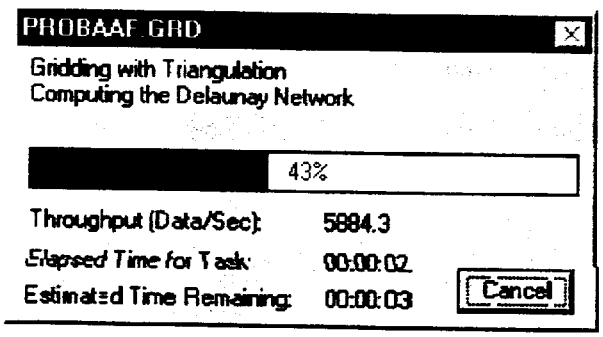
37
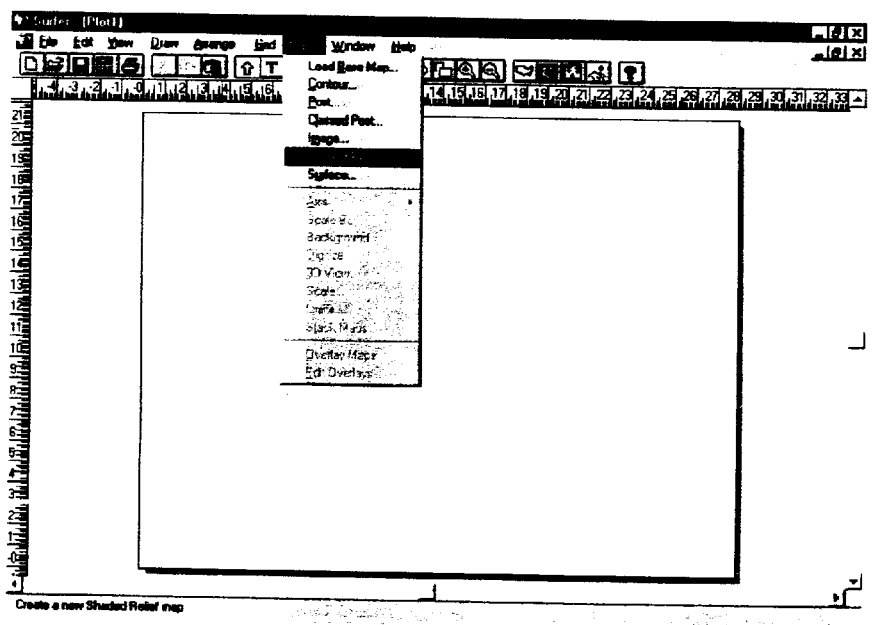

FIG. 39
38
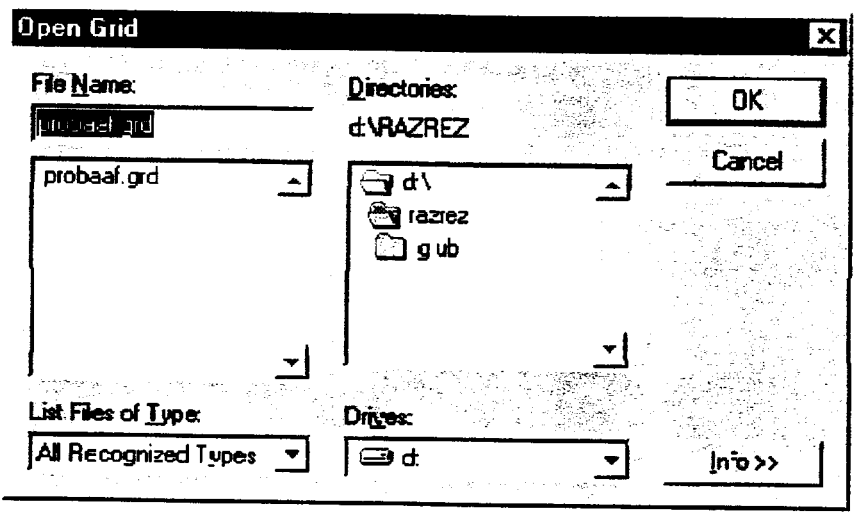
39
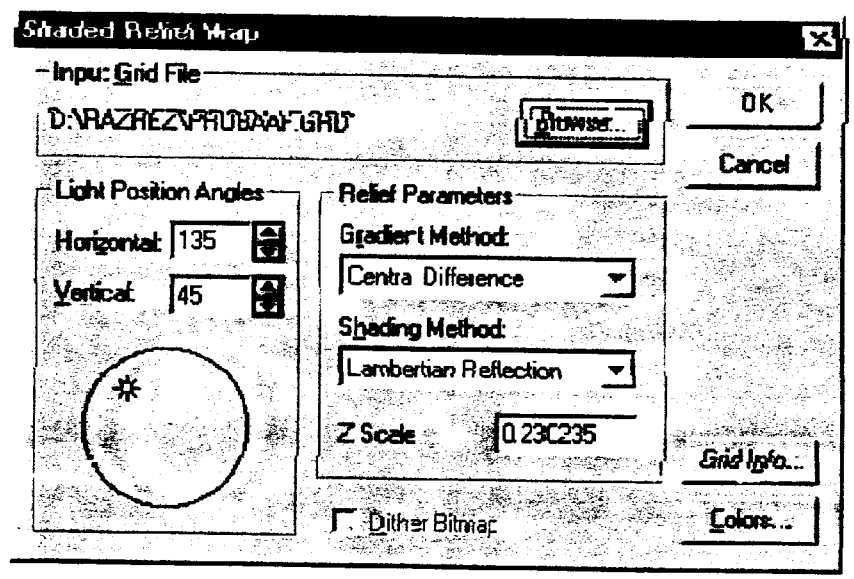

FIG. 40
40
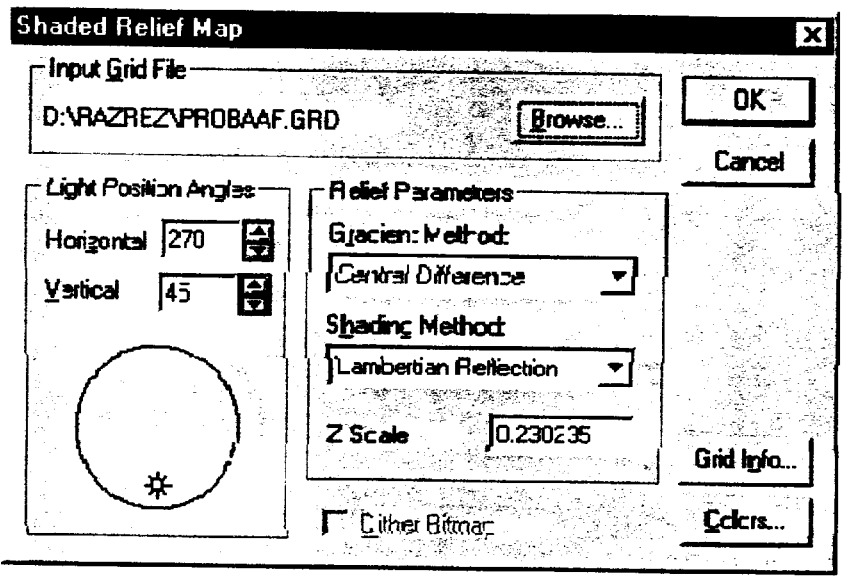
41
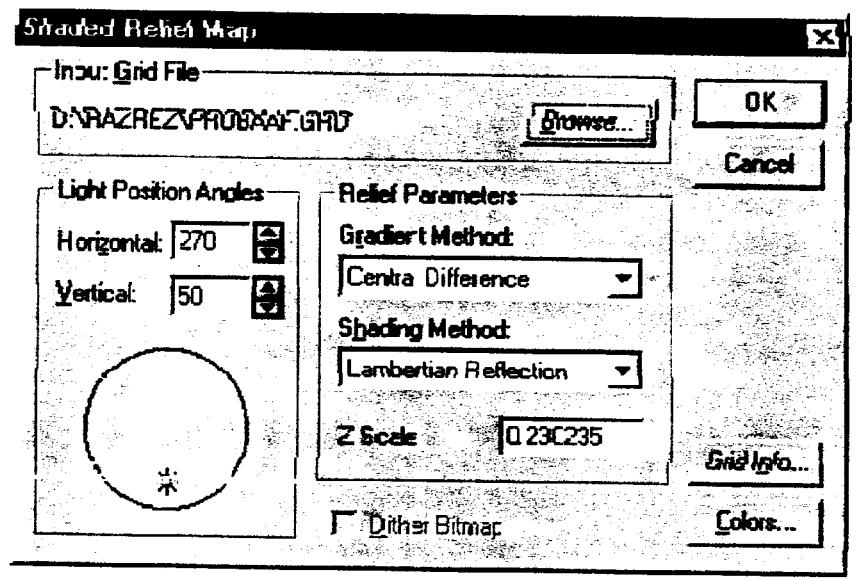

FIG. 41
42
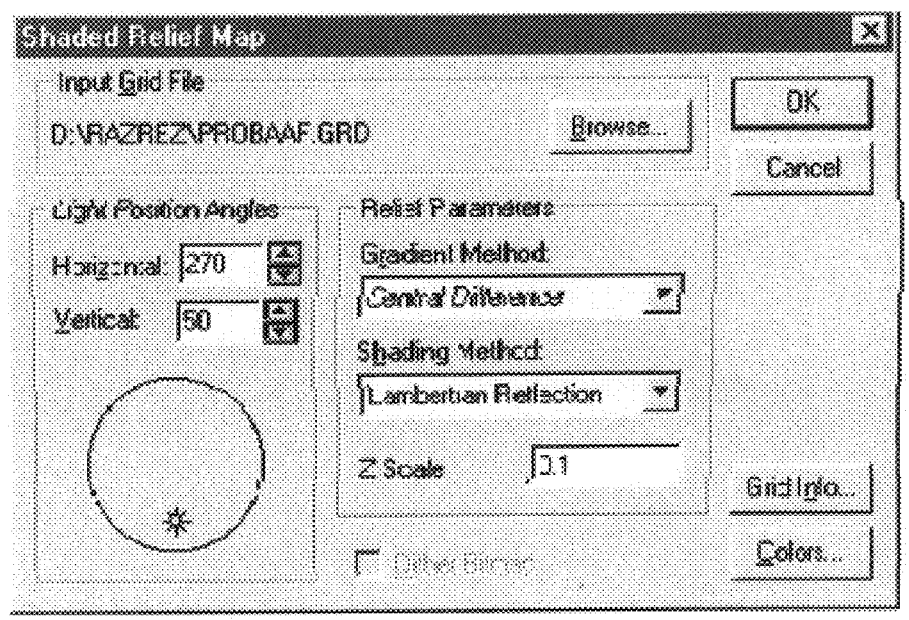
43
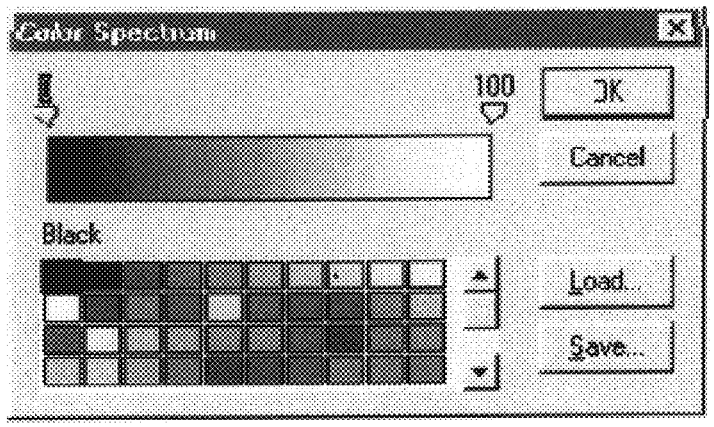

FIG. 42
44
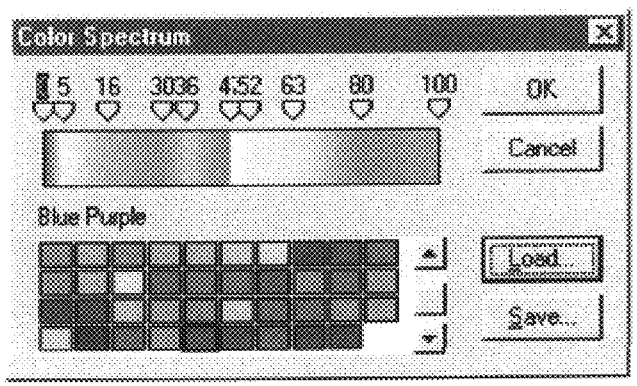
45
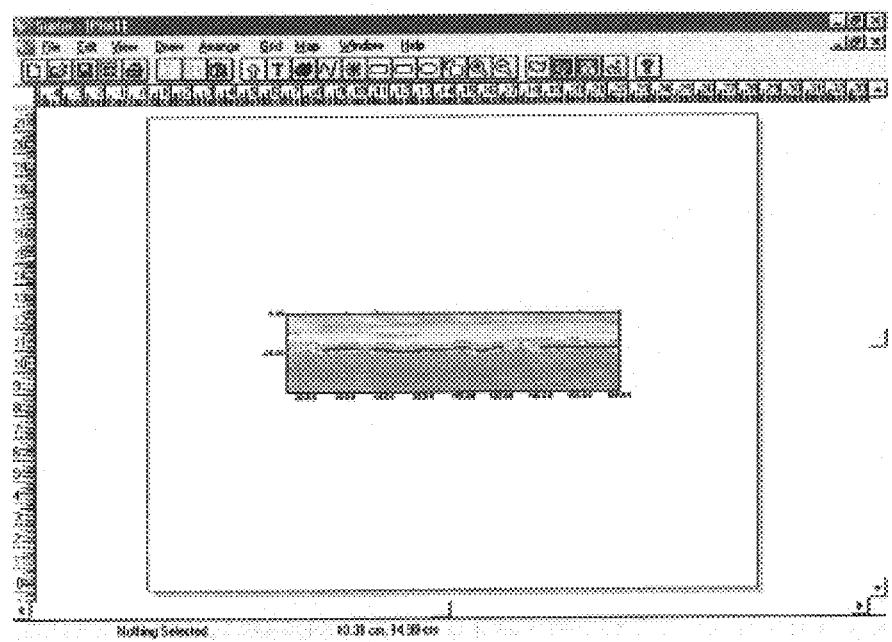

FIG. 43
46
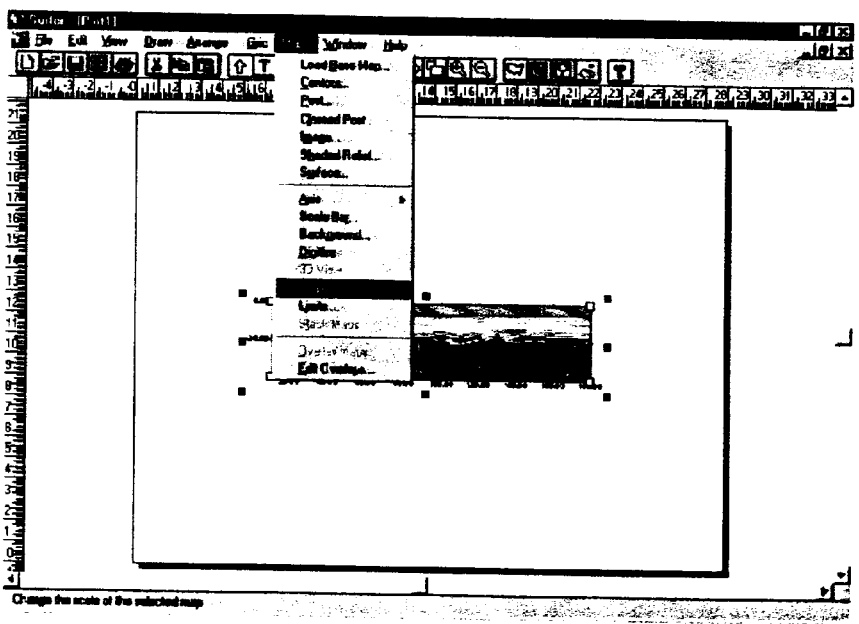
47
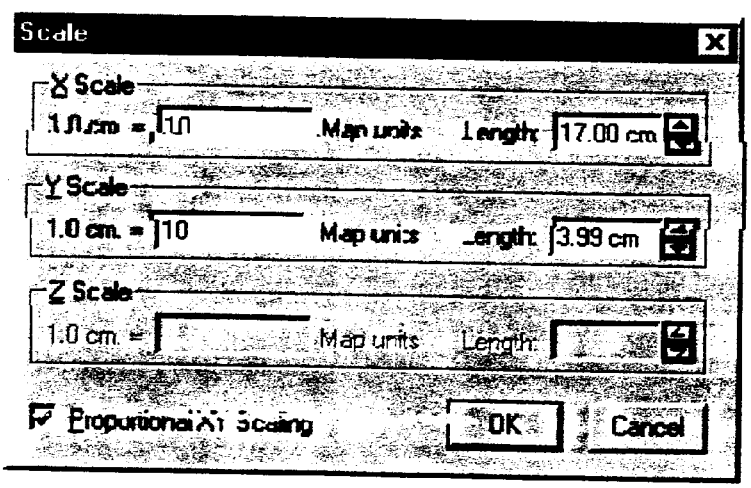

FIG. 44
48
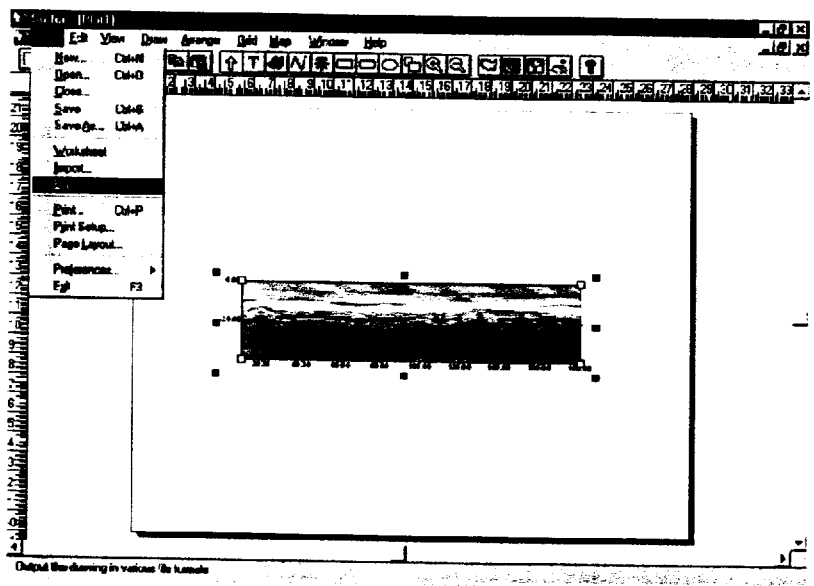
49
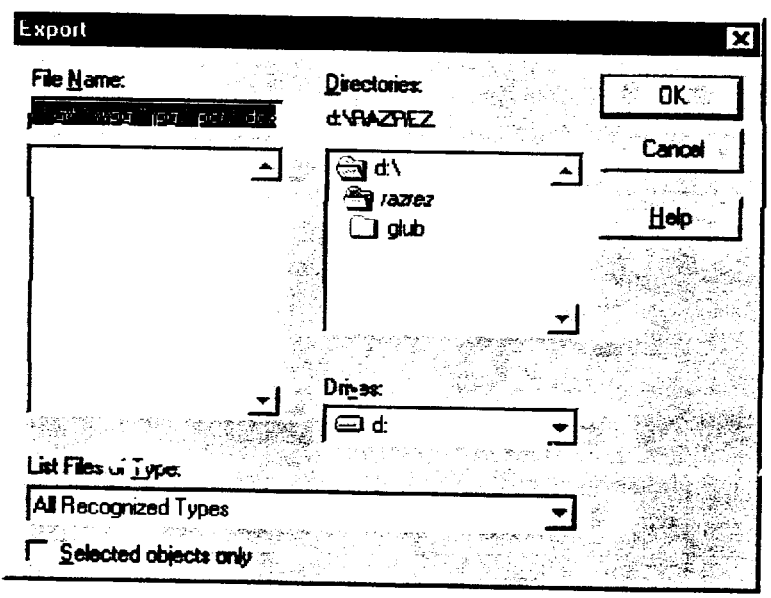

FIG. 45
50
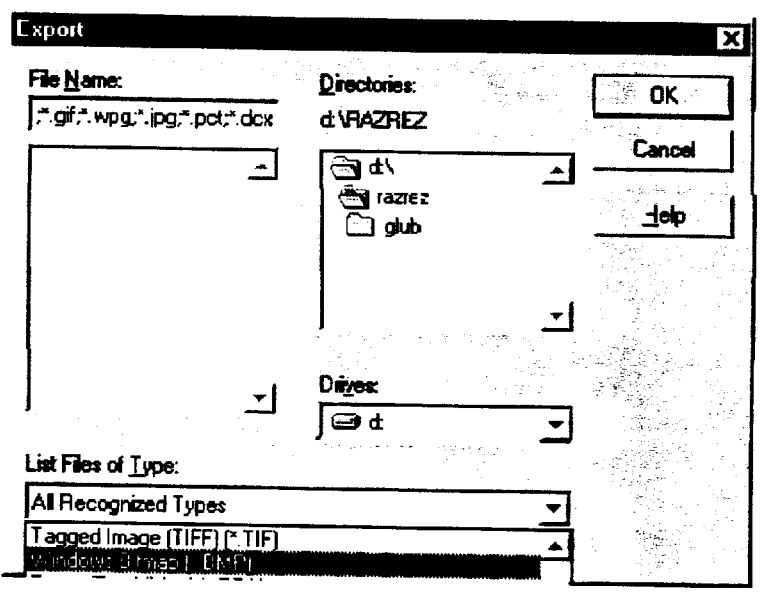
51
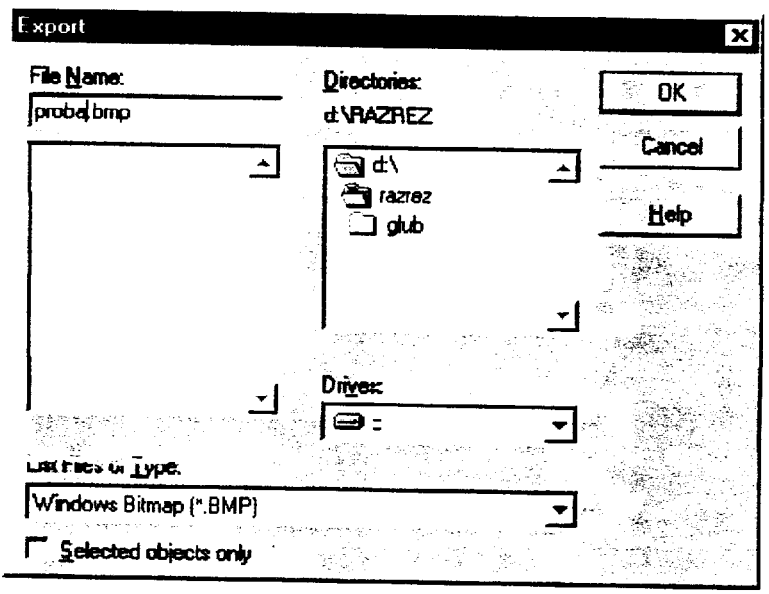

FIG. 46
52
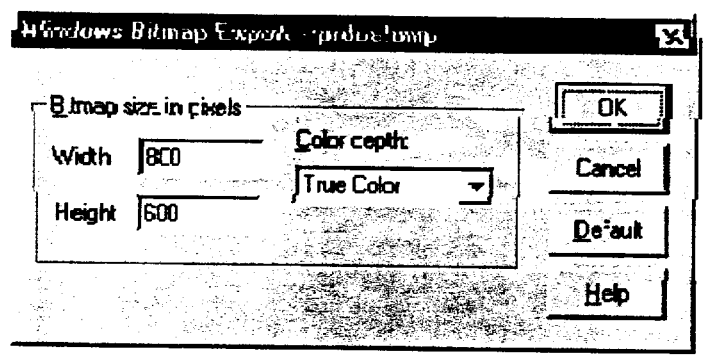
53
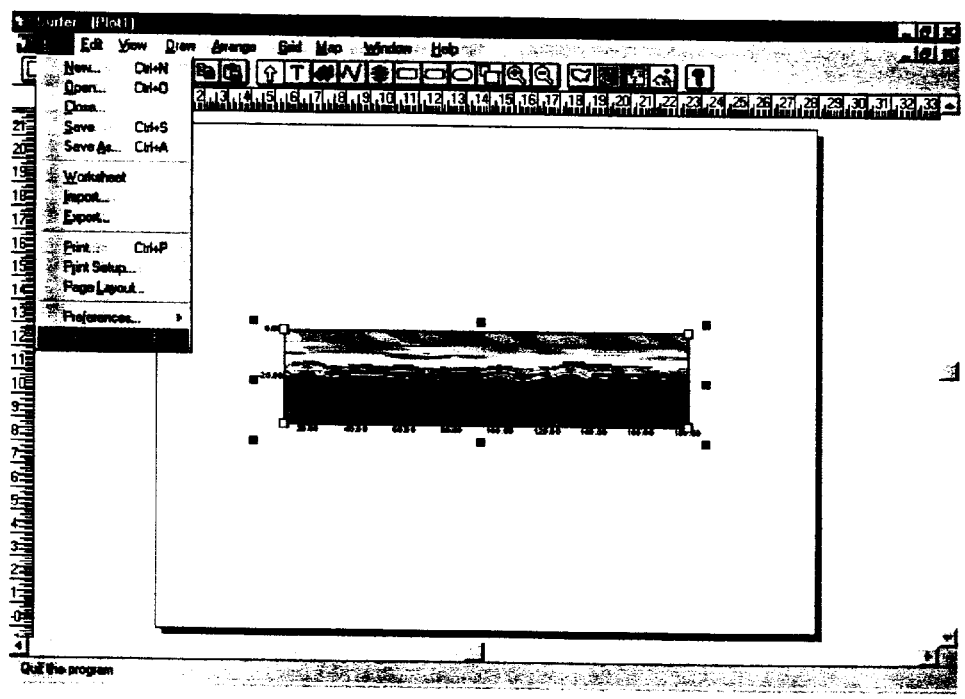

FIG. 47
54
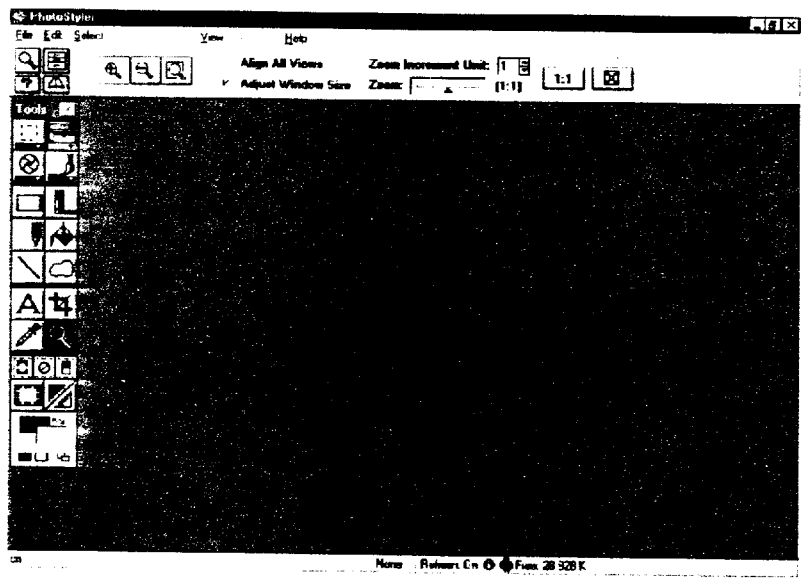
55
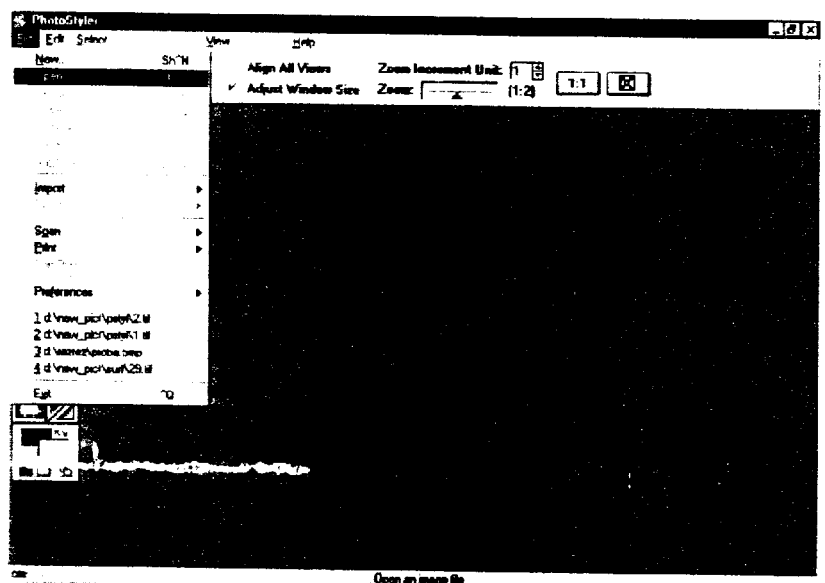

FIG. 48
56
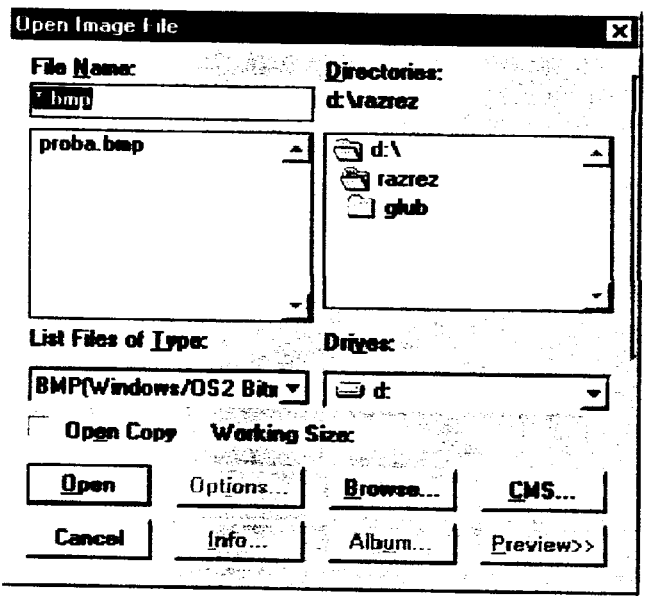
57
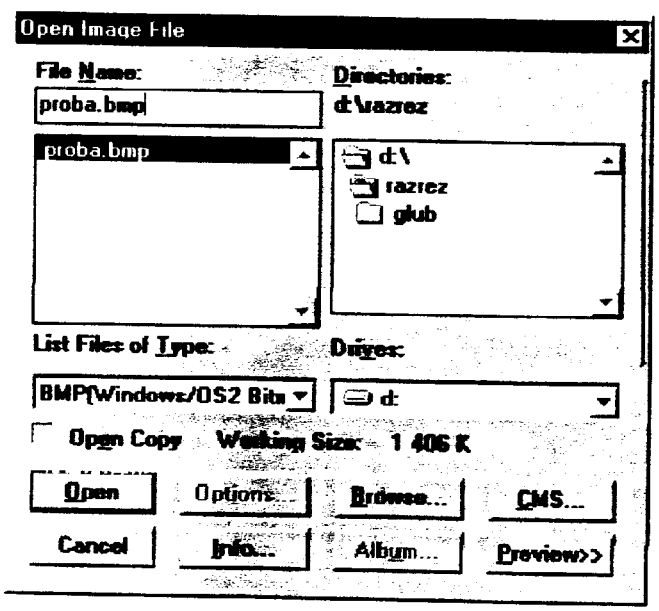

FIG. 49
58
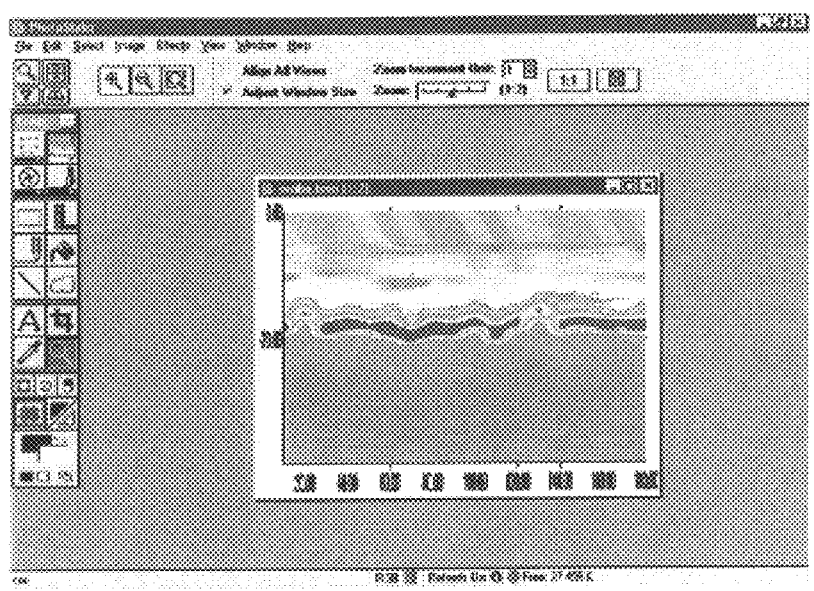
59
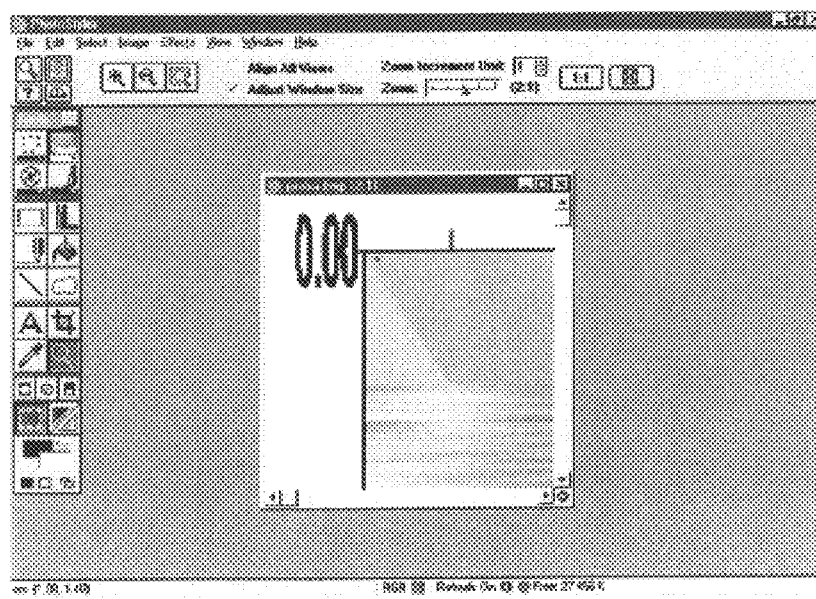

FIG. 50
60
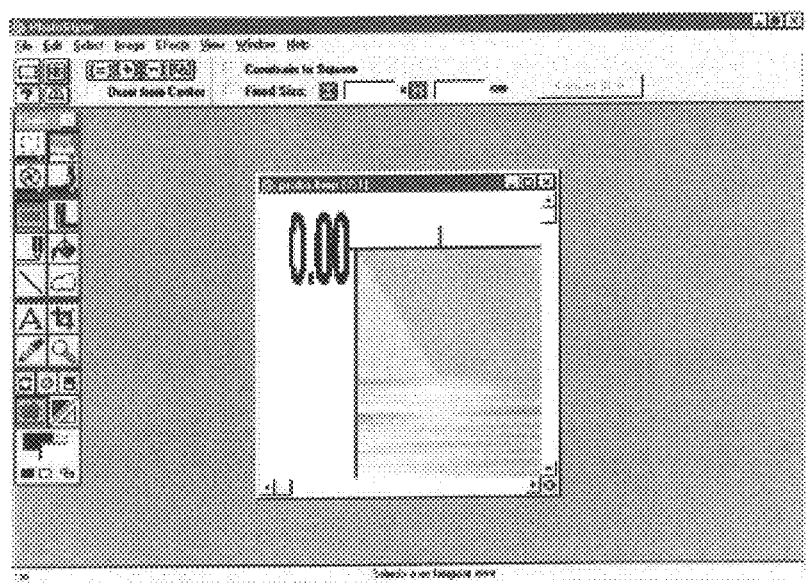
61
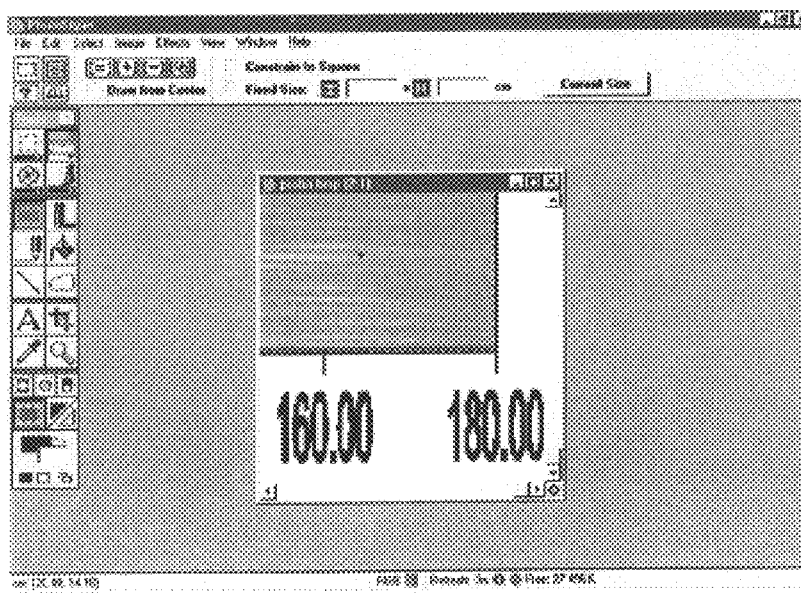

FIG. 51
62
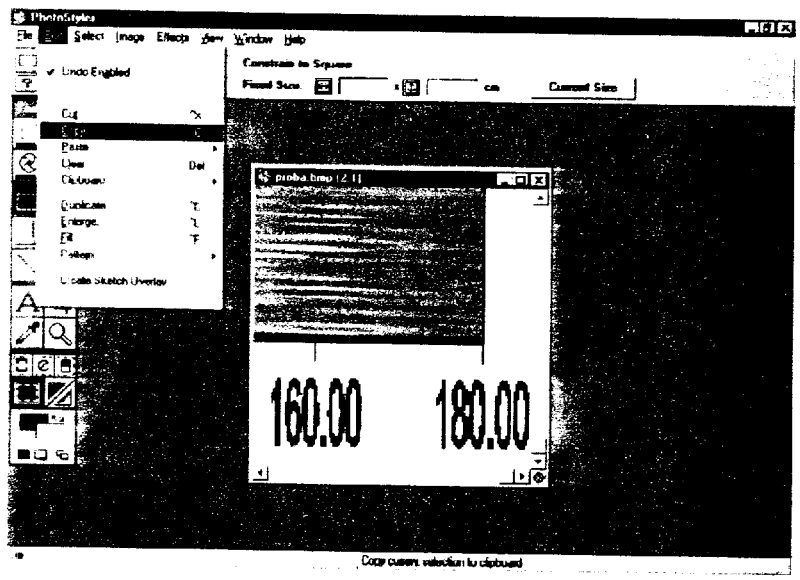
63
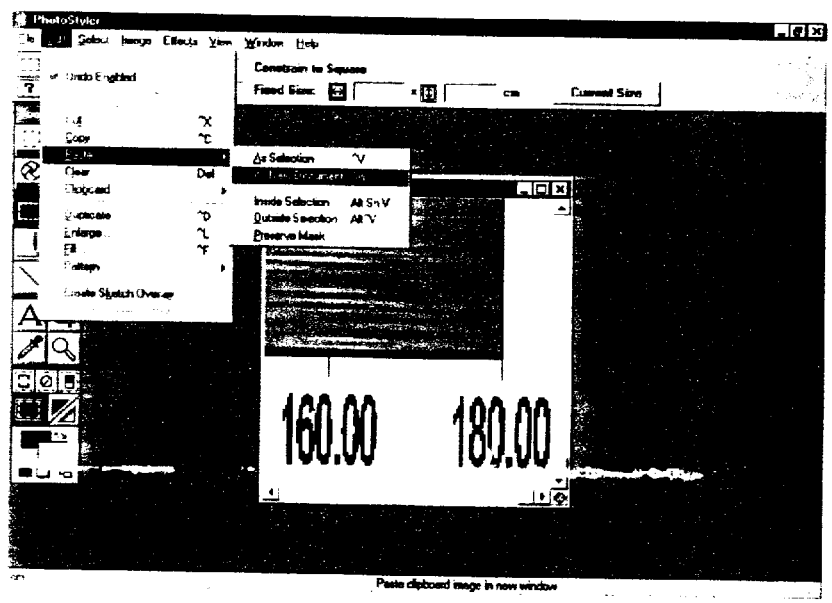

FIG. 52
64
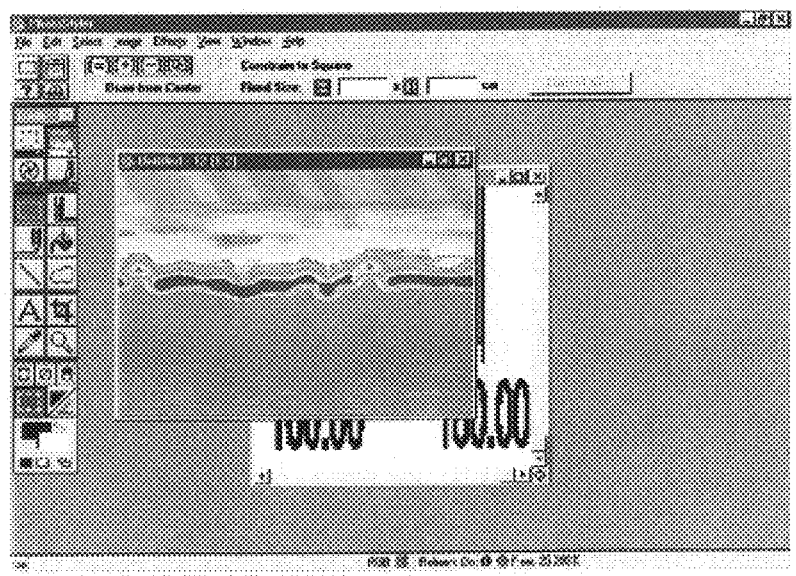
65
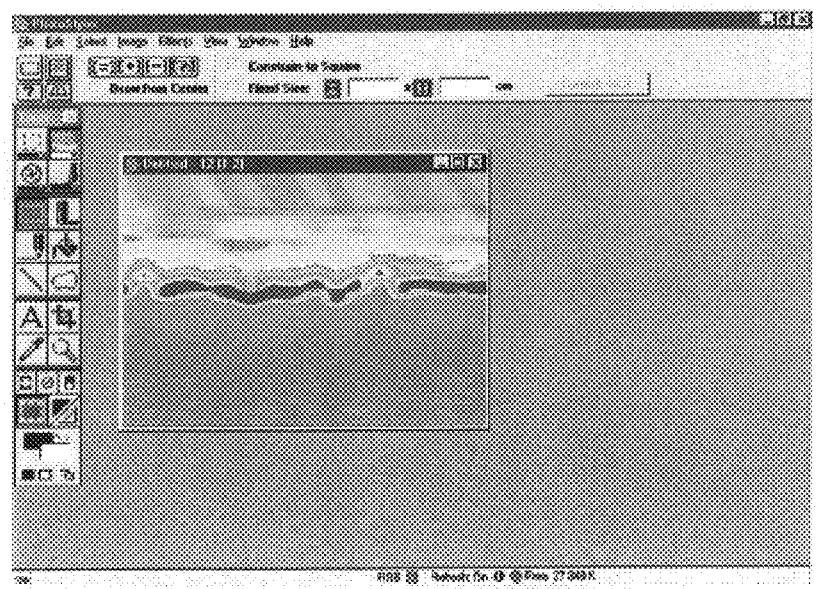

FIG. 53
66
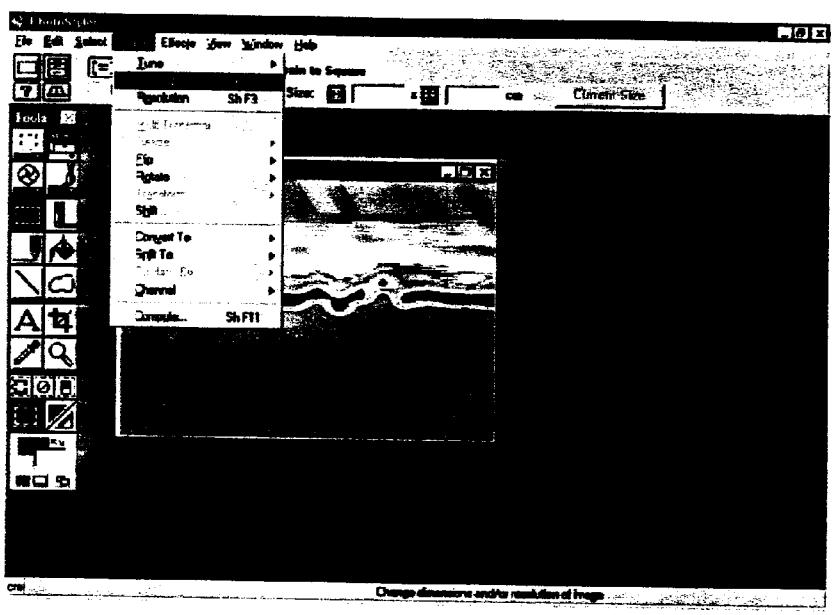
67
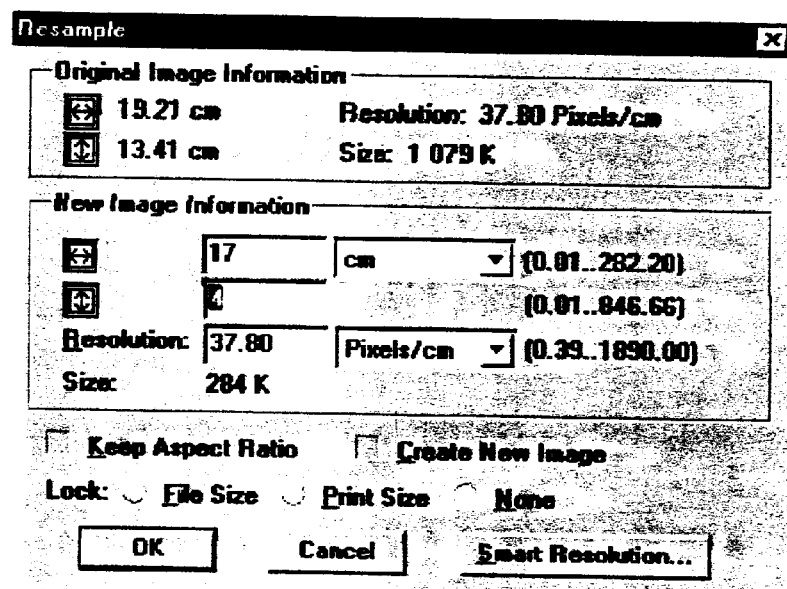

FIG. 54
68
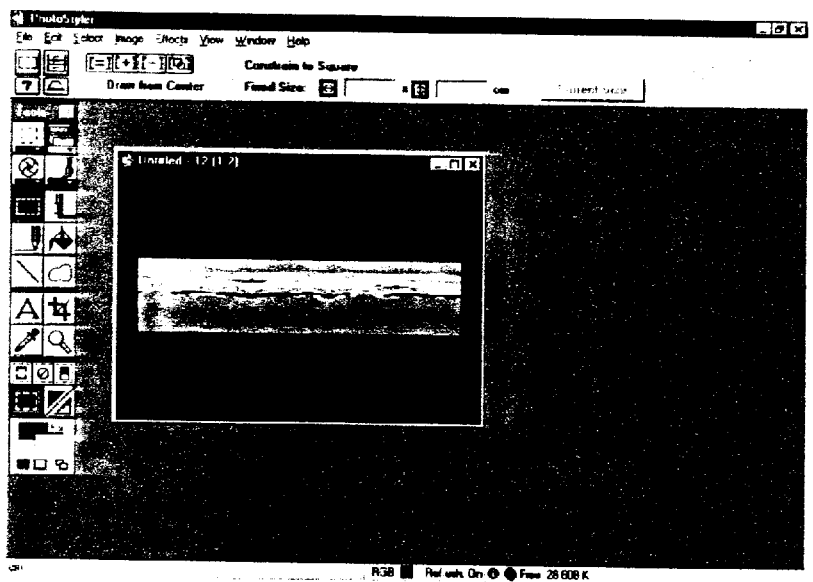
69
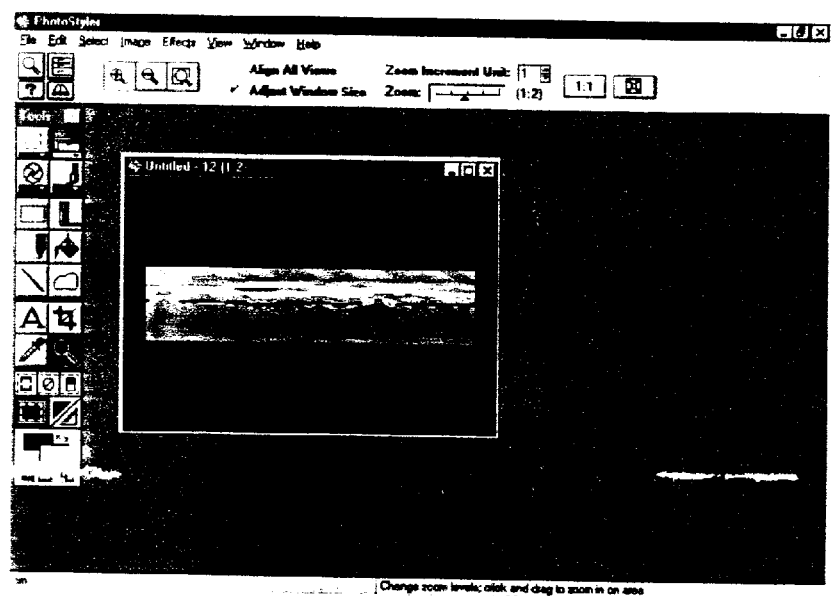

FIG. 55
70
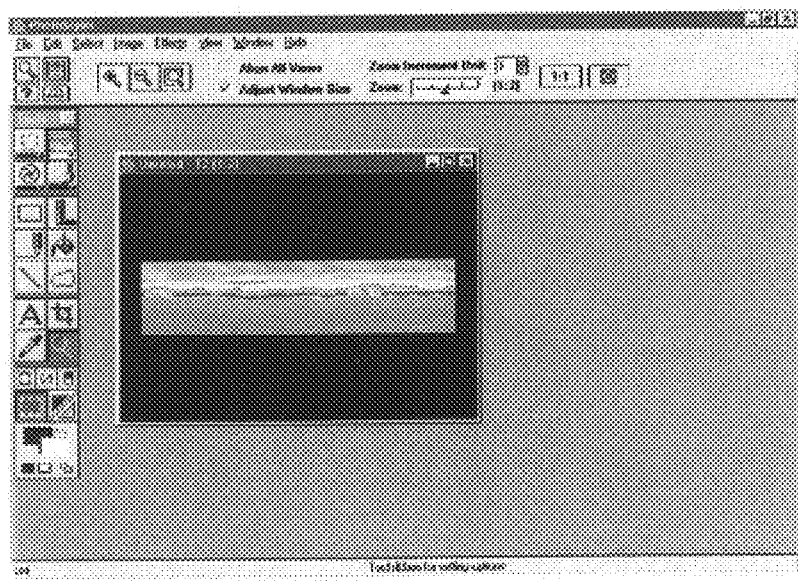
71
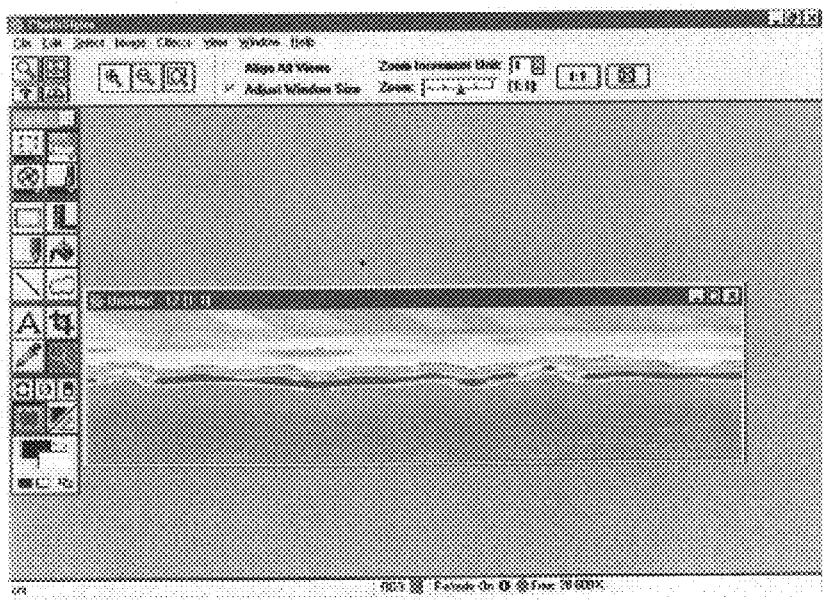

FIG. 56
72
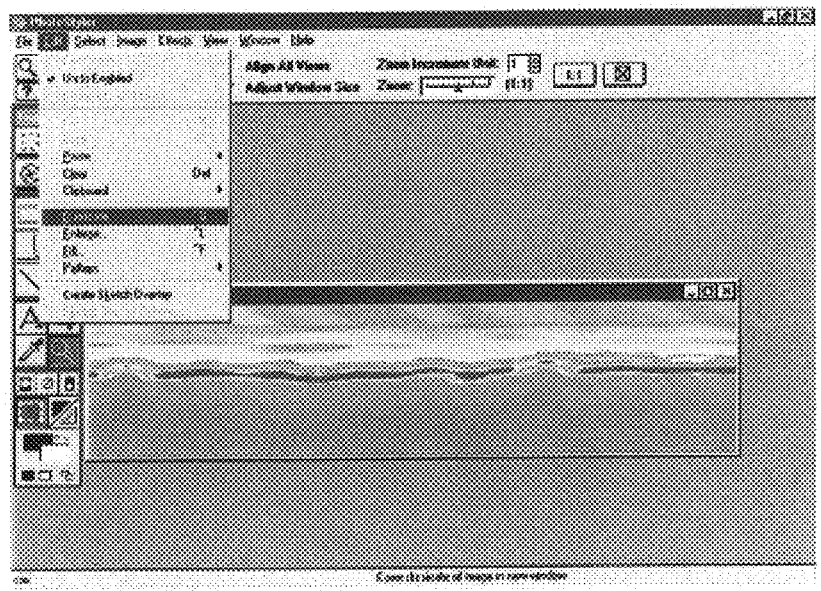
73
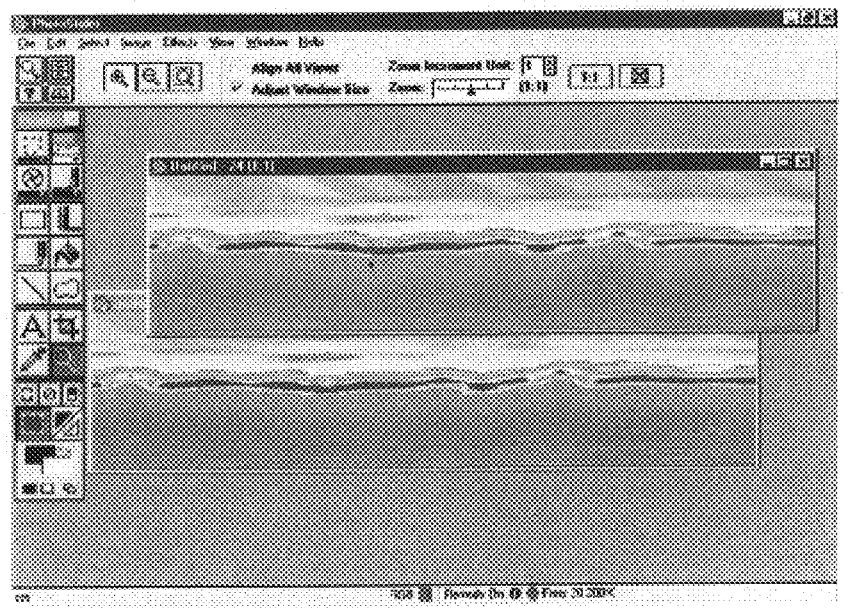

FIG. 57
74
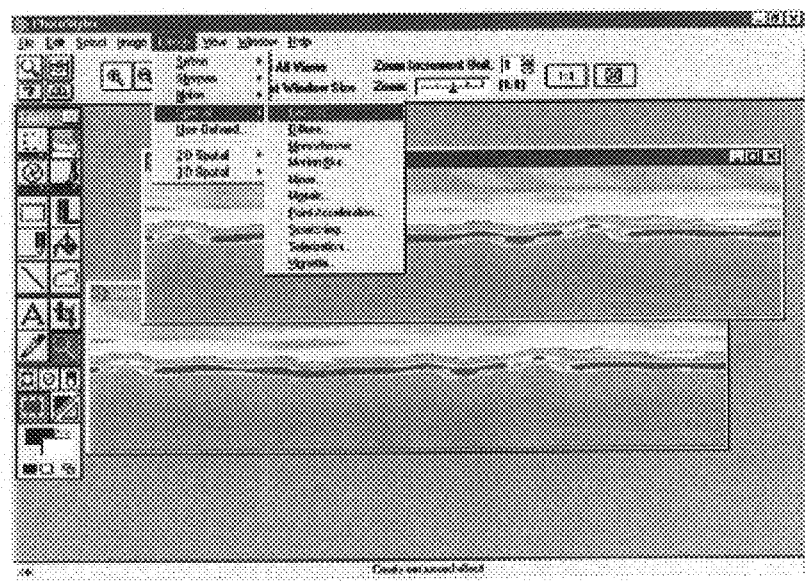
75
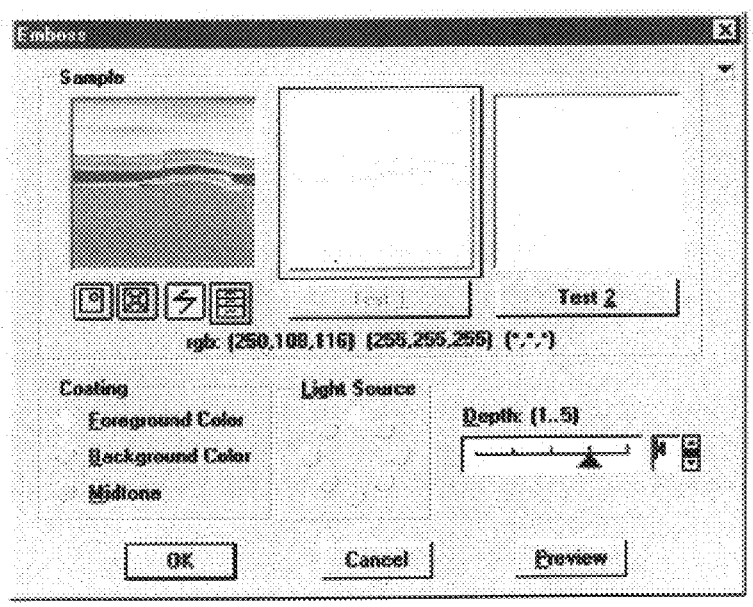

FIG. 58
76
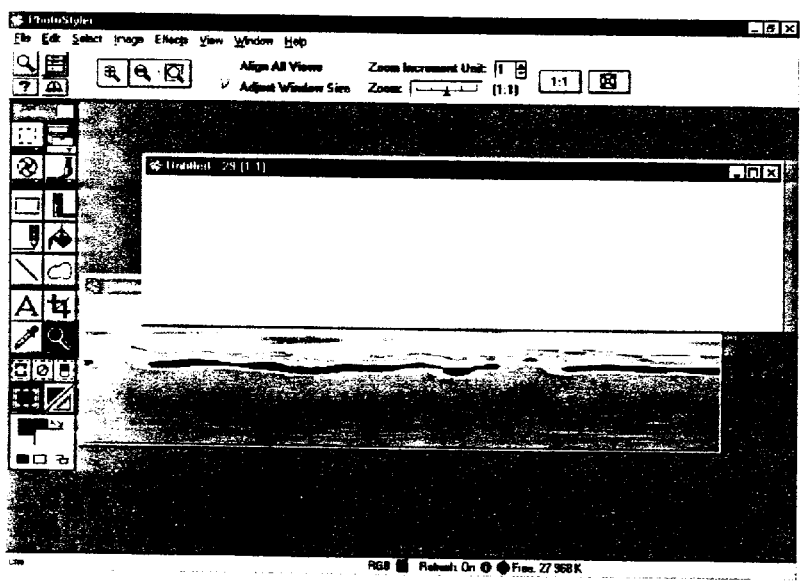
77
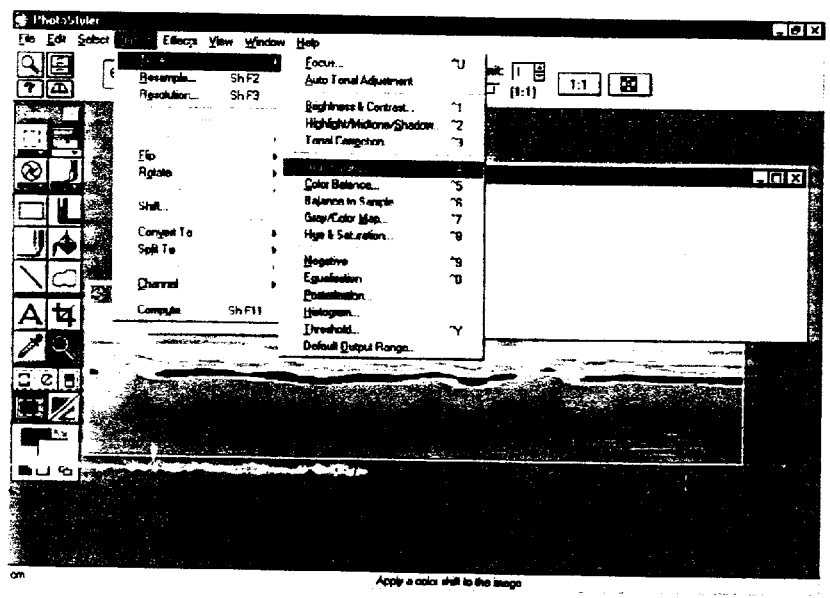

FIG. 59
78
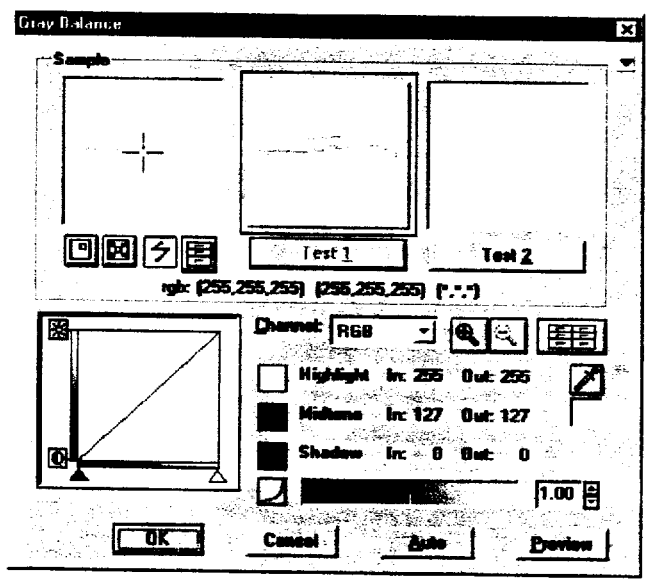
79
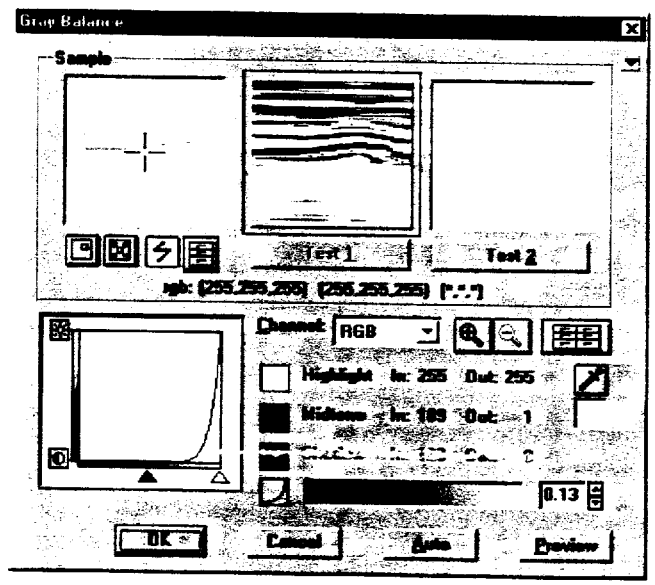

FIG. 60
80
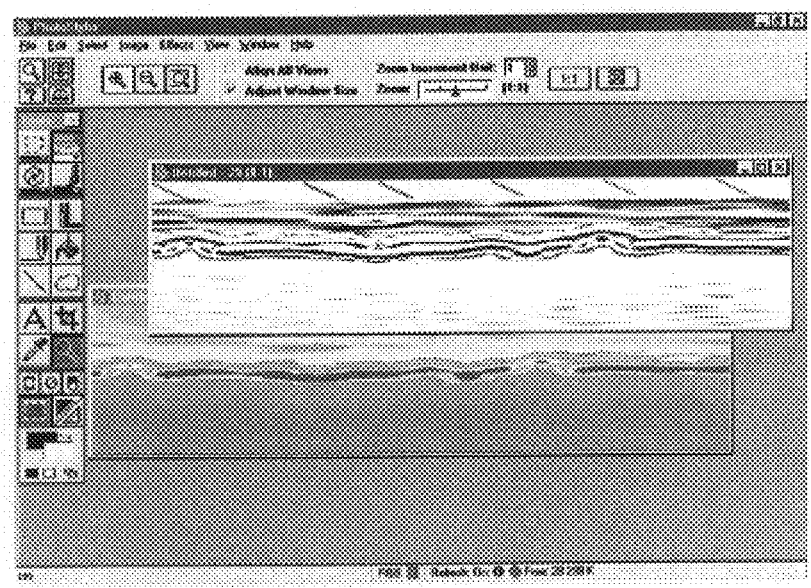
81
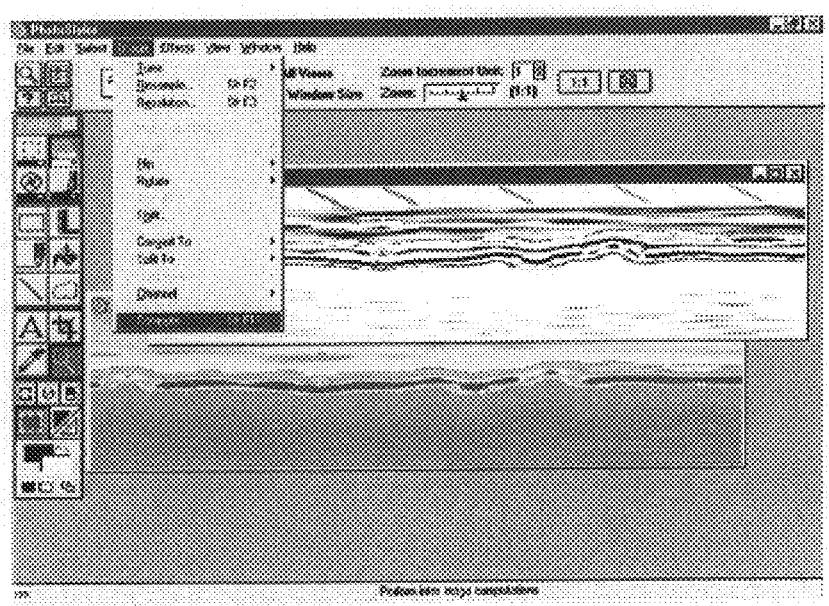

FIG. 61
82
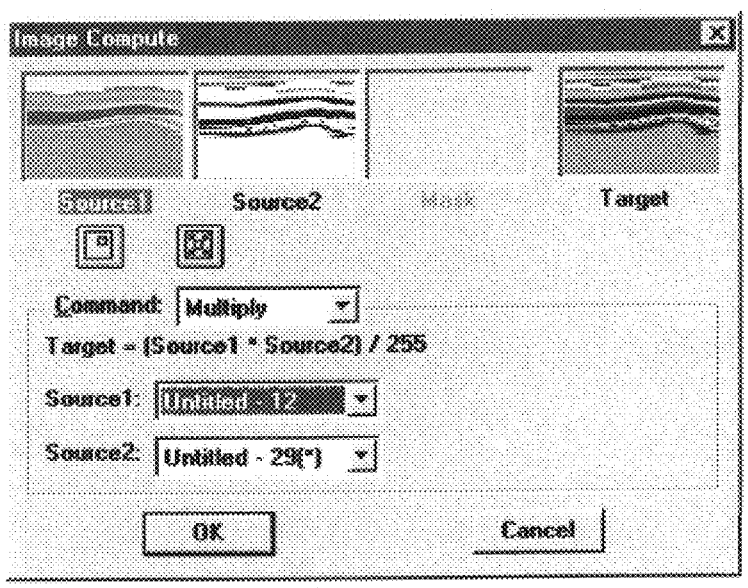
83
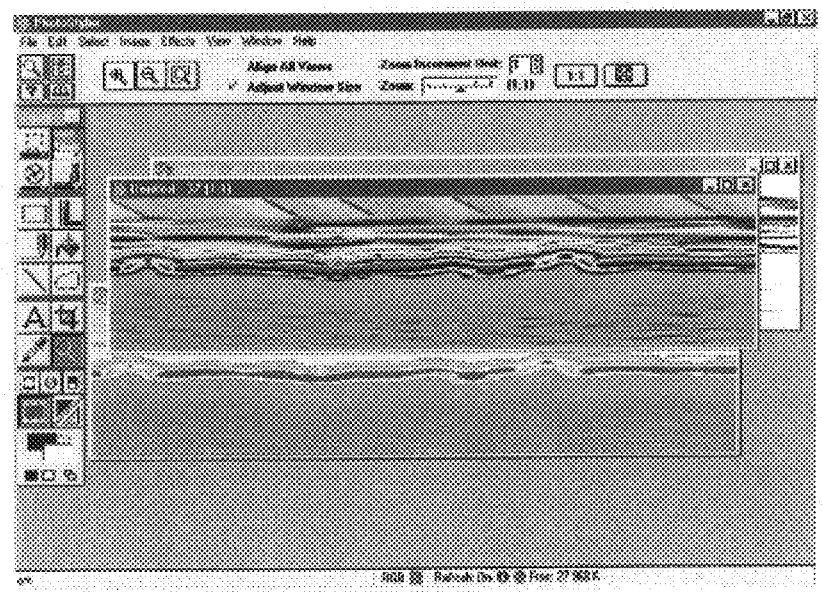

FIG. 62
84
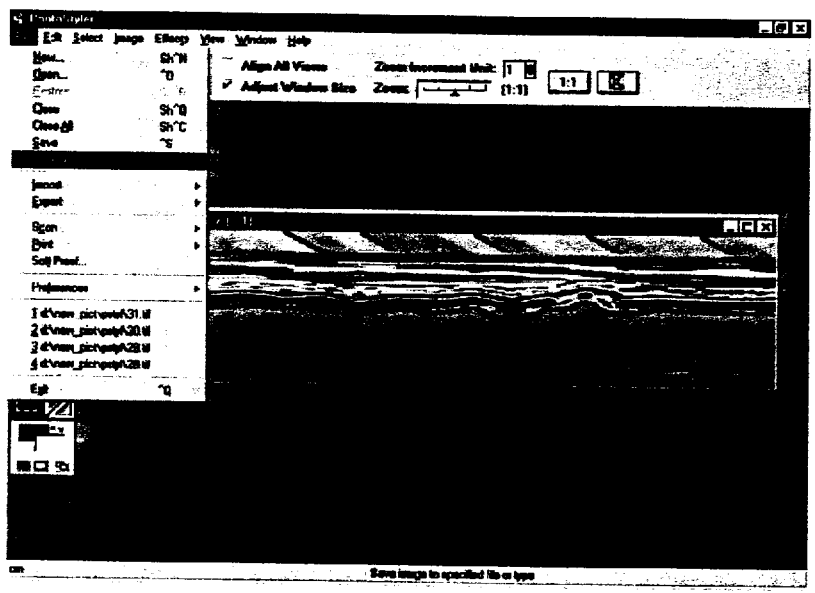
85
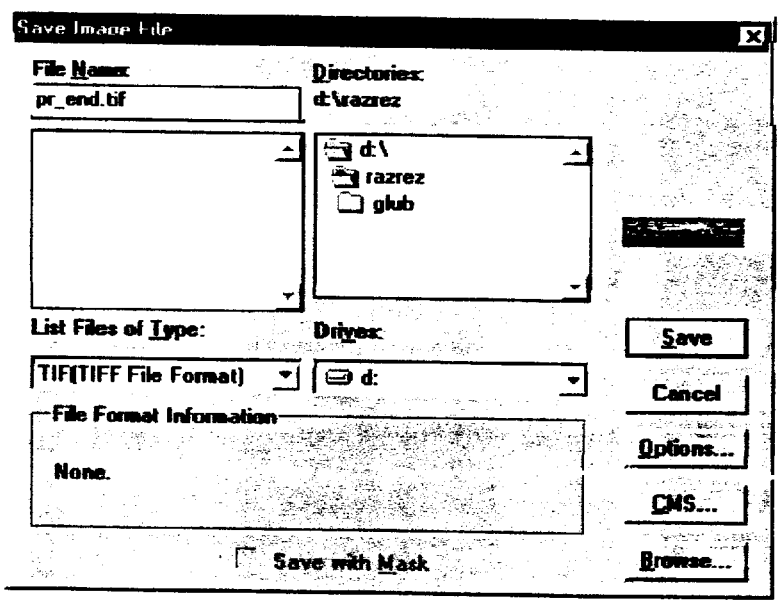

86

RESONANCE ACOUSTICAL PROFILING SYSTEM AND METHODS OF USING SAME

1.0 RELATED APPLICATIONS

This application claims the benefit of U.S. Provisional Application No. 60/086,839 filed on May 26, 1998.

2.0 BACKGROUND

In recent times, there is more and more a need for new, more accurate methods of geologic measurements, especially when the traditional methods of geophysical exploration are not accurate enough for given tasks. This is because different kinds of noises are naturally present at the area of measurement, which sometimes make it impossible to use the methods of the background art. These noises or disturbances have either a technical, industrial, or geological origin, for example: high levels of vibration, electromagnetic noises, and disturbances in the environment as well as noises of a geological character. Because these noises greatly interfere with geologic exploration in certain environments, there is a need for nonstandard techniques or technologies, which, if they do not completely solve these problems, allow for the solution of a much larger percentage of these problems.

3.0 SUMMARY

3.1 Opening

It is, therefore, the main object of the invention to provide a method which uses techniques and makes use of natural effects never before used. Considering such parameters as speed of measurement, efficiency, quantity of information obtained, accuracy, and cost, none of the methods of the background art can compare with the Resonance Acoustical Profiling (RAP) System and methods thereof.

The RAP system and method provides for the efficient solution of tasks in the areas of:

Search and exploration geology

Engineering geology and ecology

Glaciology

The mining industry

The RAP method possesses the following advantages:

Portable equipment (Its mass, with included power supply, is less than 6 kilograms.)

Fast measurement (the measurement cycle on location is less than one minute)

Provides for the study of geological sections to a depth of up to 300 m with a resolution of not less than 2.5% of that depth. For example, at a depth of 10 m, the Analog to digital conversion device can "see" objects which are as small as 25 cm.

The software performs:

Quality control of field measurements

Data analyses

Display of results of research on the computer screen in the form of color-shadow sections, reflecting the character of non-uniformity of structure of the studied geological environment. The results can be output in any user preferable form.

3.2 Contents

The RAP Equipment complex consists of a notebook computer in which resides a Fourier analysis program, an analog to digital conversion device, an external sensor, and an external 12 volt battery. The analog to digital conversion device is connected to the serial port of the notebook computer. The analog to digital conversion device consists of a signal amplifier, a power supply, and an A/D (Analog/Digital) converter which has been modified by replacing its quartz component with a frequency generator. The A/D converter which Applicant obtained and modified is the EZ-Kit Lite #2181 from Analog Devices Inc. The EZ-KIT Lite Reference Manual describes both the hardware and software of the A/D converter and is incorporated by reference. A description of the A/D Converter is incorporated by reference. An external sensor is attached by a cable to the input of the signal amplifier. A 12 volt power supply powers the signal amplifier, the modified A/D converter, and the notebook computer. In use, the external sensor is placed on the ground at the first location at which it is desired to take a reading. The ground is then lightly tapped in the near vicinity of the sensor either with one's finger or a hammer. This tap amplifies the naturally occurring vibrations of the various layers under the ground. These complex acoustical signal patterns can be measured by the RAP System. (As will be mentioned later, neither a tap with a hammer or with one's finger is needed. The RAP equipment can sense layer resonation even without such a tap.) The sensor picks up these complex acoustical signals from the resonating layers, passes them on to the signal amplifier which in turn amplifies these signals and passes them on to the modified A/D converter. The modified A/D converter converts these acoustical signals from analog form to digital form and passes them on to the serial port of the notebook computer which in turn creates a file of these digital signals. The sensor is then moved to the next location at which it is desired to take a reading, and the process is repeated until sufficient samples have been taken. The complex digital signal samples are then processed by a Fourier Analysis Program in the notebook computer, which resolves these complex signal patterns received from the various resonating layers of the earth into simple frequencies which are then used to create a profile of subsurface resonating layers.

The above features are objects of this invention. Yet further objects are as follows:

An object of the instant invention is to provide a Resonance Acoustical Profiling System that is simple in construction, strong and sturdy, lightweight, and easy to use.

A further object is to provide a Resonance Acoustical Profiling System that is economical in cost to manufacture and use.

A still further object is to provide a Resonance Acoustical Profiling System which requires a much lighter impact to be applied to the earth's surface than the impact required with the background art devices.

Still another object is to provide a Resonance Acoustical Profiling System which can be used in areas of high congestion and high levels of environmental noise.

A further object is to provide a Resonance Acoustical Profiling System which has a high level of accuracy and reliability.

Yet another object is to provide a Resonance Acoustical Profiling System which is small enough and light enough to be carried in a briefcase.

Still another object is to provide a Resonance Acoustical Profiling System which can resolve the complex signal patterns received from underground resonating layers into simple patterns which can then be used to construct a profile of those resonating layers.

These and other objects, features, aspects, and advantages of the present invention will become better understood with regard to the following description, appended claims, and accompanying drawings and will be otherwise apparent to those skilled in the art.

For the purpose of illustration of this invention, a preferred embodiment is shown in the accompanying drawings. It is to be understood that this is for the purpose of example only and that the invention is not limited thereto.

4.0 BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

FIG. 5A shows an enlarged view of dashed circle 5A of FIG. 5;

Figure 11:
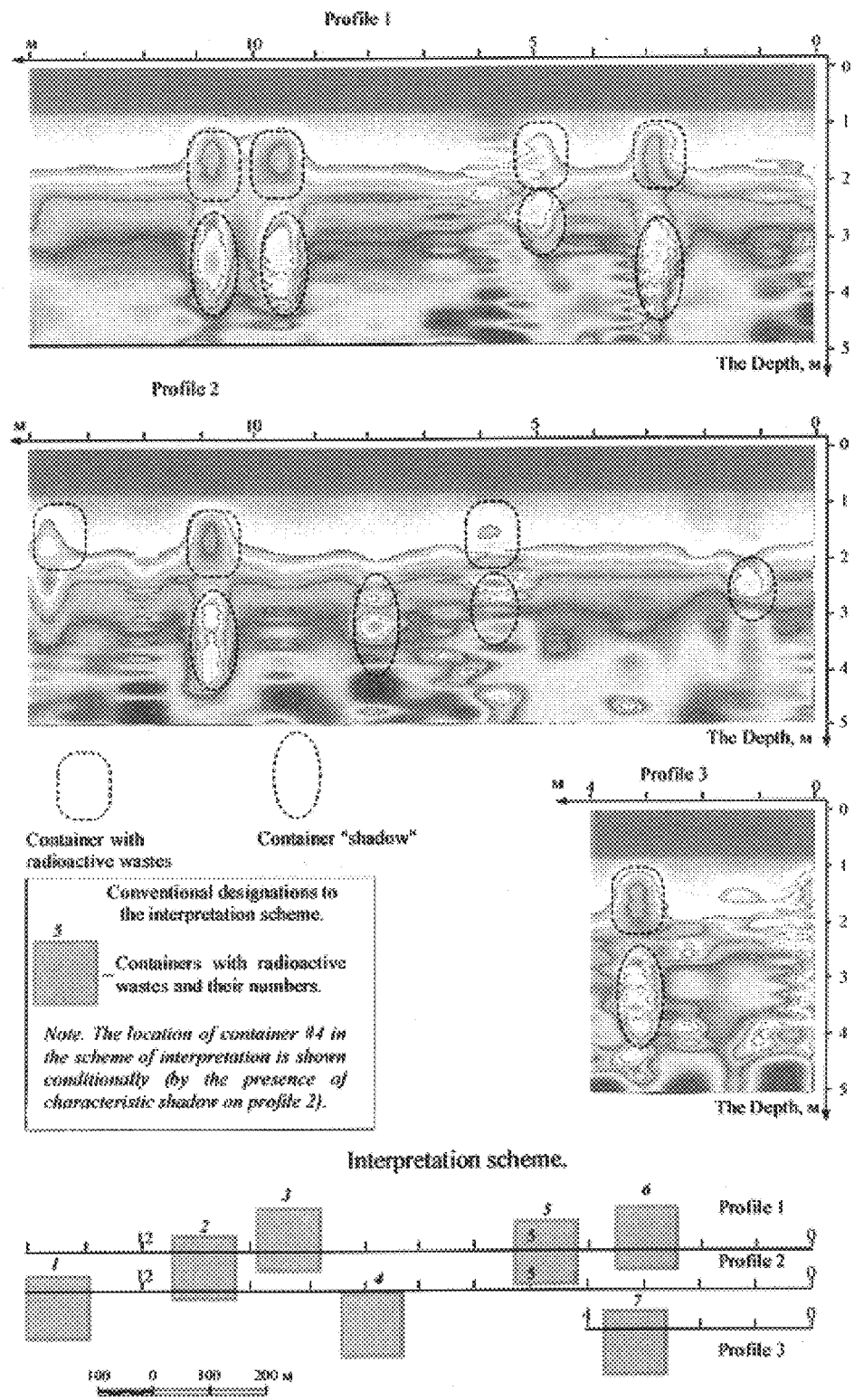

(The numbering of Figures begins again with FIG. 11. There are no FIGS. 8 through 10.)

FIG. 11 shows the results of the application of the RAP method applied to the search for tanks containing radioactive wastes; (FIG. 11 is a color photograph.)

Figure 12:
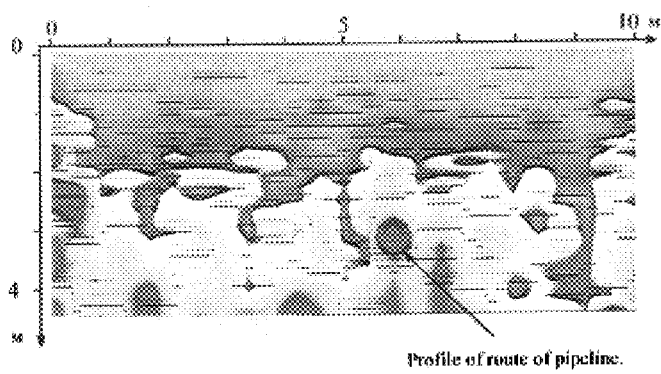

FIG. 12 shows the application of the RAP Method to the search for engineering communication pipe; (FIG. 12 is a color photograph.)

Figure 13:
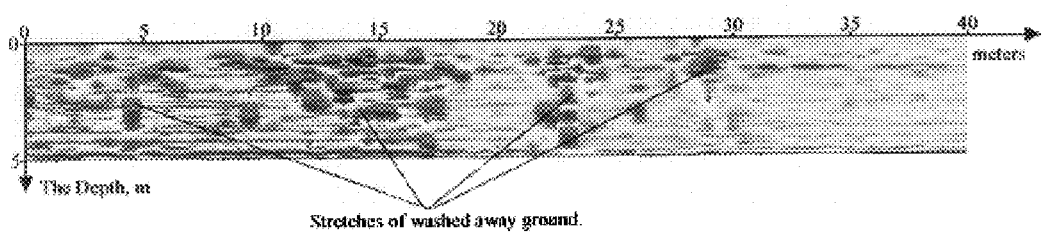

FIG. 13 shows the employment of the RAP method for the purpose of collecting data about a broken pipe; (FIG. 13 is a color photograph.)

Figure 14:
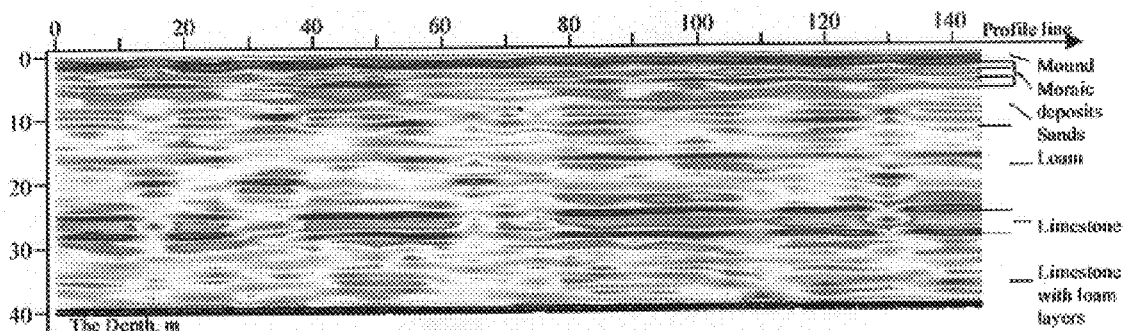

FIG. 14 shows the employment of the RAP method for the purpose of constructing buildings and underground structures; (FIG. 14 is a color photograph.)

Figure 15:
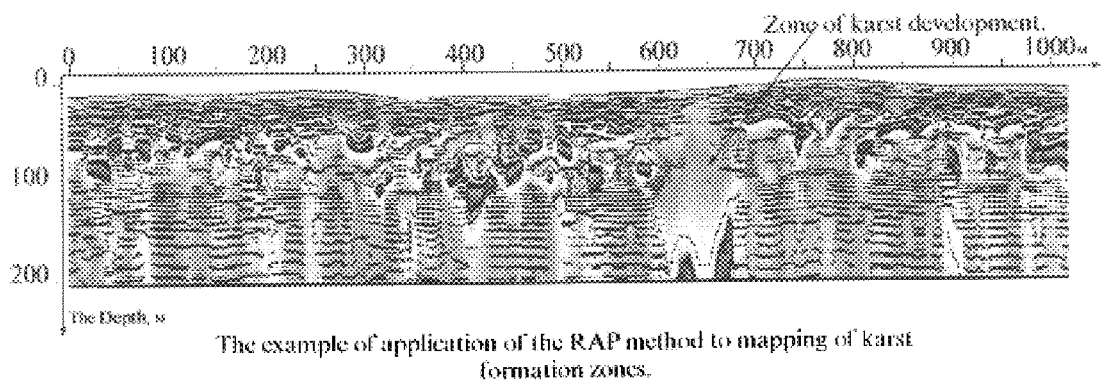

FIG. 15 shows an example of application of the RAP method to the mapping of karst formation zones; (FIG. 15 is a color photograph.)

Figure 16:
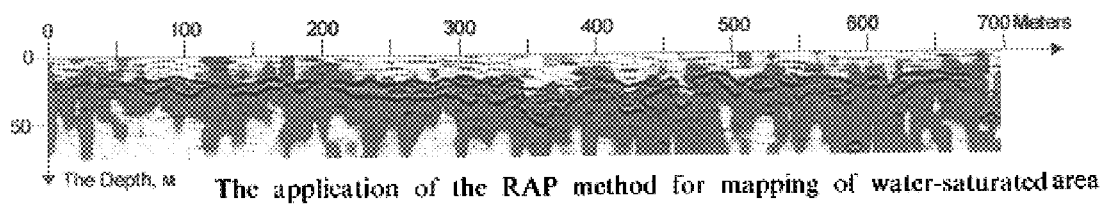

FIG. 16 shows the application of the RAP method for mapping of a water-saturated area; (FIG. 16 is a color photograph.)

Figure 17:
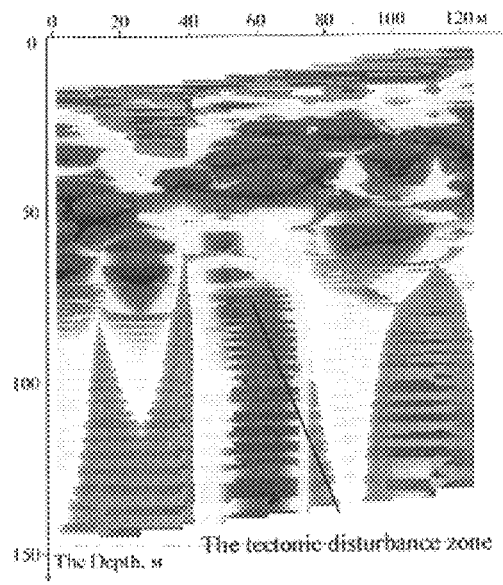

FIG. 17 shows an example of detection by the RAP method of a tectonic disturbance zone (Crimea); (FIG. 17 is a color photograph.)

Figure 18:
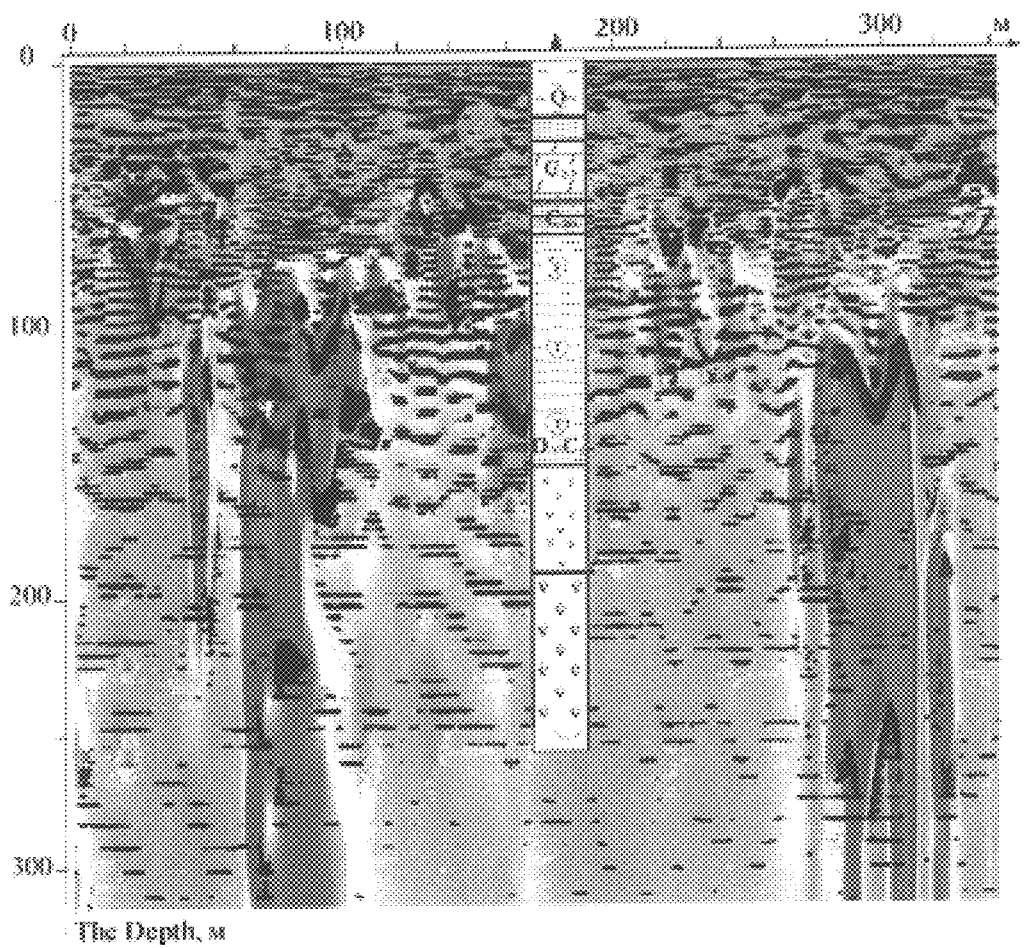
Figure 24:
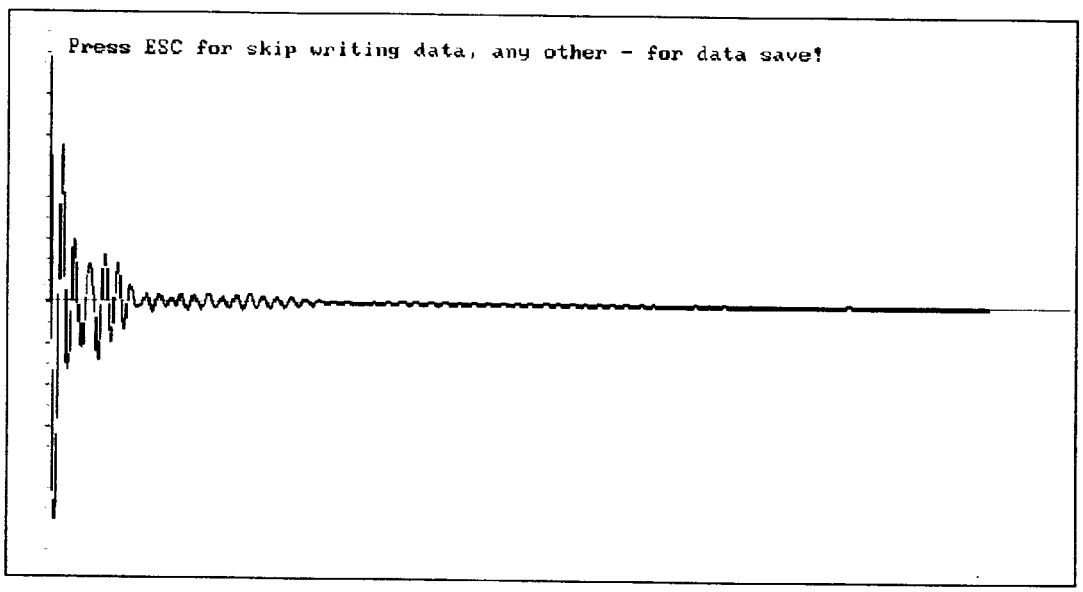
Figure 32:
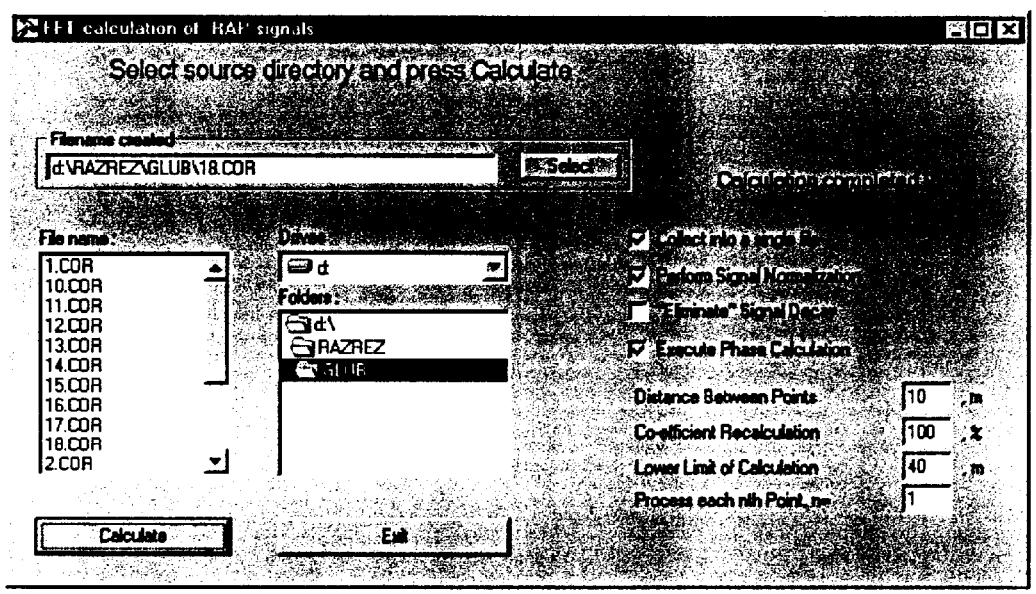

FIG. 18 shows the results of work carried out by the RAP method on the Kimberly pipe (Archangel province); (FIG. 18 is a color photograph.)

(The numbering of Figures begins again with FIG. 20. There is no FIG. 19.)

Figure 63:
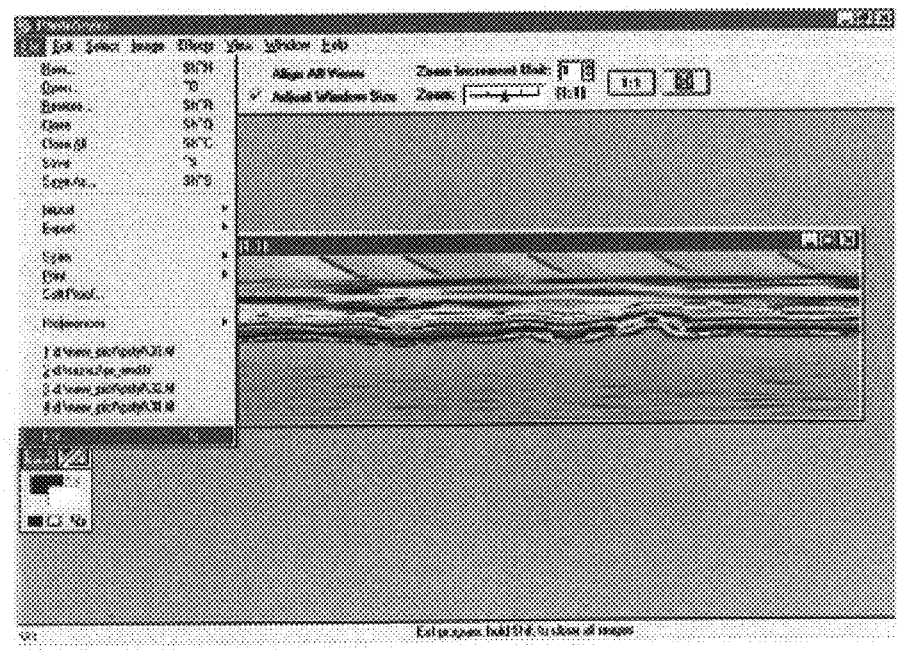

Screens 1 through 86 which are shown in FIGS. 20 through 63 show the outputs of the computer programs which are used to carry out the RAP process. (Screens 1 through 86 as originally output by the color printer are in color. Most of screens 1 through 86 are black and white reproductions of these color screens, but screens 42–45 (shown in FIGS. 41 and 42), 58 61 (shown in FIGS. 49 and 50), 64–65 (shown in FIG. 52), 70–75 (shown in FIGS. 55 through 57), 80–83 (shown in FIGS. 60 and 61), and 86 (shown in FIG. 63) are color reproductions of the original screens.)

5.0 DESCRIPTION

5.1 Definitions acoustic wave—A longitudinal wave. In common usage, it is restricted to fluids such as air, but it often includes P-waves in the solid earth.

diatreme—A breccia-filled volcanic pipe that was formed by a gaseous explosion.

ecology—The study of the relationships between organisms and their environment.

elastic—said of a body in which strains are instantly and totally recoverable and in which deformation is independent of time.

elastic discontinuity—A boundary between strata of different elastic moduli and/or density, at which seismic waves are reflected and refracted.

geophone—A seismic detector, placed on or in the ground, that responds to ground motion at its point of location.

geophysical exploration—The use of geophysical techniques—electric, gravity, magnetic, seismic, or thermal—in the search for economically valuable hydrocarbons, mineral deposits, or water supplies, or to gather information for engineering projects.

geophysics—Study of the earth by quantitative physical methods.

geostatic pressure—The vertical pressure at a point in the earth's crust caused by the weight of the overlying rock.

glaciology—The study of all aspects of snow and ice; the science that treats all processes associated with solid existing water.

gravity survey—Measurements of the gravitational field at a series of different locations. The object is to associate variations with differences in the distribution of densities and hence of rock types. Gravity data is usually displayed as Bouguer or free-air anomaly maps.

interference—The masking of a desired seismic signal by others arriving at very nearly the same time.

karst—A type of topography that is formed over limestone, dolomite, or gypsum by dissolution, and that is characterized by sinkholes, caves, and underground drainage.

layer—A bed or stratum of rock.

layering—A tabular succession of different components in igneous or metamorphic rocks, or the formation of layers in a particular rock. "Layering" is preferable to "banding" as it implies three dimensions rather than two.

magnetic prospecting—A technique of applied geophysics: a survey is made with a magnetometer, on the ground or in the air, which yields local variations, or anomalies, in magnetic-field intensity. These anomalies are interpreted as to the depth, size, shape, and magnetization of geologic features causing them.

electromagnetic prospecting—A geophysical method employing the generation of electromagnetic waves at the earth's surface; when the waves impinge on a conducting formation or ore body at depth, they induce currents that are the source of new waves radiated from the conductors and detected by instruments at the surface.

overburden—The upper part of a sedimentary deposit, compressing and consolidating the material below.

P wave—That type of seismic wave that involves particle motion (alternating compression and expansion) in the direction propagation. Sound waves are P waves. The P stands for primary; it is so named because it is the first arrival.

profile—In seismic prospecting, the data recorded from one shot point by a number of groups of detectors.

profile section—A diagram or drawing that shows along a given line the configuration or slope of the surface of the ground as it would appear if intersected by a vertical plane.

resolution—A measure of the ability of geophysical instruments, or of remote-sensing systems, to define closely spaced targets.

section—An exposed surface or cut, either natural (such as a sea cliff) or artificial (such as a quarry face) through a part of the earth's crust. It may be vertical or inclined.

seismic—Pertaining to an earthquake or earth vibration, including those that are artificially induced.

seismic detector—An instrument, e.g. a seismometer or geophone, that receives seismic impulses and converts them into electrical voltage or otherwise makes them evident.

seismic exploration—The use of artificially generated seismic waves in the search for economic deposits such as salt or oil and gas, or in engineering studies, e.g. determining the depth to bedrock. Syn: seismic prospecting seismic map—A contour map constructed from seismic data. Values may be in either time or depth; data may be plotted with respect to the observing station (producing an "unmigrated map") or with respect to the subsurface reflecting or refracting locations (a "migrated map").

seismic method—A method of geophysical prospecting using the generation, reflection, refraction, detection, and analysis of elastic waves in the earth.

seismic record—In geophysical prospecting, a photographic or magnetic record of reflected or refracted seismic waves.

seismic shooting—A method of geophysical prospecting in which elastic waves are produced in the earth by the firing of explosives.

seismic surveying—The gathering of seismic data from an area; the initial phase of seismic exploration.

seismic wave—A general term for all elastic waves produced by earthquakes or generated artificially by explosions. It includes both body waves and surface waves.

spectrum—An array of intensity values ordered according to any physical parameter, e.g. energy spectrum.

stratification—The arrangement of sedimentary rocks in strata.

stratum—A layer of sedimentary rock, visually separable from other layers above and below; a bed.

streak—The color of a mineral in its powdered form, usually obtained by rubbing the mineral on a streak plate and observing the mark it leaves. Streak is an important characteristic in mineral identification.

survey—The process of finding and delineating the physical or chemical characteristics of the earth's surface, subsurface, or internal constitution by topographic, geologic, geophysical, or geochemical measurements; esp. the operation of determining the relative positions of points on, above, or beneath the earth's surface.

tectonic—Pertaining to the forces involved in, or the resulting structures of.

terrigenous deposit—Shallow marine sediment consisting of material eroded from the land surface.

5.2 Overview

Physical Principles of RAP

RAP uses that part of the seismic signal that the background art seismic methods consider noise. Although, like the background art methods, an impact may be imparted to the earth as part of this method, strictly speaking, due to the sensitivity of the equipment, it is not necessary to impart such an impact to the earth in order receive information about subsurface resonating layers and signals. Without wishing to be bound by theory, it is believed that our equipment is actually measuring the resonating frequencies that are constantly active for the purpose of measurement. In other words, our equipment permits us to make measurements without having first imparted an impact to the earth's surface. Factors that we think may give us a chance to see these resonances are:

pressure between layers gravitational pull

The foundation of the RAP method is the study of the sum of natural frequencies within the spectrum of measurement. In order to have those frequencies more powerfully resonating, it helps to make an impact that will "wake up" the various layers below the earth for the short duration of the measurement. But, as mentioned above, this impact is not necessary.

Every component of the registered spectrum gives information about particular subsurface boundaries. The frequency of every component of the spectrum is inversely proportional to the thickness of the various "extended layers" below the earth's surface.

By a layer we mean a region of earth with substantially uniform mineral and chemical composition.

By a boundary, we mean the interface between two layers characterized by a significant change of the structure or change of the contents of the structure. A point is considered strong if it resides within the layer and is not in the vicinity of a crack in the layer. A point is considered to be weak if it lies on the boundary between two layers or lies on a crack in that layer. The layer itself is structurally strong, but the boundary between layers and cracks within the layer are areas of structural weakness.

The contents of a layer is being visualized by representation of strength and weakness points within the layer. In other words, there are variations of density at strength and weakness points. Points at cracks and at the boundaries between layers have relatively low density. Points in areas within the layers have relatively higher densities, and structural variations of the density.

If there is no rapid or abrupt change of density, then there are no significant strength and weakness points to be visualized by our technology. But when there is a rapid or abrupt change of density, this will be shown by the displays generated by the RAP method.

If we have all of those cracks visualized in the form of an image, that means that all of neighborhood particles were big enough to create their own resonant frequencies. Those frequencies in their amplitude are strong enough to be sensed at the surface.

By the term strength and weakness points, we mean significant change of the strength of the structure.

The technology represents visualization of strength and weakness points between particles.

A particle is an underground formation big enough to create its own resonant frequencies and is characterized by uniformity of the structure.

By the term "extended layer", it should be understood as all the ground below the earth's surface which extends down to and completely through the layer of interest.

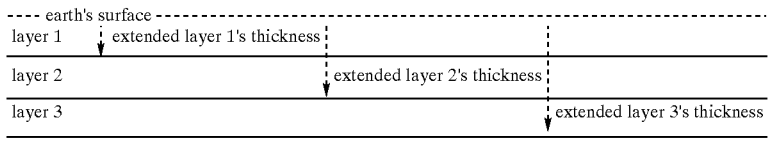

The resonant frequency of a subsurface point is inversely proportional to the depth of that point below the surface of the earth. It has been determined that the resonant frequency of a given point, n, is given by the equation:

$$H_n = (1/f_n)*(2500 \pm 250)$$

Where $H_n$ is the distance of a point, n, below the surface of the earth. $H_n$ is measured in meters.

$f_n$ is the resonant frequency of that point. $f_n$ is measured in Hertz.

Within the ground and in all layers of the ground and within the layers themselves, there are mechanically soft and hard structures. Those structures resonate differently. The weaker the mechanical contact between layers is, the stronger the spectral amplitude of the signal will be. Within the layers, there are various areas of weak and strong mechanical contact which will have an effect on how the layers resonate. The RAP method can distinguish between these areas and can show the outlines of these areas.

The Specification of Interpretation of RAP Results

As has been shown above, unlike the background art methods of seismic exploration, we do not rely on measuring losses in sound traveling through the different layer structures and the round-trip times of those traveling signals. Also our method is not affected by the hardness of the rock between the surface and the layer of interest, because loss of signal strength does not affect the results obtained by our method. Thickness, solidity, strength, and compactness do not affect the results obtained by our method.

What can be seen with the RAP method are all the various structural properties and characteristics of the layers including areas of weakness and strength.

For example, differences between layers can be described as:

sudden variation in types of structures, such as between sand and rock.

tectonic permanent shifting streaks of various kinds

One of the great achievements of the RAP method is the very accurate pinpoint-like results of the measurements due to using a vertical pattern of measuring procedure. In other words, we have a very narrow vertical pattern at the point of measurement. And the same point that was used for a particular measuring task is exactly the point of receiving results.

Peculiarities of Equipment

The above described physical principles of RAP define the parameters of the applied equipment, the functional purpose of which is to record the acoustical signal with conservation of all its spectral peculiarities and to further spectrally analyze the recorded signal.

The RAP equipment consists of a sensor of acoustic vibrations of a special design, an analog to digital conversion device and a personal computer of the notebook type. The sensor transforms acoustical vibrations to analog signals. The sensor has as a main element a piezo-crystal element employed for this purpose.

The analog to digital converter in the analog to digital conversion device, designed for carrying out the RAP method, is characterized by high sensitivity, and linearity over the measured range, permitting the transforming of all the information, contained in the received signal, into digital form. The spectral components of a signal can be resolved on the spot at the place where the measurements were obtained or in a post-processing mode.

The program in the notebook personal computer of the RAP hardware-software system is used to perform such functions as:

controlling the parameters of signal registration such as signal amplitude and sampling frequency for the purpose of acceptance of parameters.

recording the acoustic signal;

editing the information on-the-spot and forming a data file;

efficiently processing and displaying the results of measurements at a given location, and after finishing the work on a profile, displaying the profile data, which allows one to determine the necessity for retrieving more details about a particular profile or a portion thereof.

Methodology of Performance of RAP

As has been shown above, the RAP measurement equipment consists of a sensor of acoustic vibrations, an analog to digital conversion device and a personal computer. In one mode of operating the RAP method, the source of impact is a tap on the ground with a hammer or even a slight tap with one's finger (not needing a powerful source of sound impulse is one of the special features of RAP). Experience has shown that only a slight tap with a hammer on a given spot is required to obtain information about the structural characteristics of a layer to a depth of 300 m. This might be considered unusual; but if one considers the physical essence of resonance phenomenon, it appears that there is nothing beyond comprehension in this RAP phenomenon, because, due to resonance phenomena, the amplitude of the signal response, as a rule, is almost as large as the amplitude of the impulse provided by the hammer impact. But, it has been discovered that a hammer tap is not even needed. The RAP equipment can sense layer resonation even without such a tap by either one's finger or with a hammer.

There is a dependency between the optimal distance between two measurement points and the depth of the object or structure we are trying to detect and measure. The deeper the object is below the earth's surface, the further apart the measurement points should be. This is because, if an object is deep in the earth (300 m deep, for example), and the measurement points are spaced too closely together, the upper layers of ground would yield so much information that this part of the picture would not be readable.

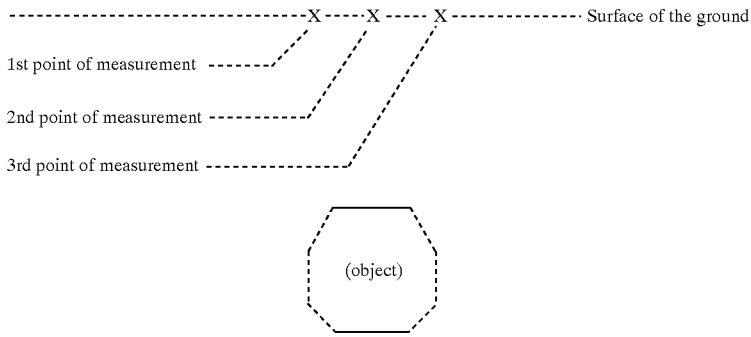

where the X's represent the points at which measurements are taken.

Before starting to perform the work, the following steps should be carried out:
1) Find out all already known information about the geological structures of the terrain.
2) Perform the test of measuring the best known part of the terrain and examine the results:
   a. Select the straight line path along which measurements should be taken. Then determine the actual points at which measurements should be taken (the line of points).
   b. Perform several measurements along the line of points, selecting different sampling frequencies for the analog/digital converter. Interactively input frequency values into the computer. The computer controls the frequencies used by the modified analog/digital converter. The following chart suggests the frequencies to use for objects suspected to be at the depths given in the table:

| Depth (m) | Frequency (Hertz) |
|---|---|
| 0.12–5 | 48000 |
| 0.5–15 | 8000 |
| 1.0–70 | 4000 |
| 5.0–300 | 1000 | c. By analyzing components of the measurements, choose the best performing sequence. To analyze components of the measurements, perform the following steps:
      i. Take data from the laptop computer that came from the modified A/D converter.
      ii. Using the notebook's computer program, perform spectral analysis of the data.
      iii. Print out the results (or analyze the data right from the screen)
      iv. Choose the optimal result and follow the sequence that gave this result for the purpose of the real measurements. The optimal result is the one in which the outlines of the objects are the most distinct.

The procedure for obtaining the real measurements is the same as steps i through iv under step 2c.

Comparison of the Work Assignments Carried Out by the RAP Method With Those Carried Out Using Classical Geophysical Methods One of the distinctions of the RAP method from existing geophysical methods is its high accuracy. The depth which an object can lie below the surface and information about it be successfully obtained varies from about 12 cm to about 300 m. At the depth of a few meters below the ground, an accuracy to within several millimeters can be obtained.

As has been already said, the RAP method gives information about the geo-mechanical properties of an object, and thus RAP results do not depend on such physical features of an object as its density, magnetic sensitivity and resistivity, which permits us to perform the work in various situations where standard geophysical methods do not perform properly. The physical principles of RAP and the design peculiarities of its equipment makes it possible to carry out the work virtually regardless of the level of existing vibrational and electromagnetic interference, which again shows the advantage of the RAP method over standard geophysical methods (which, for example, cannot be practically carried out in the conditions of a city environment due to noise and congestion).

The physical principles of RAP and the peculiarities of the existing software exclude the influence of human interpretation on the results of the work, which is a disadvantage of most classical geophysical methods. The interpretation of results using the RAP method gives you the only way to understand, for example, that there is a pipe at a depth of 5 meters. Other methods such as magnetic prospecting may give you a depth of 6 meters or 4 meters, depending on the interpreter of the data. The background art methods closest to RAP are the methods of seismic exploration but unlike them, RAP does not require explosives (a mere tap on a hammer will do, and, even this is not necessary), and a team of two people can perform all the work.

The cost of using the RAP method is relatively similar to the cost of using electro-search methods (those methods which use electrical and electromagnetic techniques) and is significantly lower than the cost of gravitational methods and seismic methods.

The results of experimental and industrial work by the RAP method confirm its high efficiency in the solution of different tasks. The methods of Resonance Acoustical Profiling can be applied by themselves as well as in conjunction with other geophysical methods.

Figure 1:
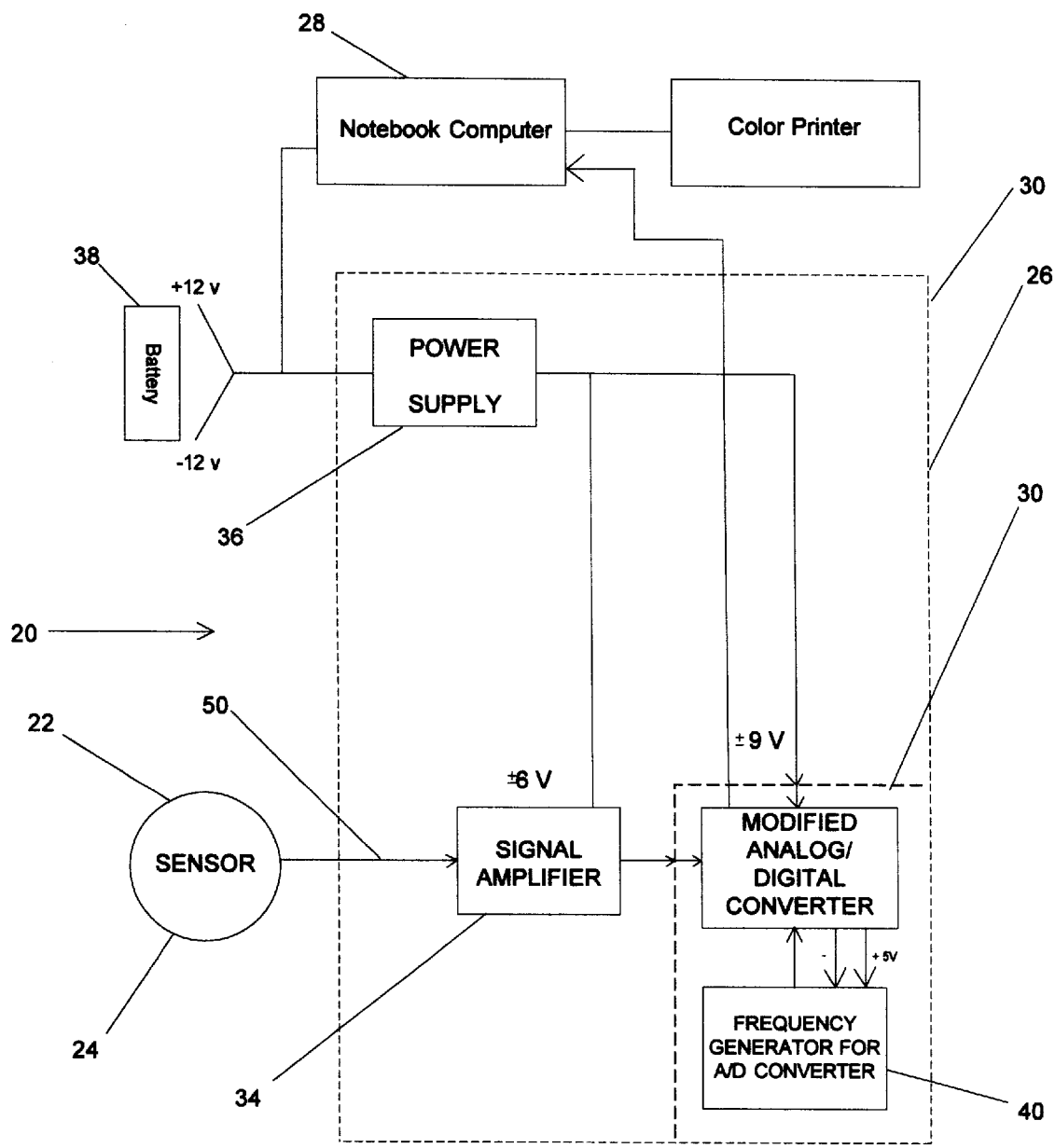
FIG. 1 shows an overview functional block diagram of the Resonance Acoustical Profiling System.

5.3 Detailed Description of the Elements
5.3.1 Description of the Resonance Acoustical Profiling System Turning now descriptively to the drawings, in which similar reference characters denote similar elements throughout the several views, FIG. 1 illustrates the overview functional block diagram of the Resonance Acoustical Profiling System.

The Resonance Acoustical Profiling System for conducting a geophysical survey, generally shown by reference numeral 20, consists of a sensor 22, preferably a piezo sensor 24, for receiving seismic signals from the ground, an analog to digital conversion device 26 in communication with the sensor 22, and a computer 28 having a recording program for storing time/amplitude samples from the signals received from the analog to digital conversion device 26, a Fourier analysis computer program for performing a Fourier analysis of the frequency spectrum and the phase shifts of the path points, and for computing spectral profiles of the underground, an image building program for creating an image file from the output file of the Fourier analysis program, and a graphics program for displaying and printing a profile of underground layers. The preferred printer is a color inkjet or laser printer 68.

The analog to digital conversion device 26 has a housing 30 which contains a modified analog to digital converter 32, an amplifier 34, and a power supply 36. The power supply 36 receives power from an external battery 38 and powers the amplifier 34 and the modified A/D converter 32. The function of the modified analog to digital converter 32 is to convert the seismic signals from analog to digital form. The modified analog to digital converter 32 is a stock or off-the-shelf analog to digital converter (shown generally as 31 in FIG. 6) which has been modified by replacing its quartz resonator 39 with a frequency generator 40. The function of the frequency generator 40 is to determine the frequency with which the modified analog to digital converter 32 samples the analog signal from the sensor 22. The frequency generator 40 has a quartz resonator 42 which, preferably, resonates at a frequency of no more than 3 MHz in order that depths below surface as deep as 10000 m can be determined.

In an alternate embodiment, the analog to digital conversion device 26 is an A/D Converter 44 (FIG. 7) with a 3 MHZ quartz resonator 46 so that depths below surface as deep as 10000 m can be determined.

The recording program stores time/amplitude samples from the signals received from the analog to digital conversion device. Each file of time/amplitude samples comprises one path point.

Preferably the frequency range of the sensor's sensitivity is a minimum of 0 to 50 KHz.

Preferably the modified A/D Converter 32 has sampling frequencies of 976.5625, 3906.25, 8000, and 48000 Hz, and has a memory of sufficient size to store enough sample frequencies to constitute one path point.

The sensor 22 is attached to the amplifier port 48 of the analog to digital conversion device 26 via an electrical wire or cable 50. The function of the amplifier 34 is to amplify the seismic signals received from the sensor 22 and to supply the modified A/D digital converter 32 with these amplified seismic signals. Preferably, the output from the amplifier 34 is a maximum of ±3 volts.

Figure 2:
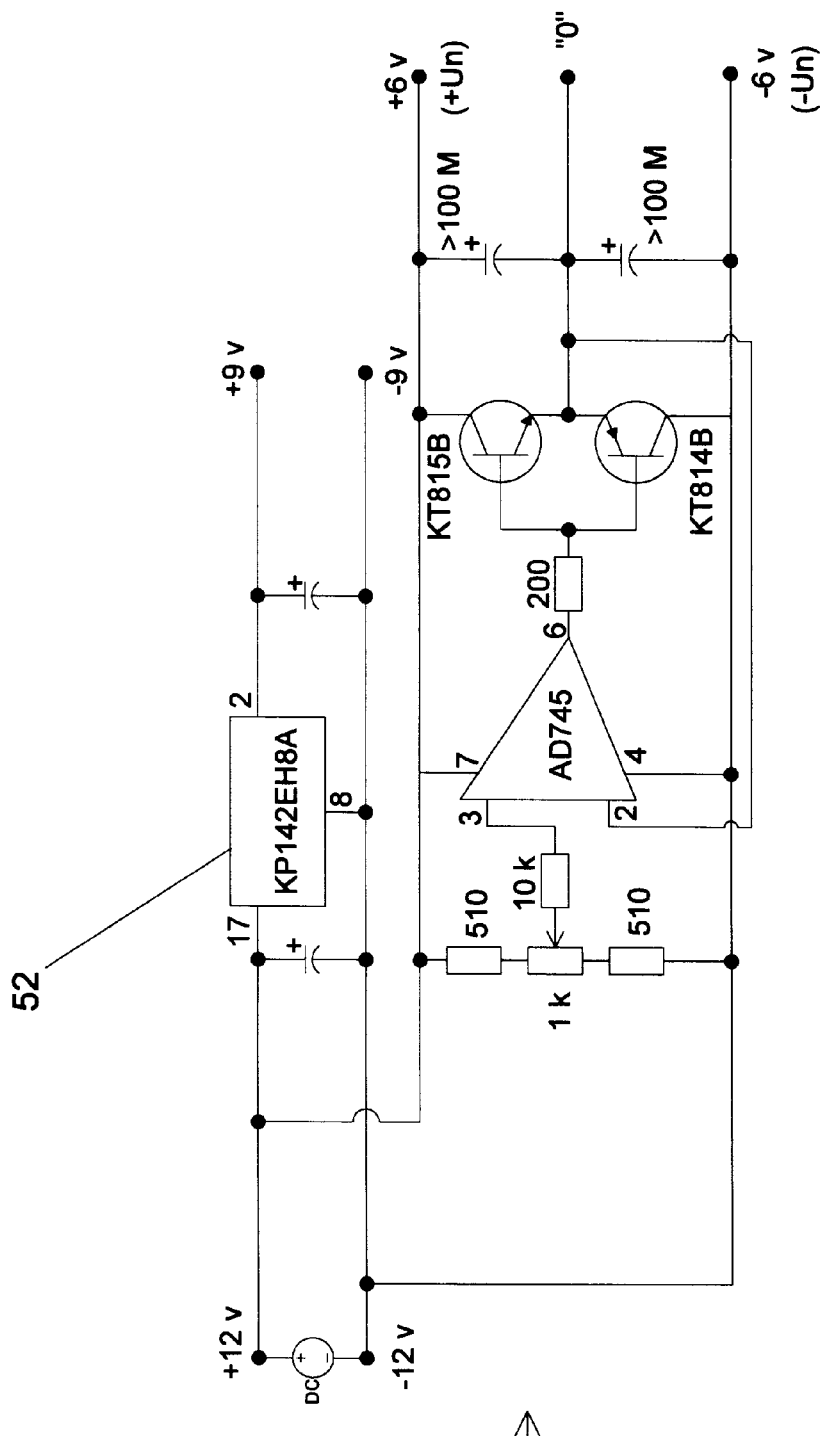
FIG. 2 shows a schematic diagram of the Power Supply.

FIG. 2 shows a schematic diagram of the power supply 36. Device KP142EH8A 52 is a stabilizer. This stabilizer stabilizes the voltage at 9 volts. This electronics gives a steady voltage and current environment of 0 in respect to −6 volts and 0 in respect to +6 volts for the purpose of powering up the electronics.

Figure 3:
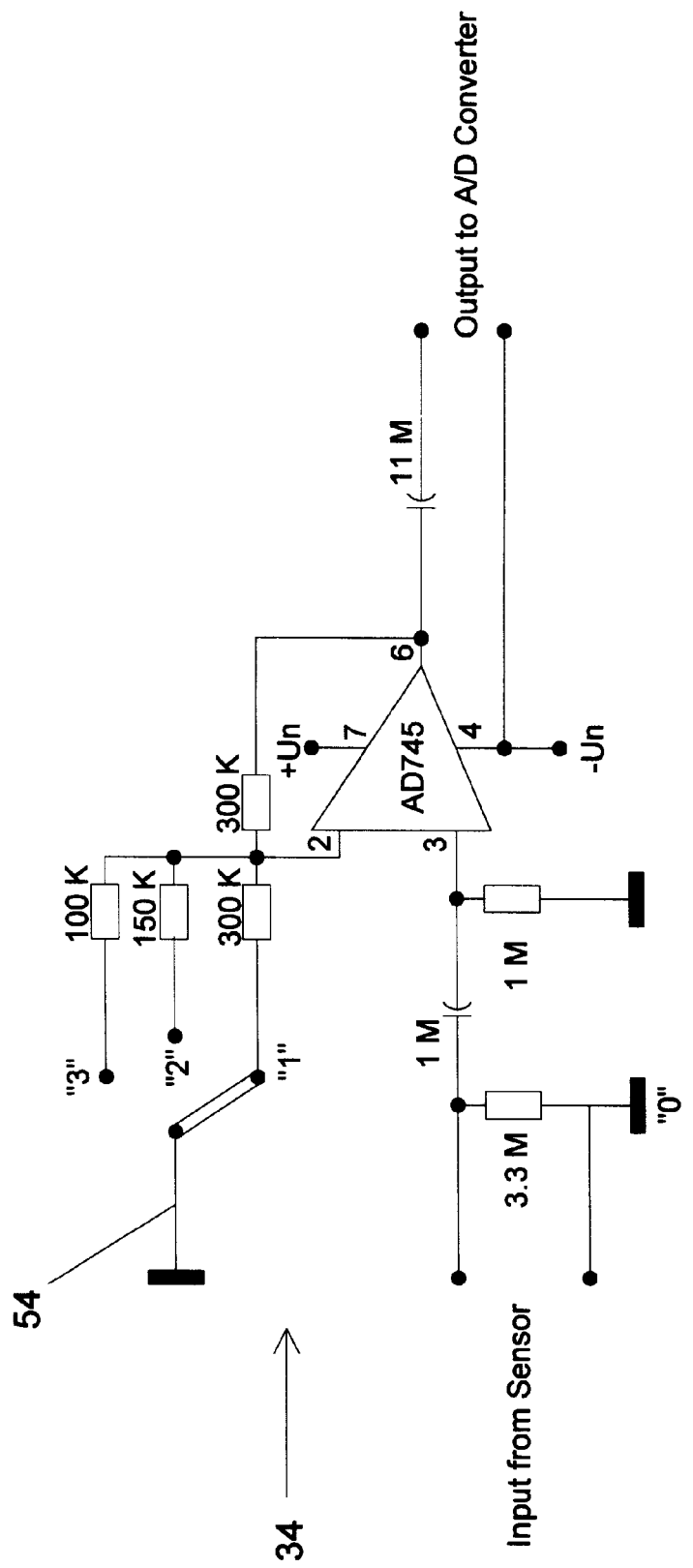
FIG. 3 shows a schematic diagram of the Amplifier.

FIG. 3 shows a schematic diagram of the amplifier 34. The amplifier 34 amplifies the signal. The switch 54 regulates the amplification. If the measured signal is too strong or too weak, the proper level of amplification can be selected.

Figure 4:
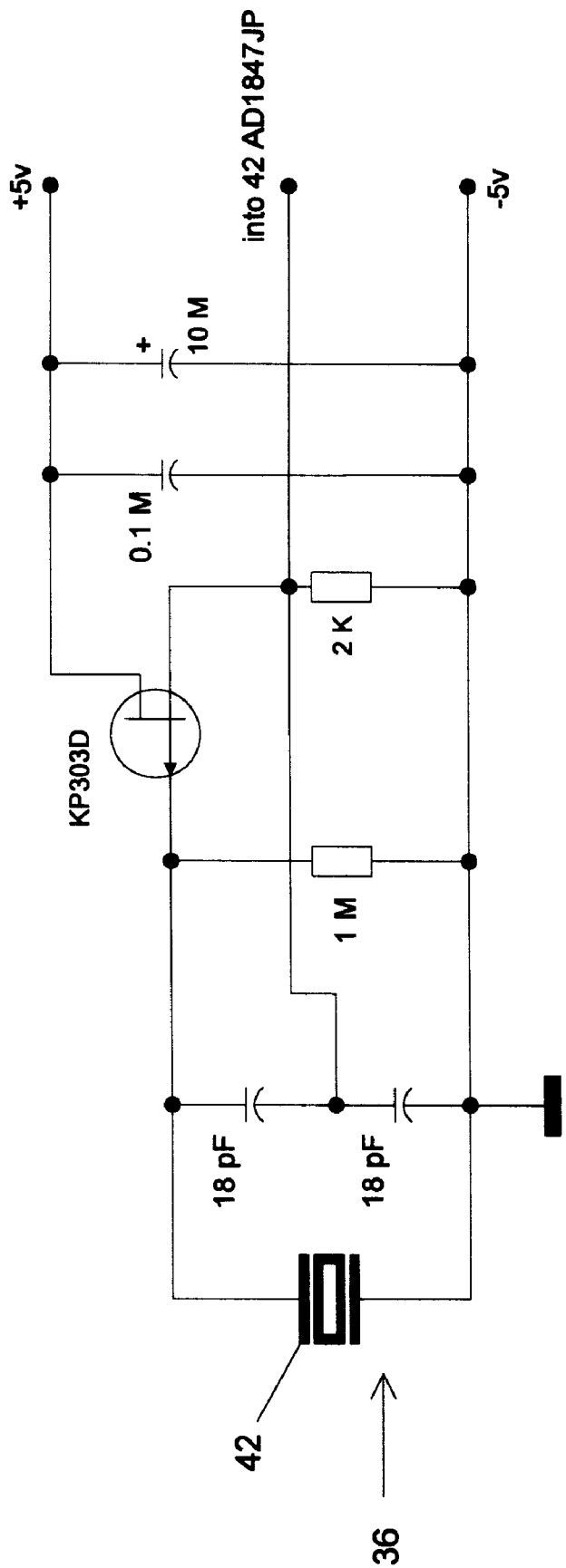
FIG. 4 shows a schematic diagram of the frequency generator for the modified A/D converter.

FIG. 4 shows a schematic diagram of the frequency generator 40 for the modified A/D converter 32.

Figure 5:
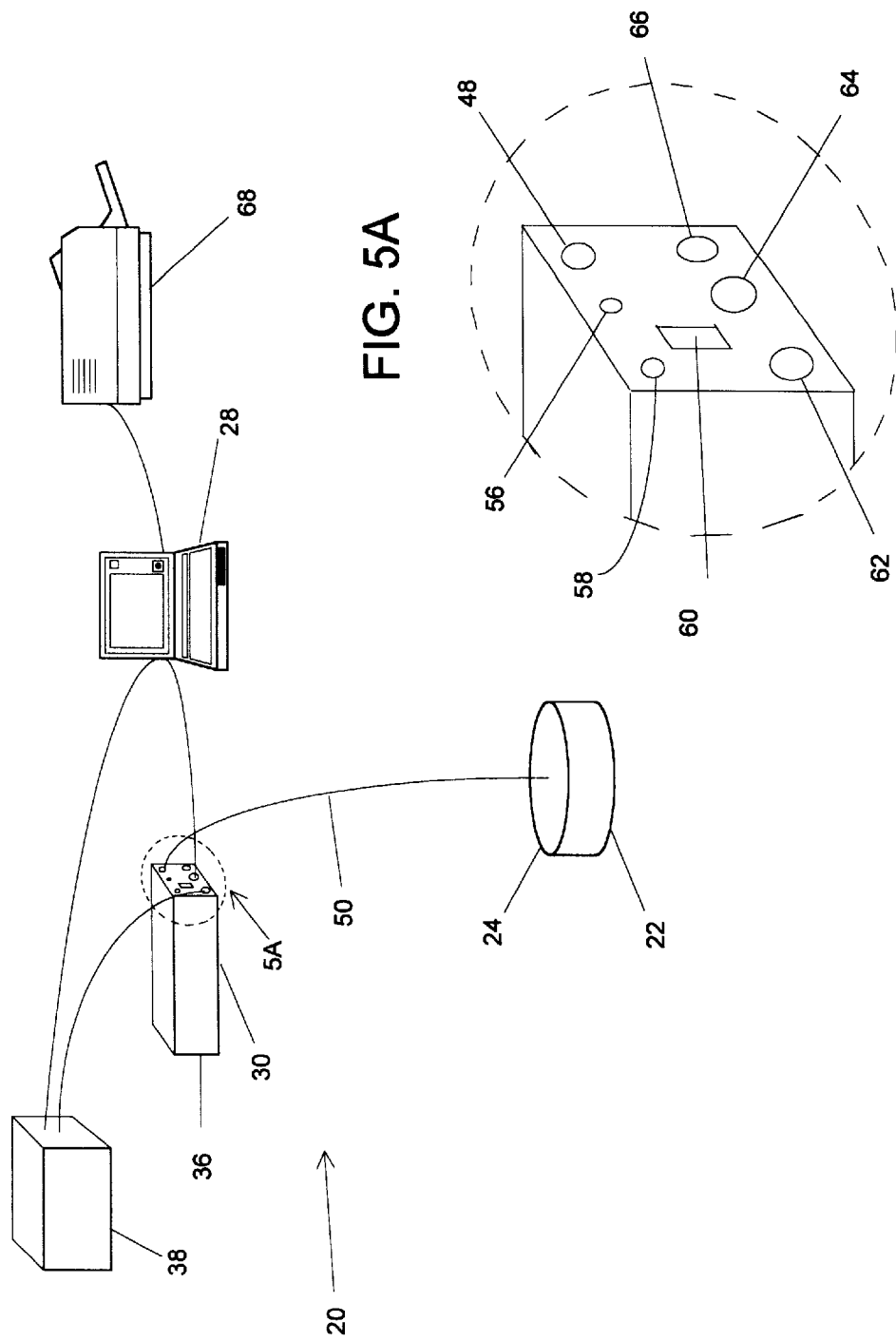
FIG. 5 shows a diagrammatic representation of the Resonance Acoustical Profiling System.

FIG. 5 shows a diagrammatic representation of the Resonance Acoustical Profiling System.

FIG. 5A shows an enlarged view of dashed circle 5A of FIG. 5. FIG. 5A shows the Indicator of Received Signal Light 56, The Power Light 58, On/Off Switch 60, Power Port 62, Computer Connection 64, and Sensitivity Adjuster 66 of the analog to digital conversion device 26.

Figure 6:
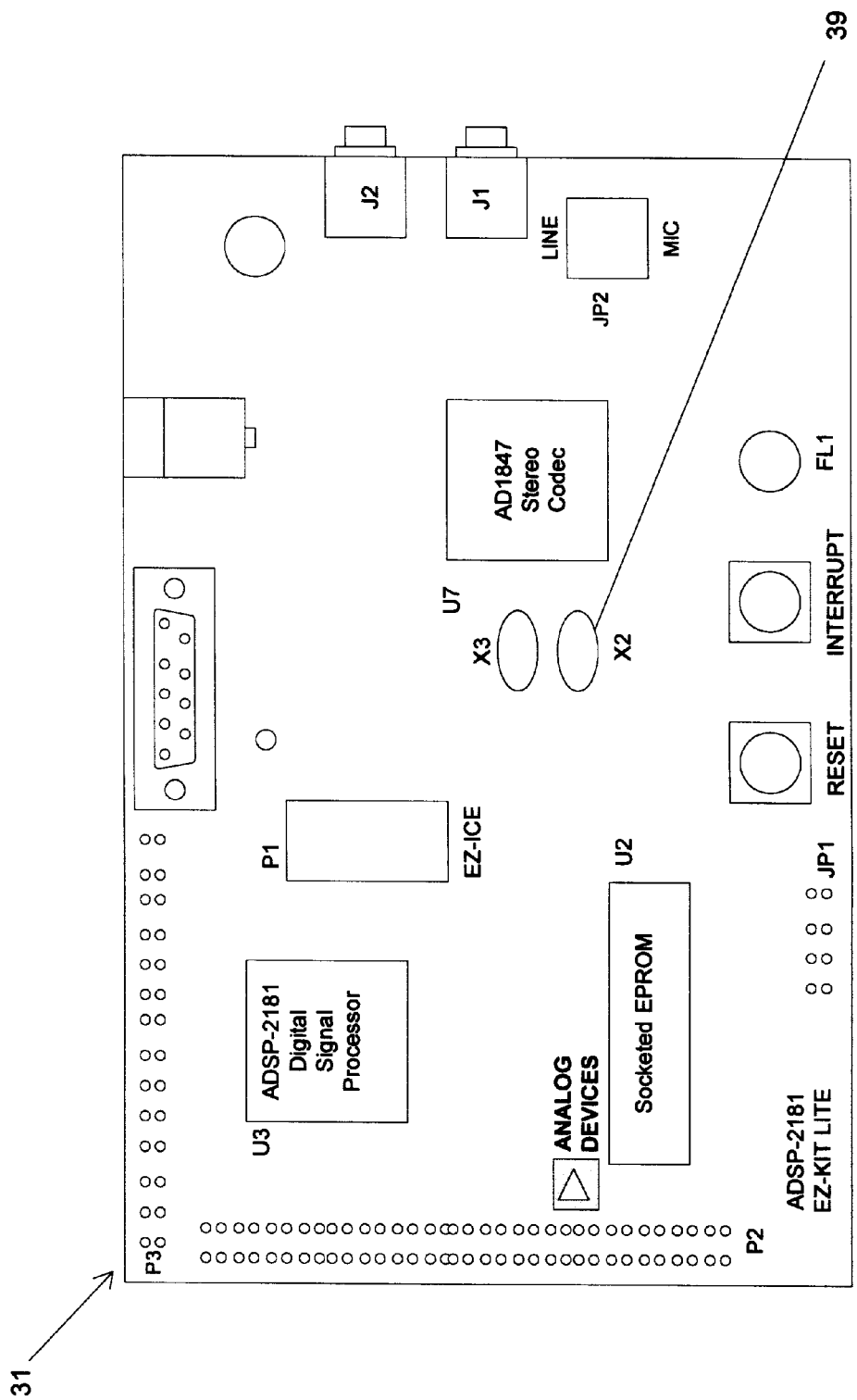
FIG. 6 shows a simplified diagrammatic representation of a stock or off-the-shelf A/D Converter.

FIG. 6 shows a simplified diagrammatic representation of a stock or off-the-shelf A/D Converter. Its quartz component is shown as 39.

Figure 7:
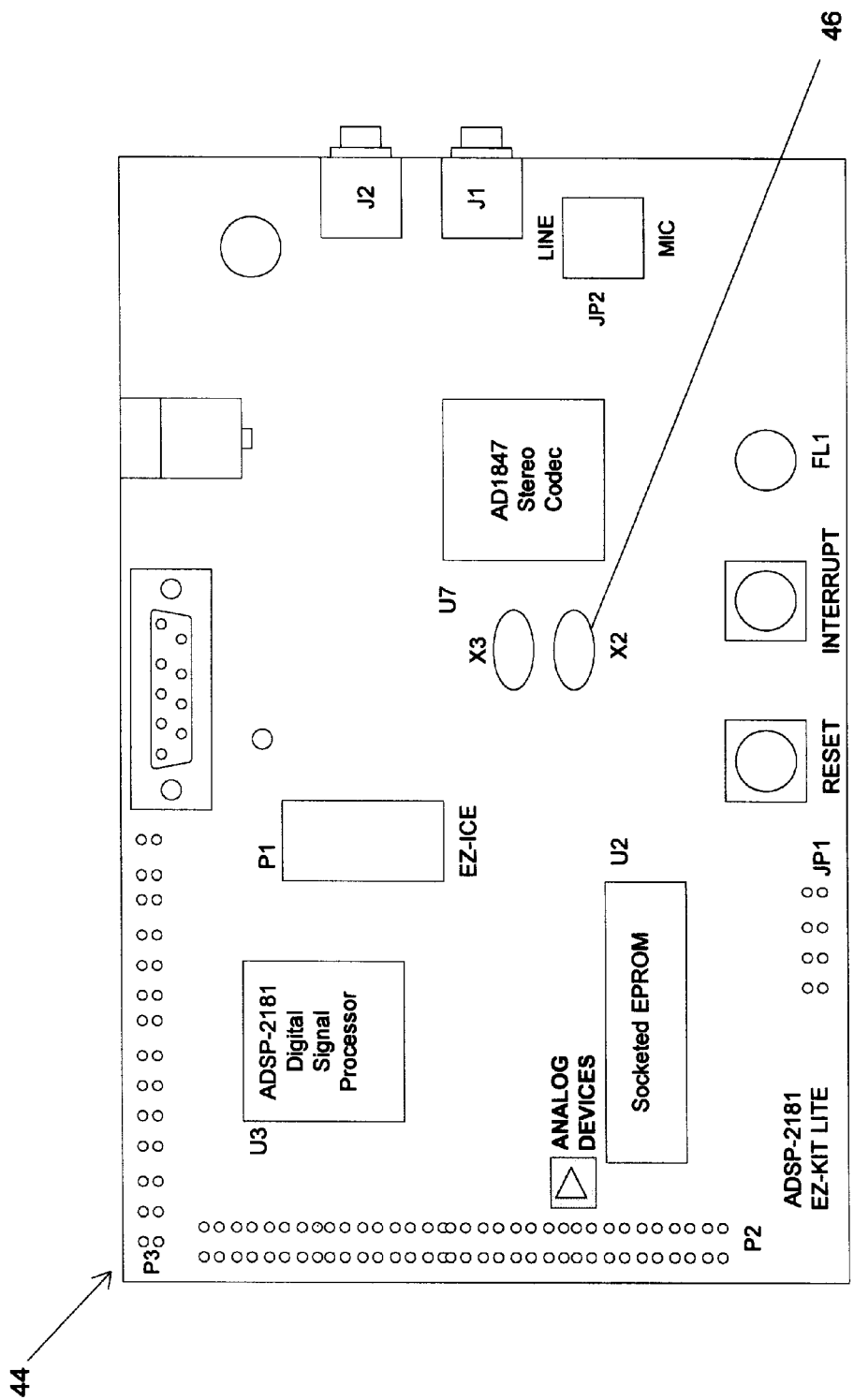
FIG. 7 shows the simplified diagrammatic representation of an A/D Converter of an alternate embodiment. The A/D Converter illustrated has a 3 MHZ quartz resonator.

FIG. 7 shows the simplified diagrammatic representation of an A/D Converter 44 of an alternate embodiment. The quartz component 39 of a stock A/D converter has been replaced with a 3 MHZ quartz resonator 46.

FIG. 11 shows the results of the application of the RAP method applied to the search for tanks containing radioactive wastes.

FIG. 12 shows the application of the RAP Method to the search for engineering communication pipe.

FIG. 13 shows the employment of the RAP method for the purpose of collecting data about a broken pipe.

FIG. 14 shows the employment of the RAP method for the purpose of constructing buildings and underground structures.

FIG. 15 shows an example of application of the RAP method to the mapping of karst formation zones.

FIG. 16 shows the application of the RAP method for mapping of a water-saturated area.

FIG. 17 shows an example of detection by the RAP method of a tectonic disturbance zone (Crimea).

FIG. 18 shows the results of work carried out by the RAP method on the Kimberly pipe (Archangel province).

5.3.2 Description of the Hardware Components of the Resonance Acoustical Profiling System A. Relevant Mathematics Applicant has designed his invention, in accordance with the following mathematics, to measure to a depth of at least 10000 m below the earth's surface.

The relationship between depth and sampling frequency (SF) is as follows:

Period of signal (P)=4096/SF

The minimum frequency of signal (MF) (which corresponds to the first harmonic which is obtained from a Fourier analysis) is calculated as follows:

MF=1P=SF/4096

The maximal depth that can be measured given this minimum frequency (MF) is calculated as follows:

Max Depth=2500/MF=2500*4096/SF

The greater depths require a higher sampling period, but the sampling period has to be stored in a 8192 byte device provided by the given hardware. But the unmodified A/D converter (described below) provides a minimal frequency of 5512 Hz which, in accordance with the above described mathematics, would only allow measurement to a depth of 1858 m. Thus measuring greater depths requires an artificial lowering of the sampling frequency. In order to measure to a depth of 10,492 m, for example, the sampling frequency must be lowered to 976 Hz, as shown by the following equation:

Max Depth=2500*4096/976=10,240,000/976=10492 m

B. The Hardware to Accomplish This

1. The Piezo Sensor

The piezo sensor is that component of the RAP system which receives the signal from the ground. These signals are transmitted via a cable to the signal amplifier. The frequency range of the piezo sensor's sensitivity should be minimally from zero to 50 KHz. It is believed that any sensor with such a sensitivity range would be acceptable for the purposes of this invention.

2. The Amplifier

The amplifier (the circuit is shown in FIG. 3) amplifies the amplitude of the signal received from the piezo sensor. Three different amplification levels can be selected, 1X, 2X, or 3×. The input resistance of the amplifier should be from 1 to 2 Megohms. The output resistance of the amplifier should be between 10 to 20 k$\Omega$. The voltage output from the amplifier to the modified A/D converter (described below) must be ±3 volts.

3. The Modified A/D Converter

Applicant purchased an A/D converter, an EZ-Kit Lite #2181 from Analog Devices Inc. In its stock unmodified state, this A/D converter had a minimal sampling frequency of 5512 Hz. Such a high frequency corresponds to a maximum depth of 1858 m. This was shown in the above equations. Therefore Applicant modified it by removing its quartz component. In its place.

Applicant installed a frequency generator which he built (described below). This frequency generation function theoretically could be done by a 3 MHZ quartz resonator if one could be found with a low enough power requirement to excite it.

3. Frequency Generator

The purpose of the Frequency Generator is to change the fixed sampling frequencies from the A/D converter. The analog to digital converter puts out sixteen discrete frequencies (measured in Hz) of which the four of interest to RAP are 5512
22050
8000
48000

Two of these frequencies are changed by the frequency generator/AD Converter as follows:

| Before | After |
|--------|-------|
| 5512 | 976.5625 |
| 22050 | 3906.25 |

The other two frequencies are left unchanged.

The quartz resonator determines the frequency with which the A/D converter samples the signal from the piezo sensor. The standard 16.94 MHZ quartz resonator in the stock A/D converter does not sample the data at a low enough rate for the present application. Substituting a 3 MHZ device produces the desired reduction of sampling frequency as shown above. The higher the frequency at which the signal is sampled, the shorter the time period over which the signal can be sampled due to the fixed size buffer into which the signal samples are gathered. Thus, to sample over a longer time period, the frequency of sampling must be lowered. Therefore the lower the percentage (and thus the number) of points sampled, the longer the time period over which they can be sampled (before the fixed size buffer is filled). As shown in the formulas above, the sampling period is increased as the number of points decreases, thereby allowing the measurement of greater depths.

The modified A/D converter is equipped with a memory sufficient to store enough sample frequencies to constitute one point (8092 bytes).

5.3.3 Description of the Programs Used for the Observation and Processing of RAP Data Overview of Programs in Notebook Computer
Data Description The ultimate resonance acoustical profile (RAP) of a geophysical cross section consists of a line of path points of observation in the path of interest. Each path point of the observation consists of 4095 time amplitude samples (TA samples) obtained by seismic data gathering.

5.3.3.1. The Piezo Function

The Piezo Function consists of 2 programs (Piezo and Main) and a subfunction (EZLD).

The batch file, Start.bat, starts the process by calling the EZLD protocol subfunction, followed by the Piezo.exe program, and ultimately the Main.com program.

5.3.3.1.1 EZLD Subfunction

This subfunction establishes the communication protocol between the modified A/D converter and the Notebook Computer. The EZLD Program may be obtained from Analog Devices Corp. (http://www.analog.com)

5.3.3.1.2 Piezo.exe 5.3.3.1.2.1 Inputs

Default values for sample frequency and minimal signal strength. Subsequent inputs from the screen generated by the Main.Com program (1.3) override the default values.

5.3.3.1.2.2 Processing

Upon initiation of the system, this program is downloaded to the modified A/D converter's buffer. This program then calibrates the modified A/D converter in accordance with these values. In case the parameters later solicited by the Main.com program differ from the default values in Piezo.exe which is now resident in the A/D buffer, Piezo.exe will recalibrate the modified A/D converter accordingly.

5.3.3.1.2.3 Outputs

After the Piezo Program is downloaded to the modified A/D converter's buffer, it outputs the sample frequency and the minimal signal threshold for use by the modified A/D converter.

5.3.3.1.3 Main.com

This program creates a screen to solicit parameters for its own processing as well as to override the default values in the Piezo.com program. It also takes TA Sample File from the modified A/D converter Buffer, displays it on another screen, and solicits the approval of the operator of the system to record that file on the hard disk in the same folder which contains the Piezo function.

5.3.3.1.3.1 Inputs

There are two inputs. The first is from the screens which are override parameters for the Piezo.exe program, and the Start Processing Key. The second input is the TA File in the modified A/D converter Buffer.

5.3.3.1.3.2 Processing

The Main Program displays a screen which solicits the above mentioned screen inputs and initiates the entire process when told to do so by the operator of the system. The Main Program then reads the Time/Amplitude (TA) File in the modified A/D converter buffer, displays this on another screen for the operator of the system to review, and, upon his approval, records this file in the appropriate folder.

5.3.3.1.3.3 Outputs

The output is the TA File display and the TA File(s) on the notebook computer.

5.3.3.2. Resonance Acoustical Profiling (RAP Spectrum Program)

The RAP Spectrum Program inputs screen parameters detailing how the point file is to be configured, inputs the TA Files from the Piezo Function, and outputs the point.txt file for the print image builder program.

5.3.3.2.1 Inputs

The inputs for the RAP Spectrum Program are solicited from an input screen (Screen 15) as follows:

5.3.3.2.1.1 Drive, Directory, and File Name for the Resultant Point File 5.3.3.2.1.2 Drive, Directory, and File Name for the Input TA File.

5.3.3.2.1.3 The Eight Operational Parameters (Collect or not into a single File Check Box, Perform Signal Normalization Check Box, Eliminate Signal Decay Check Box, Execute Phase Calculation Check Box, Distance Between Points, Coefficient Recalculation, Lower Limit of Calculation, Process each nth Point, n=) as defined in the operating instructions below.

5.3.3.2.2 Processing

Using the inputs from the screen and the TA Files along with the mathematics described in Section 5.3.2 A, a point file is produced where the first record contains the number of datum points in the sample element.

The program performs a Fast Fourier Analysis on the collection of data comprising each path point. This process transforms the time/amplitude samples collectively into a series of Amplitude/Frequency samples. The frequency of each sample indicates the depth from which it was obtained in accordance with the formula: $d=(1/f)*2500\pm 250$ where d is the depth in meters, and f is the frequency in Hz. The frequency component of the amplitude/frequency sample corresponds to the depth at which the amplitude component was obtained. The energy used to vibrate matter is a function of frequency. Differing amplitudes (i.e., the distance that the material is moved) are attributable to differing densities, which allow more or less movement from a given energy level. Plotting different amplitude (density) levels against each frequency (depth) allows a plot of higher/lower density across each line of depth in the cross-section.

The RAP Program stores the depth values as progressively larger negative numbers so that the Image Building Program draws the data in the proper orientation.

Clicking on the 'Calculate' button initiates the calculation process. The eight input parameters mentioned above are processed as follows:

Collect into a Single File

As the result of setting this option, the results of the processing of all the points in the survey will be stored in a single file with the name previously specified. This is the default option. If, however, this option is not checked (the checkmark is removed from the top entry box), then the program automatically names the new files, one file for each point. The data then is stored in that file. In other words, the data for each point will be stored in its own file, with the filename being the point number, and the extension is set to .TXT.

Perform Signal Normalization

Selecting this option means that all initial observations are to be normalized, that is the amplitude is set in all cases, to the one level. This is done to reduce the effect of differences in impact strength on the calculated results among the samples "Eliminate" Signal Decay Setting this option presupposes the introduction into the initial data of a coefficient proportional to time. That is, the introduction of this coefficient allows the amplification of the latter parts of the signal thus raising the amplitude of the lower part of the frequency spectrum, which may result in improving the quality of the information from deeper layers below the ground.

Execute Phase Calculations

Selecting this option results in calculating the phase shift in the frequency spectrum comprising the signal. Not setting this option results in only the frequency calculations. Selecting this option appends the letters 'af' to the resultant filename. Not specifying this option appends only 'a' to the resultant filename.

Distance Between Samples

Upon completion of the survey, the sample points are numbered in ordinal order (e.g. 1,2,3 etc.). In order to translate these sample points into the co-ordinates of the profile lines, the distance in meters between the sample points must be entered.

Coefficient Recalculation

In most cases, calculations are performed with the calculation coefficient set to 100%±10%. Deviation from 100% has a systemic nature and must be consistent across the entire profile of observations. In case a correction must be introduced (for an increase in accuracy of the calculations, and in the presence of exact geological data, e.g. the results of boring at one of the sample points in the profile) this correction is entered as 110% or 90% etc.

Lower Limit of Calculation

Specify, in meters, the lowest depth from which signal data is to be processed.

Process each nth Point, n=

In this block is selected the succession of sample to be processed (e.g. every sample, every second sample, every third sample, etc.). This becomes necessary where an excessive number of samples hinders the presentation of useful information.

5.3.3.2.3 Outputs

An output file(s) which corresponds to all the processed path points in a profile is created. The format of the file is:

Calculation results are recorded in the named file in the following order:

| Number of Datum Elements in the Sample Point | | Sample Point Number | |
|---|---|---|---|
| Coordinates along the profile line | Depth | Spectral Amplitude | Phase shift |
| .............................. | ..... | ........ | ........ |
| .............................. | ..... | ........ | ........ |
| .............................. | ..... | ........ | ........ |
| Number of datum Elements in the Sample Point | | Sample Point Number | |

Etc.

5.3.3.3 Image Building Program

The function of this program is to take the point file(s) and create an image file for use by the graphic editor.

Several commercial packages such as Golden Surfer 6.04 Surface Mapping System (Golden Software, Inc.) or perhaps the Geosoft Software. Either of these packages will work for this image building function. Applicant has chosen to use the Surfer Program for ease of operation and economy.

5.3.3.3.1 Inputs

The input to this program is the point file as was specified by the "Collect into a Single File" Option.

5.3.3.3.2 Processing

There are two phases to this processing. The first phase is called 'gridding' which involves scaling and data normalization. The second phase takes the Surfer Grid format file created by the first phase and allows for setting color value range according to the relative density of the material in a cross-section layer. The operator can specify which colors in the color spectrum represent more dense materials and which colors represent less dense materials. Thus the color tells the operator how relatively dense the material is.

5.3.3.3.3 Output

The output is an image file which can be viewed on the computer's screen. This file can also be output in a .BMP format for use by the graphic editor.

5.3.3.4 Graphic Editor

The function of this program is to produce the final hard copy output of the geophysical cross-sections obtained by the Resonance Acoustical Profiling System. Several packages such as Corel Draw or Aldus Photostyler may be used. Applicant has chosen Aldus Photostyler instead of Corel Draw, which despite its lack of annotation features (like Corel Draw offers) gives one the ability to manipulate graphically the resultant images.

The output of Aldus Photostyler can be fed into Corel Draw in order to annotate the resultant profiles.

5.3.3.4.1 Input

The input to the graphic editor is the image file generated by the image building program. There is also a screen which requests various inputs from the user which the user uses to manipulate the image in terms of contrast, color, etc.

5.3.3.4.2 Processing

Processing is done in real time at user request allowing the user to manipulate the image according to the parameters input above.

5.3.3.4.3 Output

The output of the Graphic Editor is the final hard copy of the geophysical cross sections generated by the Resonance Acoustical Profiling System.

5.3.4 Further Details About the Computer Programs

A. The Piezo Program

In the recording of data yielded by field observations, several programs are used which were developed by V. Prokofiev. (Prokofiev is a professional at the National University of St. Petersburg.)

The programs developed by V. Prokofiev of St. Petersburg are available from him. V. Prokofiev's contact information is:

e-mail address: vep @vep.eci.lgu.spb.su

Mailing address:

Home Address: 44 Koroleva Street, Apt. #18, St. Petersburg, Russia.

Work Address: National University of St. Petersburg, St Petersburg, Russia,

One of these programs, the Piezo program, resides in a notebook computer and communicates with the modified A/D converter connected to the notebook computer's COM 1 port. The Piezo program records the signals received from the modified A/D converter. These signals consist of 4096 samples which the program formats into one file.

A more detailed description of the A/D program, Piezo, in the notebook computer follows:

The sensor supplies analog signal data to the A/D converter. The modified A/D converter converts the analog signal data to digital format, and stores this data in the internal memory of the modified A/D converter. The Piezo Program then reads this digital data from the modified A/D converter's internal memory, and displays this data on the computer screen.

The Piezo Program records the signals read from the modified A/D converter onto the hard drive of the notebook computer. Each signal consist oof 4096 values which the program formats into one file.

The first of the 4096 values is the sampling frequency. The remaining 4095 values are the sample values.

Thus every single point of measurement consists of a sampling frequency and 4095 signal samples and is formatted into one file. There is a file for each point. The Piezo Program takes files and allows us to see them displayed on the screen of the notebook computer, and then stores the files on the hard drive of the computer.

The RAP Software utilizes the files stored on the hard drive by the Piezo Program.

The list of the programs in the PIEZO directory are:

1) _start.bat which is as follow:

ezld 1 to_115. exe g pause ezld115 1 piezo.exe g pause main.com 2) ezld.com which is available from Analog Devices (www.analog.com).

3) ezld115. com which is also available from Analog Devices (www.analog.com).

4) main.com developed by V. Prokofiev.

5) piezo.exe developed by V. Prokofiev.

6) to_115. exe developed by V. Prokofiev.

B. The RAP Spectrum Program

The 4096 samples which were formatted into one file is then processed by a program called RAPSPCTR.EXE developed by the Applicant, Igor Zuykov. This program performs a Fourier analysis of the frequency spectrum and the phase shifts.

C. The Display Programs

The production of graphics from the above results is done using Aldus Photostyler 2.0, and any version of CorelDraw between 6.0 and 7.0. The Surfer 6.04 Program interpolates the original irregularly spaced row data onto a regular rectangular grid in the grid [GRD] file format. The program creates a raster image from a grid file.

A list of all the programs in the RAP Software Complex is:

1. Prokofiev's Program, PIEZO
2. DOS 6.22
3. Norton Commander
4. Windows 95
5. Igor Zuykov's RAPSPCTR Program
6. Aldus Photostyler 2.0
7. Any version of Corel Draw from 6.0 through 7.0
8. Surfer 6.04 by Golden Software There are two options for computer usage. In the first option, all the programs will reside in the notebook computer. In the second option, a notebook computer is used in the field for the collection of data, and a desktop computer is later used for post-processing of the data. In this second option, the first three programs above (PIEZO, DOS 6.22, and Norton Commander) will reside in the notebook computer, and the following programs: Windows 95, Applicant's RAPSPCTR Program, Surfer 6.04 by Golden Software, DOS 6.22, Aldus Photostyler 2.0, and Corel Draw (any version from 6.0 through 7.0) will reside in the desktop computer.

5.3.4.1 Description of the Program for Processing the Results of Resonance Acoustical Profiling (RAP)

The RAPSPCTR.EXE program performs the following functions:

1. Reformatting of the data obtained as a result of surveying by RAP from binary code to text format.
2. Optional Normalizing of the signal, that is the reduction of all the signals to one level of amplitude, and adjusting the signal pattern such that the signals decay to the same zero level.

3. Direct calculation of the frequency spectrum and signal phase using the Fast Fourier Transform Algorithm.
4. Storing the results of the observations in a text file for further processing.

The program for calculating the amplitude of the signal spectrum obtained using the RAP Survey Method is the key program in the processing of RAP data.

This program has been developed for use with the Windows 95 Operating System. The RAPSPCTR.EXE program along with its installation program resides on two 1.44 MB diskettes. The program is installed by executing file SETUP.EXE from the installation package. Upon executing the SETUP program, one would follow the online instructions.

Upon executing RAPSPCTR.EXE, the program's working window appears (see Screen 15). Inputs to this program are the previously created files from the RAP survey which are in binary format and have the extension .COR.

The first step in working with the program is to specify the directory in which the processed data is to be stored. At the initial execution of the program, the request to "Select directory and enter output file name (with an extension .TXT) and fix the Selection" appears in the top part of the working window. (Throughout this description, the phrase "fix the Selection" means to "click the 'Select' Button with the mouse".) The extension to the file name need not, however, be specified; the program will enter it automatically. After clicking the 'Select' key, the name of the resultant file will migrate to the corresponding place in the working window (see screen). Then set the eight parameters (on the right side of the working window), as per the instruction in the following eight paragraphs. Then, in response to the request to 'Select the source file directory' specify the directory of the source files and Click on 'Select'.

Program Parameters
Collect into a Single File

As the result of setting this option, the results of the processing of all the points in the survey will be stored in a single file with the name previously specified. This is the default option. If, however, this option is not checked (the checkmark is removed from the top entry box), then the program automatically names the new files, one file for each point. The data then is stored in that file. In other words, the data for each point will be stored in its own file, with the filename being the point number, and the extension is set to .TXT.

Perform Signal Normalization

Selecting this option means that all initial observations are to be normalized, that is, the amplitude is set in all cases, to the one level. This is done to reduce the effect of differences in impact strength on the calculated results among the samples.

"Eliminate" Signal Decay

Setting this option presupposes the introduction into the initial data of a coefficient proportional to time. That is, the introduction of this coefficient allows the amplification of the latter parts of the signal thus raising the amplitude of the lower part of the frequency spectrum, which may result in improving the quality of the information from deeper ground levels.

Execute Phase Calculations

Selecting this option results in calculating the phase shift in the frequency spectrum comprising the signal. Not setting this option results in only the frequency calculations. Selecting this option appends the letters 'af' to the resultant filename. Not specifying this option appends only 'a' to the resultant filename.

Distance Between Samples

Upon completion of the survey, the sample points are numbered in ordinal order (e.g., 1,2,3 etc.). In order to translate these sample points into the coordinates of the profile lines, the distance in meters between the sample points must be entered.

Coefficient Recalculation

In most cases, calculations are performed with the calculation coefficient to 100%±10%. Deviation from 100% has a systemic nature and must be consistent across the entire profile of observations. In case a correction must be introduced (for an increase in accuracy of the calculations, and in the presence of exact geological data, e.g., the results of boring at one of the sample points in the profile) this correction is entered as 110% or 90% etc.

Lower Limit of Calculation

Specify, in meters, the lowest depth from which signal data is to be processed.

Process Each nth Point, n=

In this block is selected the succession of sample to be processed (e.g. every sample, every second sample, every third sample, etc.). This becomes necessary where an excessive number of samples hinders the presentation of useful information.

Clicking on the 'Calculate' button initiates the calculation process. Calculation results are recorded in the named file in the following order:

| Number of Datum Elements in the Sample Point | | Sample Point Number | |
|---|---|---|---|
| Coordinates along the profile line | Depth | Spectral Amplitude | Phase shift |
| ............................. ..... | | ......... ........ | |
| ............................. ..... | | ......... ........ | |
| ............................. ..... | | ......... ........ | |
| Number of datum Elements in the Sample Point | | Sample Point Number | |

Etc.

5.3.5 The Steps of the Procedure for Using the Laptop Computer with the Connected RAP Device to Acquire Signal Data 1. Connect the Sensor to the modified A/D converter. Connect the modified A/D converter to the COM 1 port of the Notebook Computer. Note: The RAP Device housing contains the modified A/D converter.
2. Boot up the Notebook Computer. The Notebook Computer contains the Windows 95 Operating System. After the message "Starting Windows 95" appears, press the F4 key. This causes the system to boot to the previous operating system, in our case DOS 6.22.
3. Since the Autoexec.bat file contains a line to call in the DOS 6.22 Menu, the DOS 6.22 Menu now appears on the screen. The DOS Menu offers the following choices: "Standard Configuration" and "Configuration for Piezo". The Standard Configuration loads the mouse driver and activates Norton Commander. The "Configuration for Piezo" option does not load the mouse driver, and so leaves the COM 1 (Serial) port free for the purpose of connecting the modified A/D converter to COM 1.
4. Select the "Configuration for Piezo" option. Now the Norton Commander is activated, and a file/directory selection screen appears on the screen.
5. From the Norton Commander selection screen which appears, highlight directory Piezo and Click on Enter.
6. Switch on A/D power, and wait until the Green Light on the A/D conversion device housing blinks. You will see a slow blinking followed by a quick blinking.

7. Highlight Start_.bat and press Enter. You will see "C:\Piezo", and the messages "Pause", and "Press any key to continue".
8. Press Enter.
9. Press Enter again.
10. Choose Option 3, "Set sampling frequency".
11. Then you will see another menu "Select Sampling freq . . . ". Select any sampling frequency.
12. After selecting sampling frequency, the program returns to the MAIN menu. The MAIN menu now displays the frequency you selected on the second line at the left.
13. Select Option 4, "Set gate level" and the Gate Level Menu appears on the screen. The Gate Level indicates the sensitivity of input to the modified A/D converter. Select "1" means 0.3 which means the 30% of full scale which is the most sensitive option. The modified A/D converter will see the signal if its strength is more than 30% of its maximum amplitude. So, select "1". The program returns to the Main Menu which now indicates the Gate Level which you just selected.
14. Choose which technique you want to work with, "With Impact" or "Without Impact".
Let's suppose you select the "With Impact" case. Then proceed as follows:
a) Place the sensor on the earth's surface.
b) Select 1, "waiting for capture".
c) Tap the ground beside the sensor (either with your finger or with a hammer) no more than about 10 cm from the sensor. In our case, we did not see a direct effect from any nearby side disturbances regardless of whether they were electromagnetic, electrical or mechanical disturbances that would create the inability for the RAP method to proceed with its measurements. Underneath the menu, you will see the message: "Data Captured" and you will hear a beep. At this point, all the data is still in the modified A/D converter. The Green Light illuminates at the A/D conversion device which means that there is data waiting to be retrieved.
15. Select Option 2, "get data".
16. You will see the message "Press ESC to skip writing data; press any other key to save the data".
17. Underneath that message, you see a plot of the amplitude of the data signal versus time displayed on the screen. If the amplitude of the signal is not so large as to be off the screen, we accept the signal. The signal should look like a "dying wave" with the amplitude gradually diminishing with time.
18. If the signal amplitude is so large that it is off the screen (i.e., too strong), press the ESC key, and start again with the impact, but this time make a lighter impact with a very light tap on the earth with your finger or hammer.
19. If the signal's amplitude is sufficiently small that it is not off the screen, press any key to save the data. You will see the message "Enter the Name of the File to Save Data". Enter a file name and press enter. Suppose, for example, you enter "10" as the name of the file. Now the program returns to the Main Menu.

If, however, at Step 14, you wanted to use the "Without Impact" option, you would now place the sensor on the ground, and select Option 6 "force writing data" (Performing the "With No Impact" method). With this option, all the steps from 14 to 19 would be the same except that after selecting Option 6, there would be a beep from the modified A/D converter. No impact on the earth is needed here, but the diagram looks almost like a straight line. Suppose, for example, we name the file "11" at step 19.

Now there is also another option, #5, "Plot Last Captured Data" in the Main Menu. When #5 is selected, the signal is plotted.

There is another useful option which is used to test the communication between modified A/D converter and the computer. This test is performed as follows:

1. Click on the number 0 for "Communication (Terminal) Test". Then you will see the message: "Press ESC to leave the terminal test". Then type some text on the keyboard. If the text typed on the keyboard is "echoed" to the screen, Communication is functioning properly. Press ESC to leave the Terminal Test.

5.3.6 The Steps for Using the Program RAPSPCTR to Process the Data Collected by Program Piezo The following steps assume that the first computer usage option (all the programs reside in the notebook computer) is being used.

1. Turn on computer power at the notebook computer. The only device which needs to be hooked up to the notebook computer at this point is a color printer. At the Windows 95 Desktop, double click on the "My Computer" icon and select the D drive. You will see a directory of drive D. Select File, New, and Folder. Name this folder RAZREZ. You will now see a folder named RAZREZ. Double click on Folder RAZREZ. Select File, New, and Folder. Name this folder GLUB. Now double click on folder "Piezo". Using your mouse, select all files with the .cor extension. Drag the files to the new Folder GLUB. Then close the D drive.
2. At the Windows 95 Desktop, click on Start, Programs, and select program RAPSPCTR.EXE.
3. You will see a window which has a title "FFT Calculation of RAP Signals". (Screen 15)
4. Select the D Drive. (Screen 16)
5. The instruction at Screen 17 is "Select directory and enter output file name (with an extension "TXT) and fix the Selection." The phrase "fix the Selection" in whatever screens it appears means to click the Select Button. Select the RAZREZ Directory. (Screen 17)
6. Double click Directory RAZREZ, and Screen 18 appears.
7. The name of the resultant file will be entered after the backslash at the end of D:\RAZREZ\. (Screen 18)
8. Type PROBA after the backslash, giving us D:\RAZREZ\PROBA. (Screen 19)
9. Click the Select button.
10. Underneath Name of Input File Window, you will see the name of resultant file: D:\RAZREZ\PROBA. (Screen 20)
11. Open Directory GLUB. On the left side you will see all names of the files with extension COR. (Screen 21)
11.1 Check the "Collect into a single file", "Perform Signal Normalization", and "Execute Phase Calculation" check boxes on the right side of the screen (as shown at Screen 5).
12. Enter 10 in the "Distance Between Samples" entry box.
13. Enter 100 in the "Co-efficient of Recalculation" box. A percentage value is entered here, and determines what constant will be used by the program. The default value of this constant is 2500. Entering a value of 100 means that a constant of 100%*(the constant 2500)= 2500 is to be used by the program. If, for example, we use the number 90, it means that the program will use a value of 90% of 2500=2250. We choose a factor of 100 for the Factor of Recalculation. We have found that a Factor of Recalculation of 100, corresponding to using a constant of 100%*2500=2500 gives the best results, but one can enter other values for the Factor of Recalculation for the purpose of experimentation.

14. Enter 40 in the Lower Limit of Calculation box. The meaning of the number entered in this box is as follows: The depth that we choose for the purpose of measuring. This number is in meters. The number you enter limits the depth to which the RAP device can detect objects. If you choose a number greater than 300, resolution is degraded in those layers closest to the earth's surface.

15. Enter 1 in the "Process each __nth Point" box. (Screen 22) Entering a 1 indicates that all the points of measurement will be used for calculations. If, for example, you enter a 10, every tenth point of measurement will be used for the calculations. In other words only every nth point of those collected is processed.

Click on the Calculate Button

16. In Screens 23 and 24, there is a Progress Bar indicating percentage of completion, and you will see the message "Please Wait . . . "

17. In Screen 25, you will see the message "Calculation Completed" near the upper right hand corner. This means that all of the points of measurement have been processed. Click on the Exit Button at the bottom middle of the screen. The program automatically comes back to the Windows 95 Desktop and is ready to repeat this sequence of steps with new data, if such data is again delivered from the modified A/D converter.

18. At the Windows Desktop, click Start, Programs, and select Golden Software. Then select program Surfer.

19. Then Screen 26 appears. Select Grid from the Menu Bar. Then select Data. (Screen 27)

20. Then Screen 28 appears. On the right side of this screen, select Drive D and Directory RAZREZ. Click on RAZREZ (Screen 29).

21. On the left side, you will see PROBAAF.txt. (Screen 30) Click on PROBAAF.txt. You will see in the file name, probaaf.txt. (Screen 31) Click on the OK Button. You will see Import Status (Screen 32). After Importing is completed (as indicated by the Progress Bar), you will see Screen 33 with the title "Scattered Data Interpolation".

22. Using the mouse, select the Spacing Box (Screen 34), and enter a 1 for X Direction, and 01 for Y Direction. (Screen 35).

23. Gridding Method should be chosen as Triangulation with Linear Interpolation. (Screen 35)

24. Click on the OK Button.

25. You will see a screen labeled PROBAAF.GRD with a Progress Bar indicating percentage completion. (Screen 36)

26. After this, you will automatically see Screen 26 again. Then select Map from the Menu Bar. Then select Shaded Relief (Screen 37).

27. After clicking on Shaded Relief, you will see Screen 38.

28. Click on PROBAAF.GRD in the list of file names. (Screen 38).

28. Then PROBAAF.GRD will be shown in the File Name Box. Click the OK Button.

29. You will be switched to Shaded Relief Map Screen (Screen 39).

30. Enter 270 in the Horizontal entry box under Light Position Angles. (Screen 40)

31. Then enter 50 in the Vertical entry box under Light Position Angles. (Screen 41).

32. Then enter 01 in the Z Scale Entry Box. (Screen 42)

33. Click on Colors.

34. Screen 43 appears. With the options, select appropriate colors. This is shown in Screen 44. Click on the OK Button. You will be returned to Screen 42. Click on the OK Button.

35. You will see Screen 45. Click on the image in the center of the screen, and its selection handles will appear. Select Map from the Menu Bar, and click on the Scale menu selection item. (Screen 46)

36. After clicking on Scale, Screen 47 appears. Enter 10 into both the X and Y Scale Entry boxes. Click the OK Button.

37. You will see Screen 48. Select File from the Menu Bar, and click on Export.

38. Screen 49 appears. From the "List of Files of Type:", select Windows Bitmap (*.BMP). (Screen 50)

39. Enter PROBA.BMP as the File Name. (Screen 51) Click on the OK Button.

40. Screen 52 appears with the title Windows Bitmap Export—proba.bmp. Enter 800 for Width, 600 for Height, and from the Color Depth Pull Down Menu, select True Color. Click on the OK Button.

41. Screen 53 appears. Click on File and Exit from the Menu Bar.

42. We return to the Windows Desktop. Select Start, Programs, Aldus PhotoStyler 2.0 and PhotoStyler.

43. Screen 54 appears. Select File, Open. (Screen 55)

44. After selecting Open, Screen 56 appears.

45. Select Drive D and Directory RAZREZ. Click on Proba.Bmp under the List of Files on the left. (Screen 57)

46. You will see File Name Proba.Bmp in the Name of File Box. Click on Open.

47. Screen 58 appears. Select the Zoom Tool Icon from the Tool Bar. Draw a selection box around any portion of the image in the center of the screen, and that portion will be zoomed in on. (Screen 59)

48. Select the Rectangular Area Selection Tool from the Tool Bar which is used to select a rectangular or square area in the current image. Select this tool and drag the mouse pointer to create the selection area. Once you have selected the area, you can move, cut, copy, or paste it. In our case, we find it easier to make selections accurately with a magnified (zoomed in) view of the image. To magnify our view, we choose the zoom tool from the Tools palette and click on the image. And then with the pointer of the mouse, we start at the corner of the magnified image and drag it so that we can encompass the entire magnified image with the rectangle. (Screens 60, and 61)

49. Select Edit and Copy from Menu Bar. (Screen 62)
50. Select Edit, Paste, As New Document from Menu Bar. (Screen 63)
51. Screen 64 appears. Click on the close box of the Proba.bmp screen to close that file. (Screen 64 and 65)
52. Select Image, Resample from the Menu Bar. (Screen 66) After clicking on Resample, Screen 67 appears.
53. Under the New Image Information Heading, enter 17 as the horizontal (<->) size of the object and 4 as the vertical size of the object. This data should be corresponding to the data from Screen 47. Click on the OK Button.
54. Screen 68 appears. Select Zoom. (Screen 69)
55. Select Tool Ribbon for Setting Option. (This icon has 4 arrows on it.) (Screen 70)
56. After pressing Tool Ribbon for Setting Option, you will see Screen 71.
57. Select Edit, Duplicate from the Menu Bar (Screen 72).
58. Screen 73 appears. Select Effects, Special, Emboss from the Menu Bar (Screen 74).
59. Screen 75 appears. Choose Foreground Color under the Coating Heading, and Select 4 for Depth. (Depth has a range of 1 to 5.) Click the OK Button.
60. Screen 76 appears. Select Image, Tune, Gray Balance from the Menu Bar. (Screen 77)
61. Screen 78 appears. Move the lower end of the Gray Balance Line to the right by placing the mouse cursor on the lower end and dragging it a little over half way to the right. (Screen 79)
62. Click on the OK Button.
63. Screen 80 appears. Select Image, Compute from Menu Bar. (Screen 81)
64. Screen 82 appears. Select from the Command Pull Down List, the Multiply command. Enter the names of the files from Screen 81 into the Source 1 and Source 2 entry boxes respectively. Click on the OK Button.
65. Screen 83 appears. Select File, and click on Save As. (Screen 84)
66. Screen 85 appears. Enter pr_end.tif into the File Name Box. This file represents the name of the file that this data will be kept in. Click on the Save Button.
67. Screen 86 appears. This is the end of this set of instructions.

5.3.8 A Glossary of Symbols Used in the RAPSPCTR.EXE Program

| Symbol | Meaning |
| --- | --- |
| A( ) | Spectral amplitude for the Fast Fourier Transformation (FFT). |
| Am | Intermediate variable for FFT |
| Am1 | Intermediate Variable for FFT |
| B( ) | Intermediate Variable for FFT |
| B1 | Depth variable |
| C | Intermediate Variable for FFT |
| Check1.Value | Basic Language Command - Status of 'Check1' window |
| Command3.Visible | Basic Language Command - determination of button visibility |
| DeltaB | Augmentation by depth for the final points computed |
| Di | Frequency of signal discrimination |
| Dis | Frequency of Signal discrimination in the output file |
| Diskret | Signal Period |
| E | Intermediate Variable for FFT |
| F | Intermediate Variable for FFT |
| Fil$ | Variable to store file name |
| File1.list(F1) | Basic Language Command |
| File1.ListCount | Basic Language Command |
| File1name.Text | Basic Language Command |
| F1 | Ordinal file number in list of files |
| FOrQ | Intermediate Variable for FFT (for phase processing) |
| Freq | Frequency after FFT |
| I0 | First point to process for FFT |
| I1 | Last point to process for FFT |
| Pil% | Field name for string output file name |
| J | Internal cycle counter for FFT |
| J1 | Intermediate Variable for FFT |
| K | Intermediate Variable for FFT |
| K_per | Recalculation coefficient for calculation into depth |
| Ko | Counter for number of points in the signal |
| Kol | Number of points FFT is to calculate |
| Kolitch% | Number of points in the FFT spectrum |
| KolZ | Number of points to display the results of the calculations |
| KoordX | Point coordinates along the profile line |
| KoordX; 0; 0; 0 | First recorded line in output file (Frequency and phase file) |
| KoordX; 0; 0 | First recorded line in output file (Frequency file) |
| KoPnt | Number of points in the output file |
| LOF(1) | Basic Language Command meaning End Of File. |
| M | Level "2" for FFT Processing |
| Maksim | Size for determining Maximum Signal Amplitude |
| MaxFil | Highest file number in the file list |
| MaxSig | Level to which signal is normalized |
| MinFil | Lowest file number in file list |
| Minim | Magnitude for determining minimum signal amplitude |
| N | Number of points in the signal |
| NiGlub | Lowest depth to which calculations are made |
| Nkon | Number of the last point |
| Nummar | Number of the point being processed |
| O | Intermediate Variable for FFT |
| OutArr | Matrix for storing output data |
| OutF$ | Name of outputted file |
| P | Intermediate Variable for FFT |
| Per | Discrimination of signal level for spectrum calculation |
| Pf% | Variable for determining the name of the output file |
| Pic$ | Variable for determining the name of the output file |
| Pik | Number of the point on the profile |
| Pil% | Variable for determining the name of the input file |
| Pnt | Number of points in the input signal |
| Pont | Matrix of auxiliary data |
| PopSig | Correction coefficient for normalizing the |

5.3.8 A Glossary of Symbols Used in the RAPSPCTR.EXE Program

| Symbol | Meaning |
| --- | --- |
| Procent | Variable for determining processing status file |
| Prof$ | Variable for determining name of the file being processed |
| Progress.Max | Basic language command determining contents of the processing status line |
| Progress.Min | Basic language command determining contents of the processing status line |
| Progress.Value | Basic language command determining contents of the processing status line |
| Progress.Visible | Basic language command determining contents of the processing status line |
| Q | Intermediate variable for FFT |
| Qf(K) | Magnitude of the phase shift during FFT |
| R | Intermediate variable for FFT |
| Razn_A | Amplitude difference of the spectrum for the latter processed points |
| Razn_B | Depth difference for the latter processed points |
| Razn_F | Phase difference for the latter processed points |
| S | Intermediate variable for FFT |
| Si | Signal data taken from input file |
| Sig( ) | Signal data after its transformation |
| St | Calculation step during processing of the sample points |
| T | Intermediate variable for FFT |
| U | Intermediate variable for FFT |
| V | Intermediate variable for FFT |
| Value | Basic Language command |
| W | Intermediate variable for FFT |
| X(I) | Intermediate variable for FFT |
| Y(I) | Intermediate variable for FFT |
| Z | Variable for determining points on the output file |

5.4 Some Examples of the Application of the RAP Method to the Solution of Problems 5.4.1 EXAMPLE 1

Search for Tanks Containing Radioactive Wastes

The search for radioactive wastes was carried out in St. Petersburg in 1996. Despite the small number of points at which measurements were made for a given distance at the location of the wastes, seven tanks filled with radioactive liquid were located at a depth of 1.5 m (see FIG. 11). The results of the carried out work allowed for significantly accelerating the deactivation of these discovered waste tanks. The tanks were made of a material which was not ferro-magnetic but concrete plus other nonferro-magnetic materials, and those tanks were located in the center of St. Petersburg where the high level of noise and congestion would make it extremely difficult to use the background art methods. (This work was performed for experimental purposes only to evaluate the developmental stage of the RAP technology.)

5.4.2 EXAMPLE 2

Search for Engineering Communication Pipe

The RAP method can be successfully applied to the search for underground communication pipe lines, foundations, tunnels, and so on. The results of the work done in searching for one of these objects (see FIG. 12) confirmed the high efficiency of the RAP method for the solution of such tasks. The depth to the center of a section of pipe was measured with a ruler. The measured depth was 3 meters. As shown in FIG. 2, the RAP method yielded a depth of exactly 3 m to the center of the pipe. The RAP procedure was repeated five times. Each of the results of the RAP procedure was within 3 cm of the measured depth of 3 meters, thus showing that the RAP method has an accuracy, in this case, of 99%. In practice, we have thus far not seen an accuracy of less than 99%. (This work was performed for experimental purposes only to evaluate the developmental stage of the RAP technology.)

5.4.3 EXAMPLE 3

Search for Ruptured Leaking Pipe-Lines and the Side Effects Thereof

Because of work done utilizing the RAP method along the route of sewage pipe, an area where loose ground had fallen into breaks in the pipe was revealed. The carried out telemetric observations confirm the RAP results. (See FIG. 13.) (Telemetric methods, which utilized a robot with a mounted camera which was driven inside the pipe to the location of the break in the pipe, confirmed the RAP results.) (This work was performed for experimental purposes only to evaluate the developmental stage of the RAP technology.)

5.4.4 EXAMPLE 4

Employment of the RAP Method for the Purpose of Buildings and Construction

The RAP method can be successfully applied to the study of geological sections when engineering building work is being carried out. The pictures on the following pages demonstrate this possibility. As it can be seen in FIG. 14, the given task was successfully solved with the help of the RAP method. It is necessary to admit that the possibility of applying other methods was restricted, because the construction site was located in the center of Moscow, which resulted in a very high level of industrial interference.

It was demanded by the technical task of constructing buildings that engineering communication pipe was required to be laid in an underground pass. The pipe was to be laid in a layer of clay at a depth of about 20 m. For quality work performance, it was important to know the depth and thickness of the layer and its consistency. The RAP method showed that approximately starting from 12 meters below the surface up to 26 m below the surface, there is a very clean layer of clay which, because of its consistency, a pipe could be horizontally pushed through it for the required distance of 140 m. Under this layer, starting from 26 m below the surface, there is a layer of limestone with a width of approximately 3½–4 m. Above the layer of clay, there are layers of sand. Economically, it is a very inexpensive technique to push the pipe horizontally within the clay layer. The results of this work coincide with the data about the section, obtained during the drilling of exploratory bore (in the picture it is to the left of the RAP section). (This work was performed for experimental purposes only to evaluate the developmental stage of the RAP technology.)

5.4.5 EXAMPLE 5

Detection of Karst Formation

Work aimed to detect zones of karst formation was carried out in the Valdai region according to the program of preliminary geological researches before building the high-speed main train line from Moscow to St. Petersburg. According to the results of this work, there were detected some sites of karst formation in the location of the route being designed, which detection allowed for correcting the design of the railroad (see FIG. 15). (This work was performed for experimental purposes only to evaluate the developmental stage of the RAP technology.)

5.4.6 EXAMPLE 6

Mapping of Water-Carrying Layers

Work carried out by the RAP method aimed at mapping a horizontal water-carrying layer took place in the Leningrad region with the purpose of defining a liquid chemical wastes leakage from a chemical depository (see FIG. 16). The results of this work allowed revealing and tracing a horizontal water-carrying layer at the depth of 25–30 meters, along which the drainage of materials from the chemical depository was carried out. (This work was performed for experimental purposes only to evaluate the developmental stage of the RAP technology.)

5.4.7 EXAMPLE 7

Mapping of Tectonic Disturbances.

This work, carried out by the RAP method, took place in 1997 on one of the sites on the Crimean peninsula, and they showed the possibility of the straightforward and highly efficient detection of tectonic disturbance zones (see FIG. 17), which showed the feasibility of using the RAP method to solve this problem, also. (This work was performed for experimental purposes only to evaluate the developmental stage of the RAP technology.)

5.4.8 EXAMPLE 8

Mapping of Kimberly Pipes.

This experimental work, carried out by the RAP method and applied to searching for exposed pipes, took place in Archangel province and in the Ukrainian Shield (Priazovski Massif).

The work was carried out on some objects in Archangel province. The section shown above (see FIG. 18) illustrates the capacity of RAP to reveal and outline the overburdened Kimberly pipes. According to RAP data, covering the pipe were Quaternary sediments (Q), terrigenous-carbon deposits of middle carbon (C2-C3), rocks of crater (D3-C2) and aperture diatreme fractions (D3-C2). As shown in picture #8, all of these sediments covering the pipe are precisely mapped. The locations of the inner and outer contacts of pipe are very precisely fixed.

The drilling work required to find the structure of that ground was much less due to knowing where the pipe starts and ends and what is the structure of the pipe for the purpose of diamond exploration.

Thus, the RAP method can be efficiently used in the search for diamonds in all stages, and can be used in conjunction with other methods.

A section on an observation profile, as a rule, shows as a raster image of amplitudes of acoustic signal, transformed into a spectral form.

5.5 Advantages of the Invention

The Resonance Acoustical Profiling System has advantages of efficiency, reasonable weight, and accuracy.

It will be understood that each of the elements described above, or two or more together may also find a useful application in other types of devices and methods differing from those types described above.

5.6 LIST OF REFERENCE NUMBERS

| | |
|---|---|
| 20 | Resonance Acoustical Profiling System for conducting a geophysical survey |
| 22 | sensor |
| 24 | piezo sensor |
| 26 | analog to digital conversion device |
| 28 | computer |
| 30 | housing of analog to digital conversion device |
| 32 | modified analog to digital converter |
| 34 | amplifier |
| 36 | power supply |
| 38 | external battery |
| 40 | frequency generator |
| 42 | quartz resonator |
| 44 | A/D Converter |
| 46 | 3 MHz quartz resonator |
| 48 | amplifier port of the analog to digital conversion device |
| 50 | electric wire or cable |
| 52 | Device KP142EH8A |
| 54 | switch |
| 56 | Indicator of Received Signal |
| 58 | Power Light |
| 60 | On/Off Switch |
| 62 | Power Port |
| 64 | Computer Connection |
| 66 | Sensitivity Adjuster |
| 68 | color printer |

5.7 Alternatives and the Closing

Thus the reader will see that my Resonance Acoustical Profiling System supplies a long felt need for a simple, economical, easy to use, resonance acoustical profiling system which does not require explosives, heavy equipment, or heavy vibrators.

Although the present invention has been described in considerable detail with reference to certain preferred versions thereof, other versions are possible which will be apparent to those who are skilled in the art. While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Therefore, the spirit and scope of the appended claims should not be limited to the description of the preferred versions contained herein, but by the appended claims and their legal equivalents.

Docket: 9802:IZU

| | | |
|---|---|---|
| 1 | 5.3.7 Commented Listing of Program RAPSPCTR.EXE | |
| 2 | Dim Pnt As Integer | *Definition of variables used in this program* |
| 3 | Dim Sig() As Double | *Definition of variables used in this program* |
| 4 | Dim Pont() As Integer | *Definition of variables used in this program* |
| 5 | Dim OutArr() As Double | *Definition of variables used in this program* |
| 6 | | |
| 7 | Private Sub Command1_Click() | *Determination of procedures upon pressing "Calculate"* |
| 8 | Label3.Caption = "" | *Clearing File processing line* |
| 9 | If Check1.Value =1 Then | *Checking entry of filename* |
| 10 |   If File1Name.Text = "" Then ' | *Processing file entry name error* |
| 11 |     GoTo InpError | |
| 12 |   End If | |
| 13 | End If | |
| 14 | Label1.Caption = "Please wait....." | *Display message* |
| 15 | Label1.Refresh | |
| 16 | ' Determines the maximum file number in the directory | |
| 17 | MaxFil = 0 | |
| 18 | For Fl = 0 To File1.ListCount - 1 | |
| 19 |   If Val(File1.List(Fl)) > MaxFil Then MaxFil = Val(File1.List(Fl)) | |
| 20 | Next Fl | |
| 21 | ' Determines the minimum file number in the directory | |
| 22 | MinFil = 500 | |
| 23 | For Fl = 0 To File1.ListCount - 1 | |
| 24 |   If Val(File1.List(Fl)) < MinFil Then MinFil = Val(File1.List(Fl)) | |
| 25 | Next Fl | |

Docket: 9802:IZU

| | | |
|---|---|---|
| 1 | Progress.Visible = True | *Calculate the parameters of the file processing line* |
| 2 | | *(Determines the minimum and maximum file numbers)* |
| 3 | Progress.Min = MinFil | |
| 4 | Progress.Max = MaxFil | |
| 5 | Progress.Value = MinFil | |
| 6 | St = Val(Text4.Text) | |
| 7 | On Error Resume Next | |
| 8 | For Fl = MinFil To MaxFil Step St | *The start of the cycle of file processing* |
| 9 | Procent = 100 * Fl / (MaxFil - MinFil) | *Calculates the data for the processing status line* |
| 10 | *Determination of the path to the files being processed.* | |
| 11 | If Right$(Tree.Path, 1) <> "\" Then | |
| 12 |    File2Name.Text = Tree.Path + "\" + Format$(Fl) + ".COR" = | |
| 13 | End If | |
| 14 | If Right$(Tree.Path, 1) = "\" Then | |
| 15 |    File2Name.Text = Tree.Path | |
| 16 | + Format$(Fl) + ".COR" | |
| 17 | End If | |
| 18 | | |
| 19 | Prof$ = Format$(Fl) + ".cor" | |
| 20 | Pf% = InStr(Prof$, ".") | |
| 21 | Pic$ = Prof$ | |
| 22 | If Pf% <> 0 Then Pic$ = Left$(ProfF$, Pf% - 1) | |
| 23 | Const PI = 3.141592654 | |
| 24 | If File2Name.Text = "" Then ' | *Processing error "No file name entered"* |
| 25 |    GoTo InpError | |
| 26 |    End If | |
| 27 | Fil1$ = File2Name.Text | |

-57-

Docket: 9802:IZU

| | | |
|---|---|---|
| 1 | *Determination of parameters entered for program execution* | |
| 2 | Pik = Val(Text1.Text) | *Unit of measure for the number of points* |
| 3 | K_per = Val(Text2.Text) | *Correction coefficient for recalculating frequency and depth* |
| 4 | NiGlub = Val(Text3.Text) | *Lower limit of calculation* |
| 5 | If Check1.Value = 0 Then | *Status check: "collect into a single file" block* |
| 6 |    Fil$ = File2Name.Text | *And assignment of file name based on above status* |
| 7 | End If | |
| 8 | If Check1.Value = 1 Then | |
| 9 |    Fil$ = File1Name.Text | |
| 10 | End If | |
| | | |
| 11 | Pil% = InStr(Fil$, ".") | *Assignment of output file name depending on the command* |
| 12 | OutF$ = Fil$ | *"perform calculation phase"* |
| 13 | Nummar = Val(F1) | *Determination of sample being processed depending on the file* |
| 14 | KoordX = Nummar * Pik | *name and determination of the sample's coordinates on the profile* |
| 15 | If Pil% <> 0 Then OutF$ = Left$(Fil$, Pil% - 1) | |
| 16 | If Check4.Value = 0 Then OutF$ = OutF$ + "a" + ".TXT" | *Calculate only spectral signal* |
| 17 | If Check4.Value = 1 Then OutF$ = OutF$ + "af" + ".TXT" | *Calculate spectral signal & phase shifts* |
| | | |
| 18 | Dim Dis As Integer | *Determination of the 'MASSIVE' for the introduction of signal significance* |
| | | |
| 19 | Open Fil1$ For Binary Access Read As #1 | *Open file read only* |
| 20 | If LOF(1) = 0 Then | *Processing for skipped file name in series of input files* |
| 21 | Close | |
| 22 | Kill File2Name.Text | |
| 23 | Beep | |
| 24 | Erase OutArr | |
| 25 | Label3.Caption="Sample" + Str$(F1) + "skipped" | |

Docket: 9802:IZU

```
1    Label3.Refresh
2      GoTo 121
3    End If
4    Get #1, , Dis        Inputting value for selecting signal discrimination frequencies
5      If Dis = 49 Then Di = 976.5625      Determining signal discrimination frequency based on
6      If Dis = 50 Then Di = 3906.25       inputted value
7      If Dis = 51 Then Di = 8000
8      If Dis = 52 Then Di = 48000
9      If Dis = 21778 Then Di = 5512.5
10     If Dis = 18432 Then Di = 48000

11   If Text1.Text="" Then 'Error processing "data not entered"
12     GoTo InpErr1
13   End If 14   Diskret = 1000 * (1 / Di)     Translation of discrimination frequency into another dimension
15   Pnt = (LOF(1) / 2) - 1
16   If Pnt > 4096 And Pnt < 5000 Then Pnt = 4095
17   If Pnt > 4090 And Pnt < 4096 Then Pnt = 4095

18   ' Determination of number of samples and loading of binary file.
19   KoPnt = Pnt + 1
20     ReDim Sig(KoPnt)   Determining the 'MASSIVE' for entry and processing a binary file
21     ReDim Pont(10)
22     Dim Si As Integer
23     Ko = 1
24     For I = 1 To Pnt
25       If Not EOF(1) Then
```

Docket: 9802:IZU

| | | |
|---|---|---|
| 1 | Get #1, , Si | *Check entry of "Perform Signal Normalization"* |
| 2 | Sig(Ko) = Si | |
| 3 | Ko = Ko + 1 | |
| 4 | End If | |
| 5 | Next I | |
| 6 | If Check2.Value = 1 Then | *Check entry of "Perform Signal Normalization"* |
| 7 | MaxSig = 30000 | *Lower limit for signal normalization* |
| 8 | Label5.Caption="Reading file…" | *Display processing status* |
| 9 | Label5.Refresh | |
| 10 | Maksim = 0 | *Determining signal amplitude and adjusting it* |
| 11 | Minim = 10000 | *To the given level (see above)* |
| 12 | For I = 1 To Ko - 1 | |
| 13 | If Sig(I) > Maksim Then Maksim = Sig(I) | |
| 14 | If Sig(I) < Minim Then Minim = Sig(I) | |
| 15 | Next I | |
| 16 | PopSig = MaxSig / (Maksim - Minim) | |
| 17 | For I = 1 To Ko - 1 | |
| 18 | Sig(I) = Sig(I) * PopSig | |
| 19 | Next I | |
| 20 | End If | |
| 21 | *'Eliminating Signal Decay* | |
| 22 | If Check3.Value = 1 Then | *Check selection of "Eliminate Signal Decay"* |
| 23 | For I = 1 To Ko - 1 | |
| 24 | Sig(I) = Sig(I) * I | *If selected – its execution (simple multiplication* |
| 25 | Next I | *Of signal amplitude by the sample number)* |
| 26 | End If | |
| 27 | Close #1 | |

Docket: 9802:IZU

```
1    For I = Ko - 1 To Pnt + 1
2       Sig(I)=0    'Augmentation of file "0" with meanings
3    Next I
4    'Processing data for spectral calculation 5    ReDim X(Pnt + 1), Y(Pnt + 1) As Single
6    I = 0
7    X(I) = 0
8    Y(I) = Sig(I)
9    For I = 1 To Pnt
10       Y(I) = Sig(I)
11       X(I) = Diskret * I / 1000
12   Next I
13   Erase Sig, Pont
14   Nkon = I        'Number of the last sample point to be calculated
15   Kol = Pnt + 1   'Determination of the number of sample points needed to calculate spectrum
16   If Kol > 516 And Kol <= 1024 Then M = 10     Determination of phase "2" for FFT (Fast Fourier
17   If Kol > 1024 And Kol <= 2048 Then M = 11    Transform)
18   If Kol > 2048 And Kol <= 4096 Then M = 12
19   If Kol > 4096 And Kol <= 8192 Then M = 13
20   If Kol > 8192 And Kol <= 16384 Then M = 14
21       N = Int(2 ^ M + 0.1)
22       Per = 1 / (Diskret * N / 1000)  'Determine signal periodicity for spectral calculation
23   I0 = 0          'Number of last sample
24   I1 = Nkon       'Number of last sample
25   Label5.Caption="Normalization of file..." Display of signal processing status
26   Label5.Refresh
27   For L = 1 To M                      Direct Fast Fourier Transform Algorithm
```

-61-

Docket: 9802:IZU

```
1       E = Int(2 ^ (M + 1 - L) + 0.1)
2         F = E / 2
3         U = 1
4         V = 0
5         Z = PI / F
6         C = Cos(Z)
7         S = -Sin(Z)
8       For J = 1 To F
9         For I = J To N Step E
10          O = I + F - 1
11          P = X(I - 1) + X(O)
12          Q = Y(I - 1) + Y(O)
13          R = X(I - 1) - X(O)
14          T = Y(I - 1) - Y(O)
15          X(O) = R * U - T * V
16          Y(O) = T * U + R * V
17          X(I - 1) = P
18          Y(I - 1) = Q
19        Next I
20        W = U * C - V * S
21        V = V * C + U * S
22        U = W
23      Next J
24    Next L
25    J = 1
26    Label5.Caption ="Processing spectrum..."    Signal processing status display
27    Label5.Refresh
28    For I = 1 To N - 1
```

Docket: 9802:IZU

```
1       If I >= J Then GoTo 150
2       J1 = J - 1
3       I1 = I - 1
4       P = X(J1)
5       Q = Y(J1)
6       X(J1) = X(I1)
7       Y(J1) = Y(I1)
8       X(I1) = P
9       Y(I1) = Q
10  150 K = N / 2
11  160 If K >= J Then GoTo 180
12      J = J - K
13      K = K / 2
14      GoTo 160
15  180 J = J + K
16      Next I
17      Kolitch% = (N / 2)
18      ReDim A(Kolitch%), B(Kolitch%), Fr(Kolitch%), Qf(Kolitch%)  Completion of FFT algorithm
19      For K = (Kolitch% - 1) To 0 Step -1                          Determining the 'MASSIVES' in output data and
20          Am1 = Sqr(X(K) ^ 2 + Y(K) ^ 2)                           Their shape (spectral amplitude, phase)
21          Am = Am1 / Kolitch%                                      Amplitude calculation
22          A(K) = (Int(Am * 100)) / 100
23          ForQ = X(K) / Am1
24          Qf(K) = -Atn(X(K) / Y(K))
25          If Qf(K) < 0 Then Qf(K) = -Qf(K)
26          Qf(K) = Qf(K) * 180 / PI                                 Phase calculation
27          Qf(K) = (Int(Qf(K) * 100)) / 100
28          Freq = (Per * (K + 1))
```

-63-

Docket: 9802:IZU

| | | |
|---|---|---|
| 1 | B1 = ((K_per / 100) * 2500) / Freq | *Recalculation of frequency and depth* |
| 2 | B(K) = (Int(B1 * 10000)) / 10000 | |
| 3 | Next K | |
| 4 | Z = 1 | *Formulating 'MASSIVE' depth and recording in on the file* |
| 5 | ReDim OutArr(Kolitch%, 3) | |
| 6 | OutArr(Z, 1) = B(N / 2 - 1) | *Results of depth calculation* |
| 7 | OutArr(Z, 2) = A(N / 2 - 1) | *Results of calculating spectral amplitude* |
| 8 | OutArr(Z, 3) = Qf(N / 2 - 1) | *Results of phase calculation* |
| 9 | For I = N / 2 - 2 To 0 Step -1 | |
| 10 | 111   If B(I) <= NiGlub Then | |
| 11 |         Z = Z + 1 | |
| 12 |         OutArr(Z, 1) = B(I) | |
| 13 |         OutArr(Z, 2) = A(I) | |
| 14 |         OutArr(Z, 3) = Qf(I) | |
| 15 |     End If | |
| 16 |     If B(I) > NiGlub Then GoTo 11 | |
| 17 | Next I | |
| 18 | 11 Z = Z + 1   *'Calculating data for last sample point* | |
| 19 |     Razn_B = B(I) - B(I + 1) | |
| 20 |     Razn_A = A(I) - A(I + 1) | |
| 21 |     Razn_F = Qf(I) - Qf(I + 1) | |
| 22 |     DeltaB = (NiGlub - B(I + 1)) / Razn_B | |
| 23 |     OutArr(Z, 1) = NiGlub | |
| 24 |     OutArr(Z, 2) = A(I + 1) + Razn_A * DeltaB | |
| 25 |     OutArr(Z, 3) = Qf(I + 1) + Razn_F * DeltaB | |
| 26 |     Erase A, B, X, Y | |

Docket: 9802:IZU

```
1    If Check1.Value = 0 Then              Determination of output file type depending on
2       Open OutF$ For Output As #2        Selection in "Collect into a single file" parameter
3    End If
4    If Check1.Value = 1 Then
5       Open OutF$ For Append As #2
6    End If 7       KolZ = Z
8       Print #2, KolZ; Nummar             Outputting data to file depending on
9       If Check4.Value = 0 Then Print #2, KoordX; 0; 0    selection in "execute phase calculations"

10      If Check4.Value = 1 Then Print #2, KoordX; 0; 0; 0   parameter
11      For I = 1 To KolZ - 1
12         If Check4.Value = 0 Then Print #2, KoordX; OutArr(I, 1); OutArr(I, 2)
13         If Check4.Value = 1 Then Print #2, KoordX; OutArr(I, 1); OutArr(I, 2); OutArr(I, 3)
14      Next I
15
16      Close
17      Beep
18      Erase OutArr
19      Label3.Caption= "Completed "+Str$(Int(Procent))+ "% of the calculations"
20      Label3.Refresh        Output processing status line
21      Progress.Value = Fl
22   121 Next Fl
23      Close
24      Label5.Caption = ""
25      Label3.Caption="Calculations completed!"   Completion of processing all files
26      Label9.Visible = False         in the directory and preparation of processing of the next list
```

Docket: 9802:IZU

```
1    Progress.Visible = False
2    File1Name.Text = ""
3     Frame1.Caption="Filename Created"
4    Command3.Visible = True
5    Label1.Caption="Select source directory and press the 'compute' Button"
6    File1.Refresh 7    Exit Sub 8    Command1_Click_Error:      Error processing after pressing the 'compute'
9    If ErrHandler(Err) Then    "Button"
10       Resume
11   Else
12   'Focusing the cursor on the filename
13   File2Name.SelStart = 0
14   File2Name.SelLength = Len(File2Name.Text)
15   File2Name.SetFocus
16   Exit Sub
17   End If 18   InpError:                  Input error processing
19     Close
20     MsgBox "Must enter all data! ",64, "Input error"
21     Exit Sub 22   InpErr1:                   Input error processing
23     Close
24     MsgBox "Must enter all data! ",64, "Input error"
```

Docket: 9802:IZU

```
1    Exit Sub
2    End Sub

3    Private Sub Command2_Click()   Processing the result of pressing 'exit'
4      Close
5      End
6    End Sub 7    Private Sub Command3_Click()
8      If Check1.Value = 1 Then
9        If File2Name.Text = "" Then      'Error processing-bad file name entry
10         GoTo InpError
11       End If
12     End If
13     Label9.Visible = True
14     File1Name.Text = File2Name.Text
15     Frame1.Caption="Name of input file"
16     Command3.Visible = False
17     Label1.Caption="Select input file directory and press 'compute'    File entry prompt
18     Exit Sub 19   InpError:
20     Dim ErrInfo$, ErrTitle$
21     ErrInfo$ = "File name must be entered!"  File name entry error processing
22     ErrTitle$ = "Entry Error"
23     MsgBox ErrInfo$, 64, ErrTitle$
24     Exit Sub
25   End Sub
```

Docket: 9802:IZU

```
1    Private Function ErrHandler(code)
2      Dim ErrHandler_mes$           Drive specification error processing
3      ErrHandler_mes$=Error$(code)  'Auxiliary variables 4    If MsgBox("Repeat Selection?",20,ErrHandler_mes$) = 6 Then
5        ErrHandler = -1
6    Else
7        ErrHandler = 0
8    End If
9    End Function 10   Private Sub Drive_Change()
11     Dim Err_Info1$, Err_Text1$    ' Drive specification error processing
12       On Local Error GoTo 10
13       Tree.Path = Drive.Drive
14   Exit Sub
15
16   10 Err_Info$ = "Drive " + Drive.Drive+ " not ready"
17     Err_Text1$ = "Drive specification error"
18     If MsgBox(Err_Text1$, 60, Err_Info1$) = 6 Then
19     Resume
20     Else
21     Drive.Drive = Drive.Tag
22     Resume
23     End If
24   End Sub 25   Private Sub File1_Click()    Processing file name selected in the "files" panel
```

Docket: 9802:IZU

```
1    If Right$(Tree.Path, 1) <> "\" Then
2        File2Name.Text = Tree.Path + "\" + File1.List(File1.ListIndex)
3    End If
4    If Right$(Tree.Path, 1) = "\" Then
5        File2Name.Text = Tree.Path + File1.List(File1.ListIndex)
6    End If
7    End Sub 8    Private Sub Form_Load()
9        Progress.Visible = False
10       Label1.Caption = "Select directory and enter output file name (with an extension *.TXT) and fix
11   the selection"  prompt to initiate file processing 12       Drive.Tag = Drive.Drive  Transmission of path information and file extensions to the "files" panel
13       File1.Pattern = "*.*"
14   End Sub 15   Private Sub Tree_Change()       Transmission of path information from the "directory" panel upon
16       File2Name.Text = Tree.Path     determining the file for output
17           If Right$(File2Name.Text, 1) <> "\" Then
18               File2Name.Text = File2Name.Text + "\"
19           End If
20       File1.Pattern = "*.*"
21       File1.Path = Tree.Path
22       File2Name.SelStart = Len(File2Name.Text)
23       File2Name.SetFocus
24   End Sub
```

What is claimed is:

1. Apparatus for conducting a geophysical survey, comprising:
   (a) a sensor for receiving seismic signals from the ground;
   (b) an analog to digital conversion device in communication with said sensor, said analog to digital conversion device having a resonator which resonates at a predetermined frequency; and
   (c) a computer having:
      (i) a recording program for storing time/amplitude samples from the signals received from the analog to digital conversion device, wherein each file of time/amplitude samples comprises one path point;
      (ii) a Fourier analysis computer program for performing a Fourier analysis of the frequency spectrum and the phase shifts of the path points, and for computing spectral profiles of the underground;
      (iii) an image building program for creating an image file from the output file of the Fourier analysis program; and
      (iv) a graphics program for displaying and printing a profile of underground layers.

2. The apparatus of claim 1, wherein the analog to digital conversion device comprises a modified analog to digital converter for converting said seismic signals to digital form, wherein said modified analog to digital converter is an analog to digital converter which has been modified by replacing the quartz resonator thereof with a frequency generator for determining the frequency with which the modified analog to digital converter samples the analog signal from the sensor, said frequency generator having a quartz resonator which resonates at a frequency of not more than 3 MHz, whereby depths below surface as deep as 10,000 m can be determined.

3. The apparatus of claim 1, wherein the frequency range of the sensor's sensitivity is a minimum of 0 to 50 KHz.

4. The apparatus of claim 1, wherein the analog to digital conversion device is an A/D Converter having sampling frequencies of 976.5625, 3906.25, 8000, and 48000 Hz, and having a quartz resonator which resonates at a frequency of not more than 3 MHz, whereby depths below surface as deep as 10,000 m can be determined.

5. The apparatus of claim 1, wherein the analog to digital conversion device has a memory sufficient to store enough sample frequencies to constitute one path point.

6. The apparatus of claim 1, wherein said sensor is a piezo sensor.

7. The apparatus of claim 1, wherein said analog to digital conversion device further comprises an amplifier in communication with said sensor for receiving and amplifying said seismic signals, wherein said amplifier is in communication with said modified analog to digital converter for supplying it with amplified seismic signals.

8. The apparatus of claim 7, wherein the output from the amplifier is a maximum of ±3 volts.

9. The apparatus of claim 1, wherein said analog to digital conversion device further comprises a power supply for powering the amplifier and the modified A/D converter.

10. A method of generating a profile of the layers in a geophysical cross-section comprising the steps of:
    (a) receiving seismic acoustical signals from predetermined positions, said positions being separated from one another by a predetermined distance, all of said positions being in substantially the same straight line, said seismic acoustical signals representing frequencies generated by underground formations;
    (b) converting these seismic signals to digital format;
    (c) performing a Fast Fourier transformation on these signals to generate a representation of all spectral frequency components, said representation comprising frequency and amplitude data;
    (d) converting the frequencies of the spectrum to depths below surface using the formula $H=(1/f)*(2500\pm250)$, where H is depth below surface; and
    (e) generating a density cross-section of the underground strata.

11. The method of claim 10, wherein the step of receiving seismic acoustical signals from predetermined positions includes the steps of:
    (a) selecting a first position on the surface of the ground, receiving seismic acoustical signals at that position;
    (b) selecting a next position on the surface of the ground which is removed from the previous position by a predetermined distance, receiving seismic acoustical signals at that position; and
    (c) repeating step b for as many positions at which it is desired to receive seismic acoustical signals.

12. The method of claim 10, wherein the step of receiving seismic acoustical signals from predetermined positions includes the step of selecting a series of positions on the surface of the ground.

13. A method of passively determining the depth of a spatial anomaly occurring beneath the terrain or water surface of the earth and in the vicinity of a location of interest, comprising the steps of:
    (a) passively monitoring the acoustical resonant frequencies emitted by naturally vibrating underground strata;
    (b) measuring the amplitude changes in said time-varying signal in the form of a broad spectrum of frequency data for variations indicative of a spatial anomaly;
    (c) processing said data to produce a sequential frequency spectra of said time-varying signals within a frequency band of interest, wherein each frequency spectra is representative of a particular depth, as per the equation: $H=(1/f)*(2500\pm250)$, where H is depth below surface; and
    (d) identifying the location of said spatial anomaly with said processed data.

* * * * *

UNITED STATES PATENT AND TRADEMARK OFFICE
CERTIFICATE OF CORRECTION

PATENT NO. : 6,199,016 B1
DATED : March 6, 2001
INVENTOR(S) : Igor V. Zuykov

It is certified that error appears in the above-identified patent and that said Letters Patent is hereby corrected as shown below:

Column 7,
Line 16, replace "$H_n=(/f_n) * (2500\pm250)$" with -- $H_n=(1/f_n) * (2500\pm250)$ --.

Column 12,
Line 45, replace "MF=1P=SF/4096" with -- MF=1/P= SF/4096 --.

Column 17,
Line 61, replace "oof" with -- of --.

Column 22,
Line 62, replace "Screen 5" with -- Screen 15 --.

Column 26,
Line 24, replace "FOrQ" with -- ForQ --.

Signed and Sealed this

Twenty-sixth Day of February, 2002

*Attest:*

*Attesting Officer*

JAMES E. ROGAN
*Director of the United States Patent and Trademark Office*